(12) United States Patent  (10) Patent No.: US 7,987,754 B2
Caputo et al.  (45) Date of Patent: Aug. 2, 2011

(54) WINDOW COVERING SIZING METHOD AND APPARATUS

(75) Inventors: Thomas A. Caputo, Greensboro, NC (US); Neil L. Casstevens, Colfax, NC (US); Mark A. Fox, Climax, NC (US); Clifford Birch, Monroe, NC (US)

(73) Assignee: Newell Window Furnishings, Inc., High Pointe, NC (US)

( * ) Notice: Subject to any disclaimer, the term of this patent is extended or adjusted under 35 U.S.C. 154(b) by 302 days.

(21) Appl. No.: 12/164,839

(22) Filed: Jun. 30, 2008

(65) Prior Publication Data

US 2009/0031876 A1 Feb. 5, 2009

Related U.S. Application Data

(60) Provisional application No. 61/010,291, filed on Jan. 7, 2008, provisional application No. 60/962,646, filed on Jul. 31, 2007.

(51) Int. Cl.
*B26D 7/02* (2006.01)

(52) U.S. Cl. ............... 83/207; 83/277; 83/440; 83/466

(58) Field of Classification Search ............... 83/206, 83/277, 445, 448, 449, 440, 466
See application file for complete search history.

(56) References Cited

U.S. PATENT DOCUMENTS

| 239,691 A | 4/1881 | Appleton |
|---|---|---|
| 265,635 A | 10/1882 | Baxter |
| 397,475 A | 2/1889 | Tiffany |
| 421,027 A | 2/1890 | Hammond |
| 702,200 A | 6/1902 | Greene |
| 866,243 A | 9/1907 | Waechter |
| 1,038,920 A | 9/1912 | Marschall |
| 1,382,433 A | 6/1921 | McCarty |
| 1,481,700 A | 1/1924 | Fatland |
| 1,647,254 A | 11/1927 | Simmons |
| 1,721,276 A | 7/1929 | Marsilius |
| 1,792,522 A | 2/1931 | Yates |
| 1,924,162 A | 8/1933 | Mason |
| 1,952,698 A | 3/1934 | Willem |
| 2,044,481 A | 6/1936 | Manley et al. |
| 2,057,488 A | 10/1936 | Hochstadt |
| 2,077,697 A | 4/1937 | Hunt |
| 2,120,593 A | 6/1938 | Reynolds |

(Continued)

FOREIGN PATENT DOCUMENTS

CA 2136519 A1 5/1996

(Continued)

OTHER PUBLICATIONS

Birch, Clifford, et al., U.S. Appl. No. 12/579,892, Oct. 15, 2009.

(Continued)

*Primary Examiner* — Kenneth E. Peterson
(74) *Attorney, Agent, or Firm* — Dennis J. Williamson; Moore & Van Allen, PLLC

(57) ABSTRACT

A method and apparatus for cutting a window covering comprises saw for cutting the window blind. A clamp assembly moves the window covering relative to the saw. A controller moves the clamp assembly to automatically position the window covering relative to the saw. The saw is moved into engagement with the window covering to cut the window covering.

9 Claims, 49 Drawing Sheets

U.S. PATENT DOCUMENTS

| | | | |
|---|---|---|---|
| 2,159,997 A | 5/1939 | Millar | |
| 2,234,013 A | 3/1941 | Stover | |
| 2,247,314 A | 6/1941 | Sellmeyer | |
| 2,431,482 A | 1/1946 | Hutchinson | |
| 2,418,515 A | 4/1947 | Lewis | |
| 2,423,978 A | 7/1947 | Hunter | |
| D155,897 S | 11/1949 | Huntington | |
| 2,631,508 A | 3/1953 | Muehling | |
| 2,644,520 A | 7/1953 | Nelson | |
| 2,691,994 A | 10/1954 | Ferguson | |
| 2,747,625 A | 5/1956 | Small | |
| 2,789,639 A | 4/1957 | Lorentzen | |
| 2,806,493 A | 9/1957 | Gaskell | |
| 2,827,686 A | 3/1958 | Adelman | |
| 2,883,736 A | 4/1959 | Crane | |
| 2,949,943 A | 8/1960 | Islandsrud | |
| 2,987,085 A | 6/1961 | Porter | |
| 3,052,143 A * | 9/1962 | Cooley | 83/112 |
| 3,260,146 A | 7/1966 | Child | |
| 3,263,544 A | 8/1966 | Margolien | |
| 3,292,232 A | 12/1966 | Nilsson | |
| 3,391,591 A | 7/1968 | Funke | |
| 3,470,926 A | 10/1969 | Dohm | |
| 3,501,849 A | 3/1970 | Olsen | |
| 3,513,740 A | 5/1970 | Burghart | |
| 3,521,810 A | 7/1970 | Boyer | |
| 3,564,893 A | 2/1971 | Richards et al. | |
| 3,584,380 A | 6/1971 | Mehler et al. | |
| 3,618,297 A | 11/1971 | Hamrick | |
| 3,634,975 A | 1/1972 | Hensley | |
| 3,664,221 A | 5/1972 | Breetvelt | |
| 3,677,117 A | 7/1972 | Cutter | |
| 3,715,946 A | 2/1973 | Kaltenbach | |
| 3,736,631 A | 6/1973 | Edixhoven | |
| 3,750,509 A | 8/1973 | Kruse | |
| 3,766,815 A | 10/1973 | Edixhoven | |
| 3,910,142 A * | 10/1975 | Jureit et al. | 83/74 |
| 4,018,188 A | 4/1977 | Burdette | |
| 4,036,092 A | 7/1977 | Kaltenbach | |
| 4,055,206 A | 10/1977 | Griffin | |
| 4,067,252 A | 1/1978 | Peddinghaus et al. | |
| 4,139,043 A | 2/1979 | Donofrio | |
| 4,151,768 A | 5/1979 | Shockovsky | |
| 4,188,693 A | 2/1980 | Edixhoven | |
| 4,201,256 A | 5/1980 | Truhan | |
| 4,214,493 A | 7/1980 | Elhaus | |
| 4,227,902 A | 10/1980 | Olson | |
| 4,230,005 A | 10/1980 | Varga | |
| 4,233,782 A | 11/1980 | Perrault | |
| 4,262,564 A | 4/1981 | Kaltenbach | |
| 4,270,253 A | 6/1981 | Herb et al. | |
| 4,326,864 A | 4/1982 | Sittler | |
| 4,338,710 A | 7/1982 | Stursa et al. | |
| 4,367,665 A | 1/1983 | Terpstra et al. | |
| 4,407,614 A | 10/1983 | Muhr et al. | |
| 4,411,401 A | 10/1983 | Anderson | |
| 4,457,197 A | 7/1984 | Wepner et al. | |
| 4,468,995 A | 9/1984 | Mireles-Saldivar | |
| 4,492,301 A | 1/1985 | Inaba et al. | |
| 4,545,100 A | 10/1985 | Gaillard et al. | |
| 4,545,759 A | 10/1985 | Giles et al. | |
| 4,567,930 A | 2/1986 | Fischer | |
| 4,576,072 A | 3/1986 | Terpstra et al. | |
| 4,589,312 A | 5/1986 | Meyers et al. | |
| 4,589,313 A | 5/1986 | Meyers et al. | |
| 4,606,099 A | 8/1986 | Schluep et al. | |
| 4,619,166 A | 10/1986 | Valavaara | |
| 4,625,868 A | 12/1986 | Bischof | |
| 4,632,259 A | 12/1986 | Cameron | |
| 4,635,515 A * | 1/1987 | Altman | 83/438 |
| 4,639,987 A | 2/1987 | Georgopoulos | |
| 4,721,058 A | 1/1988 | Hayamizu et al. | |
| 4,726,273 A | 2/1988 | Miceli | |
| 4,730,372 A | 3/1988 | Tsuchida | |
| 4,771,667 A | 9/1988 | Forman et al. | |
| 4,776,096 A | 10/1988 | Chang | |
| 4,790,226 A | 12/1988 | Tsuchida | |
| 4,805,500 A | 2/1989 | Saito et al. | |
| 4,807,363 A | 2/1989 | Clifton, Jr. | |
| 4,819,530 A | 4/1989 | Huang | |
| 4,823,449 A | 4/1989 | Chang | |
| 4,823,662 A * | 4/1989 | Stolzer | 83/150 |
| 4,827,921 A | 5/1989 | Reugheimer | |
| 4,876,795 A | 10/1989 | Chun-cheng | |
| 4,901,419 A | 2/1990 | Voss | |
| 4,907,325 A | 3/1990 | Hsu | |
| 4,907,337 A | 3/1990 | Krüsi | |
| 4,924,740 A | 5/1990 | Wright | |
| 4,928,369 A | 5/1990 | Schnebly et al. | |
| 4,987,765 A | 1/1991 | Nishimura et al. | |
| 4,993,131 A | 2/1991 | Graves et al. | |
| D316,979 S | 5/1991 | Reynolds | |
| 5,031,488 A | 7/1991 | Zumeta | |
| 5,037,253 A | 8/1991 | Molaro et al. | |
| 5,043,907 A | 8/1991 | Richards | |
| 5,054,206 A | 10/1991 | Carlson | |
| 5,056,388 A | 10/1991 | Dekker et al. | |
| 5,060,709 A | 10/1991 | Simon | |
| 5,072,494 A | 12/1991 | Graves et al. | |
| 5,103,702 A | 4/1992 | Yannazzone | |
| 5,119,854 A | 6/1992 | Chanoine et al. | |
| 5,165,728 A | 11/1992 | Mayer | |
| 5,215,512 A | 6/1993 | De Dompierre | |
| 5,251,382 A | 10/1993 | Hellar | |
| 5,339,716 A | 8/1994 | Sands et al. | |
| 5,349,730 A | 9/1994 | Anderson et al. | |
| 5,392,524 A | 2/1995 | Hill | |
| 5,456,149 A | 10/1995 | Elsenheimer et al. | |
| 5,483,459 A | 1/1996 | Tamura | |
| 5,570,292 A | 10/1996 | Abraham et al. | |
| 5,667,152 A | 9/1997 | Mooring | |
| 5,740,053 A | 4/1998 | Iwama | |
| 5,787,774 A | 8/1998 | Richards et al. | |
| 5,799,557 A | 9/1998 | Wang | |
| 5,806,245 A | 9/1998 | Satrom | |
| 5,806,394 A | 9/1998 | Marocco | |
| 5,816,126 A | 10/1998 | Pluber | |
| 5,819,619 A | 10/1998 | Miller et al. | |
| 5,826,317 A | 10/1998 | van Oostrom et al. | |
| 5,826,472 A | 10/1998 | Tamura et al. | |
| 5,882,044 A | 3/1999 | Sloane | |
| 5,882,155 A | 3/1999 | Testa, Jr. | |
| 5,927,172 A | 7/1999 | Wang | |
| 5,943,932 A | 8/1999 | Sberveglieri | |
| 5,971,839 A | 10/1999 | Schmelzer | |
| 6,003,217 A | 12/1999 | Graves et al. | |
| 6,003,218 A | 12/1999 | Schumann et al. | |
| 6,029,553 A | 2/2000 | Berntsson et al. | |
| 6,079,306 A | 6/2000 | Liu | |
| 6,089,134 A | 7/2000 | Marocco | |
| 6,098,694 A | 8/2000 | Ohanesian | |
| 6,142,196 A | 11/2000 | Schumann et al. | |
| 6,167,789 B1 | 1/2001 | Daniels et al. | |
| 6,178,857 B1 | 1/2001 | Marocco | |
| 6,196,099 B1 | 3/2001 | Marocco | |
| 6,202,014 B1 | 3/2001 | Brandt et al. | |
| 6,240,824 B1 | 6/2001 | Hsu | |
| 6,263,945 B1 | 7/2001 | Nien | |
| 6,314,851 B1 | 11/2001 | Graves et al. | |
| 6,334,379 B1 | 1/2002 | Sudano | |
| 6,336,388 B1 | 1/2002 | Marocco | |
| 6,362,893 B1 | 3/2002 | Francis et al. | |
| 6,405,406 B1 | 6/2002 | Chen | |
| 6,412,381 B1 | 7/2002 | Wang et al. | |
| 6,418,762 B1 | 7/2002 | Münch et al. | |
| 6,427,571 B1 | 8/2002 | Hsu | |
| 6,435,066 B1 | 8/2002 | Kutchmarek et al. | |
| 6,500,048 B1 | 12/2002 | Bär | |
| 6,523,275 B2 | 2/2003 | Medford et al. | |
| 6,535,294 B1 | 3/2003 | Arledge, Jr. et al. | |
| 6,560,849 B1 | 5/2003 | Modra | |
| 6,561,121 B1 | 5/2003 | Rose | |
| 6,604,443 B2 | 8/2003 | Roberts et al. | |
| 6,615,698 B2 | 9/2003 | Chuang et al. | |
| 6,640,855 B2 * | 11/2003 | Giles | 144/357 |
| 6,644,160 B1 | 11/2003 | Boselli | |
| 6,681,673 B1 | 1/2004 | Kutchmarek et al. | |

| | | |
|---|---|---|
| 6,688,204 B2 | 2/2004 | Huang |
| 6,708,967 B1 | 3/2004 | Trovinger et al. |
| 6,758,120 B2 | 7/2004 | Marocco |
| 6,758,257 B2 | 7/2004 | Lee |
| 6,761,099 B2 | 7/2004 | Lin et al. |
| 6,783,563 B1 | 8/2004 | Eckhoff et al. |
| 6,793,073 B2 | 9/2004 | Tu |
| 6,865,817 B2 | 3/2005 | Militello et al. |
| 6,877,409 B2 | 4/2005 | Huang et al. |
| 6,912,940 B1 | 7/2005 | Atwood |
| 6,945,152 B2 | 9/2005 | Jabbari et al. |
| 6,971,296 B2 | 12/2005 | Lin et al. |
| 6,973,364 B2 | 12/2005 | Schwartz et al. |
| 7,000,516 B2 | 2/2006 | Lin et al. |
| 7,000,521 B1 | 2/2006 | Cheng et al. |
| 7,007,576 B2 | 3/2006 | Roberts et al. |
| 7,017,459 B2 | 3/2006 | Marocco |
| 7,024,977 B2 | 4/2006 | Nien |
| 7,036,412 B2 | 5/2006 | Abdollahzadeh |
| 7,040,205 B2 | 5/2006 | Roberts et al. |
| 7,044,043 B2 | 5/2006 | Cheng |
| 7,059,230 B2 | 6/2006 | Caputo et al. |
| 7,069,832 B2 | 7/2006 | Roberts et al. |
| 7,069,833 B2 | 7/2006 | Roberts et al. |
| 7,100,485 B2 | 9/2006 | Roberts et al. |
| 7,104,175 B2 | 9/2006 | Roberts et al. |
| 7,107,889 B2 | 9/2006 | Marocco |
| 7,114,421 B2 | 10/2006 | Marocco |
| 7,118,028 B2 | 10/2006 | Liu et al. |
| 7,124,672 B2 | 10/2006 | Marocco |
| 7,178,439 B2 | 2/2007 | Gilboy et al. |
| 7,182,009 B2 * | 2/2007 | Harris et al. .......... 83/206 |
| 7,194,811 B2 | 3/2007 | Militello et al. |
| 7,278,345 B2 | 10/2007 | Schimmels |
| 7,444,910 B2 | 11/2008 | Marocco |
| RE40,605 E | 12/2008 | Kutchmarek et al. |
| 7,467,578 B2 | 12/2008 | Marocco |
| 7,506,567 B2 | 3/2009 | Simokovic |
| 2002/0005431 A1 | 1/2002 | Siefert et al. |
| 2002/0117039 A1 | 8/2002 | Huang |
| 2002/0178884 A1 | 12/2002 | Chuang et al. |
| 2003/0033919 A1 | 2/2003 | Lin et al. |
| 2003/0066403 A1 | 4/2003 | Lin et al. |
| 2003/0110913 A1 | 6/2003 | Chen |
| 2003/0140756 A1 | 7/2003 | Lin et al. |
| 2003/0196530 A1 | 10/2003 | Roberts et al. |
| 2004/0103767 A1 | 6/2004 | Lin et al. |
| 2004/0173076 A1 | 9/2004 | Potts |
| 2005/0188515 A1 | 9/2005 | Reimer et al. |
| 2006/0065086 A1 | 3/2006 | Swopes et al. |
| 2006/0108078 A1 | 5/2006 | Kollman et al. |
| 2006/0156882 A1 | 7/2006 | Kollman et al. |
| 2006/0179991 A1 | 8/2006 | Nien et al. |
| 2006/0207399 A1 | 9/2006 | Birch et al. |
| 2007/0000363 A1 | 1/2007 | Kollman et al. |
| 2007/0175782 A1 | 8/2007 | Nien |
| 2007/0175783 A1 | 8/2007 | Nien |
| 2007/0239551 A1 | 10/2007 | Zeller |
| 2007/0277657 A1 | 12/2007 | Hilgendorf et al. |
| 2007/0295176 A1 | 12/2007 | Kollman et al. |
| 2008/0034933 A1 | 2/2008 | Roberts et al. |
| 2008/0066283 A1 | 3/2008 | Birch et al. |
| 2008/0087152 A1 | 4/2008 | Kollman et al. |
| 2009/0019978 A1 | 1/2009 | Kollman |
| 2009/0071307 A1 | 3/2009 | Kollman |
| 2009/0107313 A1 | 4/2009 | Nien et al. |
| 2009/0301039 A1 | 12/2009 | Caputo |
| 2010/0107839 A1 | 5/2010 | Roberts et al. |

FOREIGN PATENT DOCUMENTS

| | | |
|---|---|---|
| CA | 2355507 A1 | 2/2003 |
| DE | 223048 | 6/1910 |
| DE | 857677 | 12/1952 |
| EP | 0265564 A1 | 5/1988 |
| EP | 0273535 A1 | 7/1988 |
| EP | 0629475 A1 | 12/1994 |
| GB | 121338 | 11/1970 |
| GB | 2258686 A | 2/1993 |
| JP | 2224998 A | 9/1990 |
| JP | 2001300816 A | 10/2001 |
| JP | 2002233990 A | 8/2002 |
| WO | 0107747 A1 | 2/2001 |
| WO | 0110408 A2 | 2/2001 |
| WO | 03010408 A2 | 2/2003 |

OTHER PUBLICATIONS

Birch, Clifford, et al., U.S. Appl. No. 12/579,897, Oct. 15, 2009.
Birch, Clifford, et al., U.S. Appl. No. 12/579,901, Oct. 15, 2009.
MultiCam Controller, http://web.archive.org/web/20031204022847/www.multicam.com/main/mcp/index.htm.
MultiCam Controller, http://web.archive.org/web/20031011144529/www.multicam.com/main/mcp/bar_code.htm.
U.S. Appl. No. 12/838,993, filed Jul. 19, 2010.
U.S. Appl. No. 12/838,946, filed Jul. 19, 2010.
U.S. Appl. No. 12/838,958, filed Jul. 19, 2010.
U.S. Appl. No. 12/839,027, filed Jul. 19, 2010.
U.S. Appl. No. 12/839,083, filed Jul. 19, 2010.
U.S. Appl. No. 12/838,975, filed Jul. 19, 2010.
Canadian Intellectual Property Office, Office Action, Dec. 8, 2010.
U.S. Appl. No. 29/366,066 dated Jul. 19, 2010.
U.S. Appl. No. 29/366,069 dated Jul. 19, 2010.
U.S. Appl. No. 29/366,071 dated Jul. 19, 2010.
U.S. Appl. No. 29/366,072 dated Jul. 19, 2010.
U.S. Appl. No. 12/164,839 dated Jun. 30, 2008.
U.S. Appl. No. 12/839,092 dated Jul. 19, 2010.
U.S. Appl. No. 10/908,728, Office Action dated Oct. 4, 2007.
U.S. Appl. No. 10/908,728, Response to Oct. 4, 2007 Office Action filed Jan. 3, 2008.
U.S. Appl. No. 10/908,728, Office Action dated Apr. 30, 2008.
U.S. Appl. No. 10/908,728, Response to Apr. 30, 2008 Office Action filed Jun. 4, 2008.
U.S. Appl. No. 10/908,728, Office Action dated Jun. 19, 2008.
U.S. Appl. No. 10/908,728, Response to Jun. 19, 2008 Office Action filed Jul. 28, 2008.
U.S. Appl. No. 10/908,728, Office Action dated Oct. 8, 2008.
U.S. Appl. No. 10/908,728, Response to Oct. 8, 2008 Office Action filed Jan. 8, 2009.
U.S. Appl. No. 10/908,728, Final Office Action dated Apr. 23, 2009.
U.S. Appl. No. 10/908,728, Response to Apr. 23, 2009 Final Office Action filed Jun. 5, 2009.
U.S. Appl. No. 10/908,728, Office Action dated Mar. 3, 2011.
U.S. Appl. No. 10/462,897, Office Action dated Nov. 4, 2003.
U.S. Appl. No. 10/462,897, Response to Office Action dated Nov. 4, 2003 filed Dec. 4, 2003.
U.S. Appl. No. 10/462,897, Office Action dated Apr. 18, 2007.
U.S. Appl. No. 10/462,897, Response to Office Action dated Apr. 18, 2007 filed Jul. 18, 2007.
U.S. Appl. No. 10/462,897, Office Action dated Oct. 4, 2007.
U.S. Appl. No. 10/462,897, Response to Office Action dated Oct. 4, 2007 filed Dec. 12, 2007.
U.S. Appl. No. 10/462,897, Office Action dated Apr. 17, 2008.
U.S. Appl. No. 10/462,897, Response to Office Action dated Apr. 17, 2008 filed Sep. 16, 2008.
U.S. Appl. No. 10/462,897, Office Action dated Jan. 8, 2009.
U.S. Appl. No. 10/462,897, Response to Office Action dated Jan. 8, 2009 filed May 8, 2009.
U.S. Appl. No. 10/462,897, Office Action dated Sep. 15, 2009.
U.S. Appl. No. 10/462,897, Response to Office Action dated Sep. 15, 2009 filed Dec. 15, 2009.
U.S. Appl. No. 10/462,897, Final Office Action dated Mar. 16, 2010.
U.S. Appl. No. 10/462,897, Response to Final Office Action dated Mar. 16, 2010 filed Jul. 1, 2010.
U.S. Appl. No. 10/462,897, Office Action Aug. 23, 2010.
U.S. Appl. No. 10/462,897, Response to Office Action dated Aug. 23, 2010 filed Nov. 3, 2010.
U.S. Appl. No. 10/462,897, Final Office Action dated Jan. 19, 2011.
U.S. Appl. No. 12/685,843, Office Action dated Jun. 28, 2010.
U.S. Appl. No. 12/685,843, Response to Office Action dated Jun. 28, 2010 filed Jul. 26, 2010.
U.S. Appl. No. 12/685,843, Office Action dated Aug. 19, 2010.
U.S. Appl. No. 12/685,843, Response to Office Action dated Aug. 19, 2010 filed Nov. 2, 2010.

U.S. Appl. No. 12/685,843, Final Office Action dated Jan. 20, 2011.
U.S. Appl. No. 11/873,317, Office Action dated Oct. 1, 2008.
U.S. Appl. No. 11/873,317, Response to Office Action dated Oct. 1, 2008 filed Oct. 30, 2008.
U.S. Appl. No. 11/873,317, Office Action dated Jan. 15, 2009.
U.S. Appl. No. 11/873,317, Response to Office Action dated Jan. 15, 2009 filed Jun. 8, 2009.
Canadian Intellectual Property Office, Office Action dated Dec. 22, 2010.

* cited by examiner

```
┌─────────────────────────┐
│  PLACE WINDOW COVERING  │
│      ON PLATFORM AND    │
│  ENGAGE THE ENGAGEMENT  │──4401
│ MEMBER ON THE CLAMPING  │
│  JAW WITH THE MATING    │
│ ENGAGEMENT ELEMENT ON   │
│   THE PACKAGE/WINDOW    │
│        COVERING         │
└─────────────────────────┘
             │
             ▼
┌─────────────────────────┐
│  EXTEND CLAMP TO FORCE  │──4402
│    WINDOW COVERING      │
│    PACKAGE AGAINST      │
│    LATERAL SUPPORT      │
│        SURFACE          │
└─────────────────────────┘
             │
             ▼
           ( C )
```

*FIG. 25*

WINDOW COVERING SIZING METHOD AND APPARATUS

This application claims the benefit of priority under 35 U.S.C. §119(e) to the filing date of U.S. Provisional Application 61/010,291 filed Jan. 7, 2008 and U.S. Provisional Application 60/962,646 filed Jul. 31, 2007, which are incorporated by reference in their entirety.

BACKGROUND

It will be appreciated that window coverings come in a variety of materials including wood, plastic, fabric, vinyl and aluminum and a variety of styles including horizontal blinds, vertical blinds, woven shades, pleated shades, Roman shades and cellular blinds. Window coverings are sold as stock, custom and cut-to-size or size-in-store. Stock window coverings are manufactured in a variety of standard widths that are intended to fit corresponding standard window sizes. Custom window coverings are manufactured to specified dimensions per a customer's specific request. Cut-to-size or size-in-store window coverings are manufactured in a limited number of sizes that are intended to be used with a wide range of window sizes. A cutting machine is provided at the retail outlet that cuts the window covering from the manufactured or stock size to the customer's desired size. The cutting machine is operated by the retail outlet personnel. Operator error is possible because the process requires accuracy in both the measurement and alignment of the blind in the machine. Further, even if the blinds are cut correctly the process consumes valuable personnel time.

SUMMARY

An apparatus for cutting a window covering comprises a saw for cutting the window blind. A clamp assembly moves the window covering relative to the saw. A controller moves the clamp assembly to automatically position an end of the window covering relative to the saw. The saw is moved into engagement with the window covering to cut the window covering. A method of cutting a window covering is also disclosed comprising locating a clamp assembly at the center of the window covering. A desired size of the window covering is received and a distance the center of the package must be positioned from a saw to obtain the desired size of the window covering is determined. The clamp assembly is automatically moved such that the center of the package is positioned the distance from the saw. The saw cuts the window covering to the desired size.

BRIEF DESCRIPTION OF THE DRAWINGS

FIG. 25 is a block diagram illustrating an embodiment of the operation of the SIS machine.

DESCRIPTION OF EMBODIMENTS OF THE INVENTION

Figure 1:
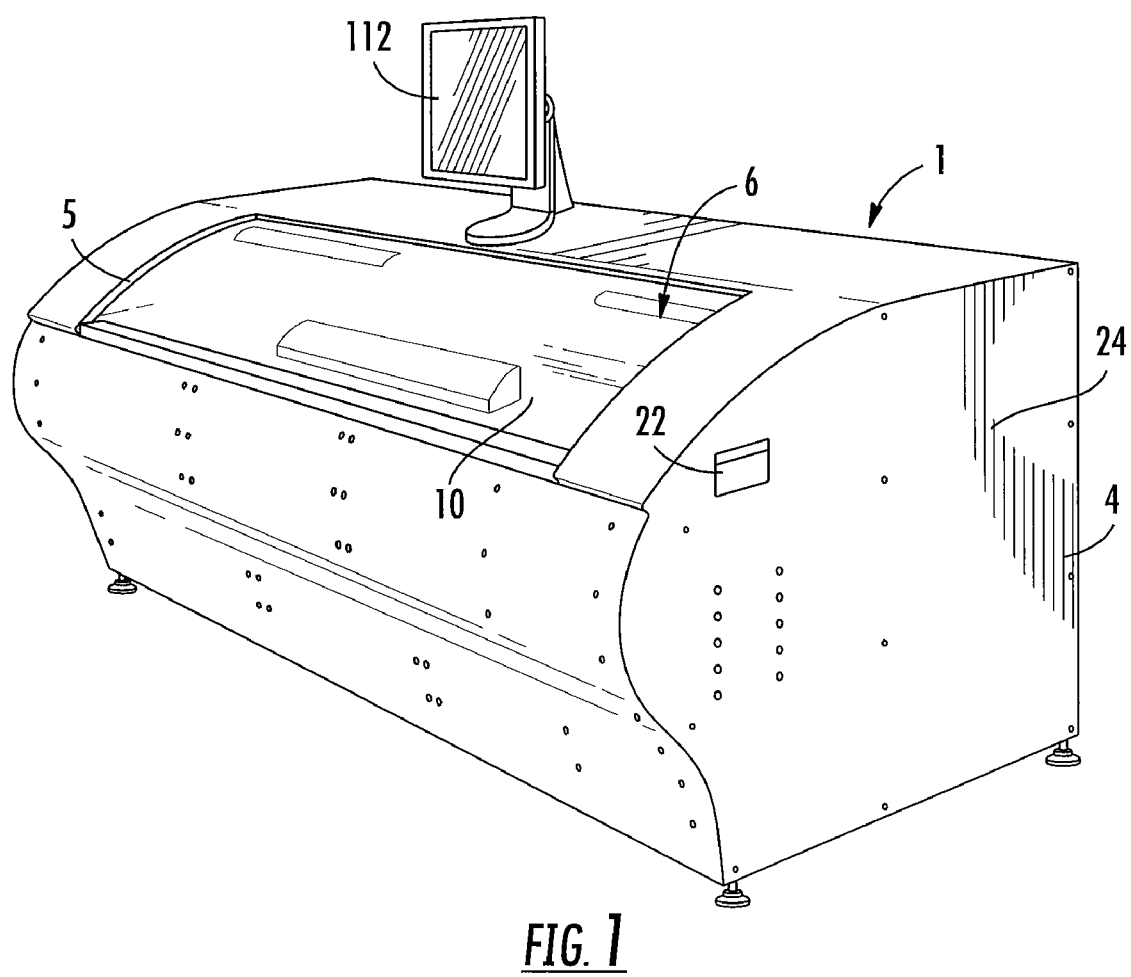
FIG. 1 is a perspective view of an embodiment of the SIS machine of the invention.
Figure 2:
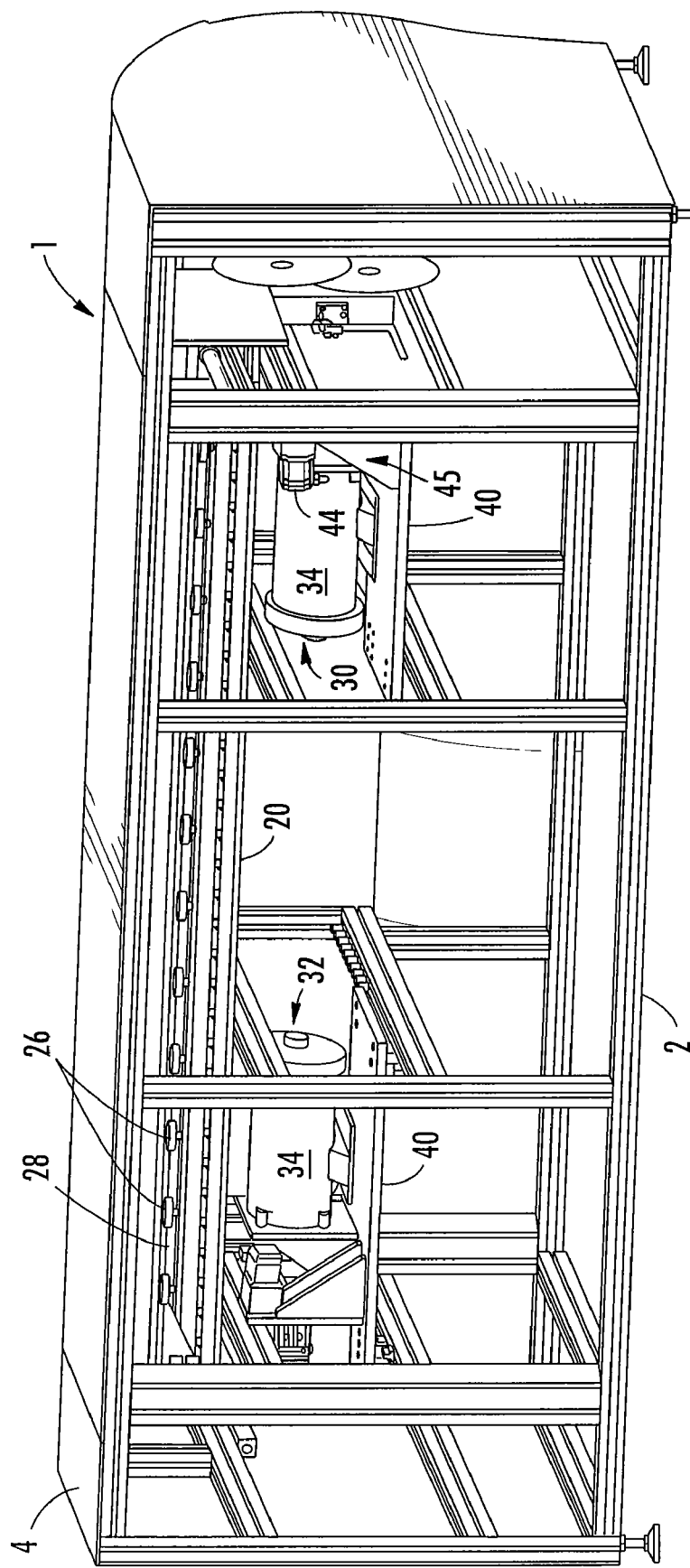
FIG. 2 is a perspective back view of the embodiment of the SIS machine of FIG. 1.

Referring to FIGS. 1, 2, 5, 6 and 7, the size-in-store (SIS) machine 1 comprises an internal frame 2 that supports the cutting, measuring and operating systems of the SIS machine. An outer housing 4 is provided to cover the internal mechanisms of the SIS machine. An opening 5 is provided to allow access to the interior cutting chamber 8 of the apparatus to allow a user to place window coverings into and remove window coverings from the SIS machine. Opening 5 is covered by a door 6 that isolates the cutting chamber 8 from the exterior of the machine. The door 6 may comprise a transparent window 10 to allow a user to observe the cutting and measuring operations. The door 6 is movably supported at either end by tracks 12 positioned at either end of the opening 5. In one embodiment a drive 15 such as a rack and pinion is used to automatically slide the door 6 in tracks 12 between open and closed positions. Other mechanisms such as pneumatic or hydraulic cylinders, a rotary motor or the like may be used to open and close the door 6. Further, the door 6 may be hinged rather than sliding. The door may also be opened and closed manually. Sensors 16 such as limit switches, optical sensors, pressure sensitive switches or the like may be provided to detect if the door 6 is closed and to transmit a signal to the operating system indicating the door's status. The operating system may prevent operation of the SIS machine if the door 6 is not closed.

A platform 20 that supports the window covering during the measuring and cutting operations is provided in cutting chamber 8 adjacent to opening 5 such that a user can place a window covering on the platform 20 when the door 6 is open. The platform 20 comprises a substantially horizontal surface that is dimensioned to be able to receive and support a range of blind sizes.

In one embodiment, a separate access opening 22 is provided on one side wall 24 of housing 4 such that a blind may be loaded through access opening 22 into cutting chamber 8 from the end of the machine rather than through door 6.

Opening 22 is useful for window coverings that are longer than the length of the SIS machine. For example, opening 22 may be used to load the vanes of a vertical blind into the machine because such vanes may be manufactured in relatively long lengths that cannot be accommodated through opening 5. One end of the vanes can be inserted through the access opening 22 with the other end of the vanes extending from the housing 4 through opening 22. Alternatively a feed tube or other conveyor may be provided that communicates with opening 22 and allows the window covering to be inserted into the machine remotely. The ends of the vanes located in the cutting chamber 8 can then be cut to length as will hereinafter be described.

Referring to FIGS. 2, 5, 8 and 15-17, located along the front edge of the cutting chamber 8 adjacent to the front edge of platform 20 is a lateral support surface 28 that in the illustrated embodiment is defined by a plurality of rollers 26. The lateral support surface 28 facilitates the movement of the window covering across the platform 20 during the measuring and cutting operations. During the measuring and cutting operations, the window covering is pressed against the lateral support surface 28 and slid across the platform 20 as will hereinafter be described. The use of the rollers 26 facilitates the sliding movement of the window covering on platform 20. The rollers 26 may be eliminated and replaced by a stationary vertical wall where the window covering is pressed against and slides along the stationary wall. The wall may comprise a low friction surface. Further, another low friction device may be used in place of the rollers or wall if desired. For example, a movable belt, a plurality of bearings or other low friction surface or device may comprise the lateral support surface 28.

Referring to FIGS. 3, 4, 6, 8 10-12 and 14, located at either end of platform 20 are cutting devices such as saws 30 and 32 for cutting the window covering to the desired size. The saws 30 and 32 are substantially identical such that specific reference will be made to saw 30. Saw 30 comprises a saw motor 34 for rotating the arbor 38 on which the saw blade 36 is mounted. The motor 34 is connected to the saw arbor 38 via a transmission. The motor 34, transmission and arbor 38 are mounted on a platform 40 that is in turn supported on rails 42. The rails 42 support platform 40 such that platform 40 can reciprocate transversely to the platform 20 to bring the saw blade 36 into contact with a window covering supported on and extending over the end of platform 20. Platform 40 moves saw blade 36 through the window covering to cut the window covering. The saws may be replaced by other cutting devices.

For example, die cutters or lasers may be used to make the cut. Moreover, a combination of cutting devices may be used depending on the window covering material, material thickness or the like.

To move platform 40, a drive 43 is provided. Drive 43 may comprise a motor 44 that is supported on the platform 40 and that rotates a pinion 46 that engages a rack 48 mounted on frame 2. When the motor 44 is actuated, the pinion 46 is rotated and through its engagement with the rack 48 reciprocates platform 40 on rails 42 toward and away from the window covering.

In one embodiment, two saw blades 36 and 36a are provided with each of saws 30 and 32 to minimize routine maintenance of the machine. A saw blade has a limited life span such that after a predetermined amount of use the blade must be replaced. If only one saw blade is provided on each saw, more maintenance of the SIS machine is required. To minimize the routine maintenance of the SIS machine, two blades may be provided on each saw where the blades may be changed automatically.

Referring to FIGS. 3, 8, 12 and 14, in such a two blade arrangement, each saw comprises a motor 34 for driving arbors 38 and 38a that support blades 36 and 36a, respectively. The arbors 38 and 38a are mounted on a housing 50 such that blades 36 and 36a are supported in an overlapping relationship. Housing 50 can pivot on an axle 51 relative to the platform 40 about an axis parallel to the arbors 38 and 38a. The housing 50 is shown in a first orientation where blade 36 is positioned to cut a window covering and blade 36a is positioned as a replacement blade. The housing 50 is maintained in the illustrated position by a locking mechanism 56 that locks the housing 50 relative to the platform 40. In one embodiment the locking mechanism 56 comprises a retractable post where the post is extended from the platform 40 to engage a mating receptacle on the housing 50 to lock the housing 50 relative to the platform 40. To unlock the housing 50, the post 56 is retracted from the receptacle allowing the housing 50 to rotate on axle 51. A pair of stops 62 and 64 comprising bumpers 52 and 54 and sensors 58 and 60 ensure that the housing 50 assumes the correct orientation as will hereinafter be described. Sensors 58 and 60 may comprise limit switches, optical sensors, pressure sensitive switches or any other sensor capable of sensing the orientation of housing 50 and generating a signal indicative of the orientation. The stops 62 and 64 are movably mounted such that each stop can be extended from or retracted into the platform 40.

Figure 3:
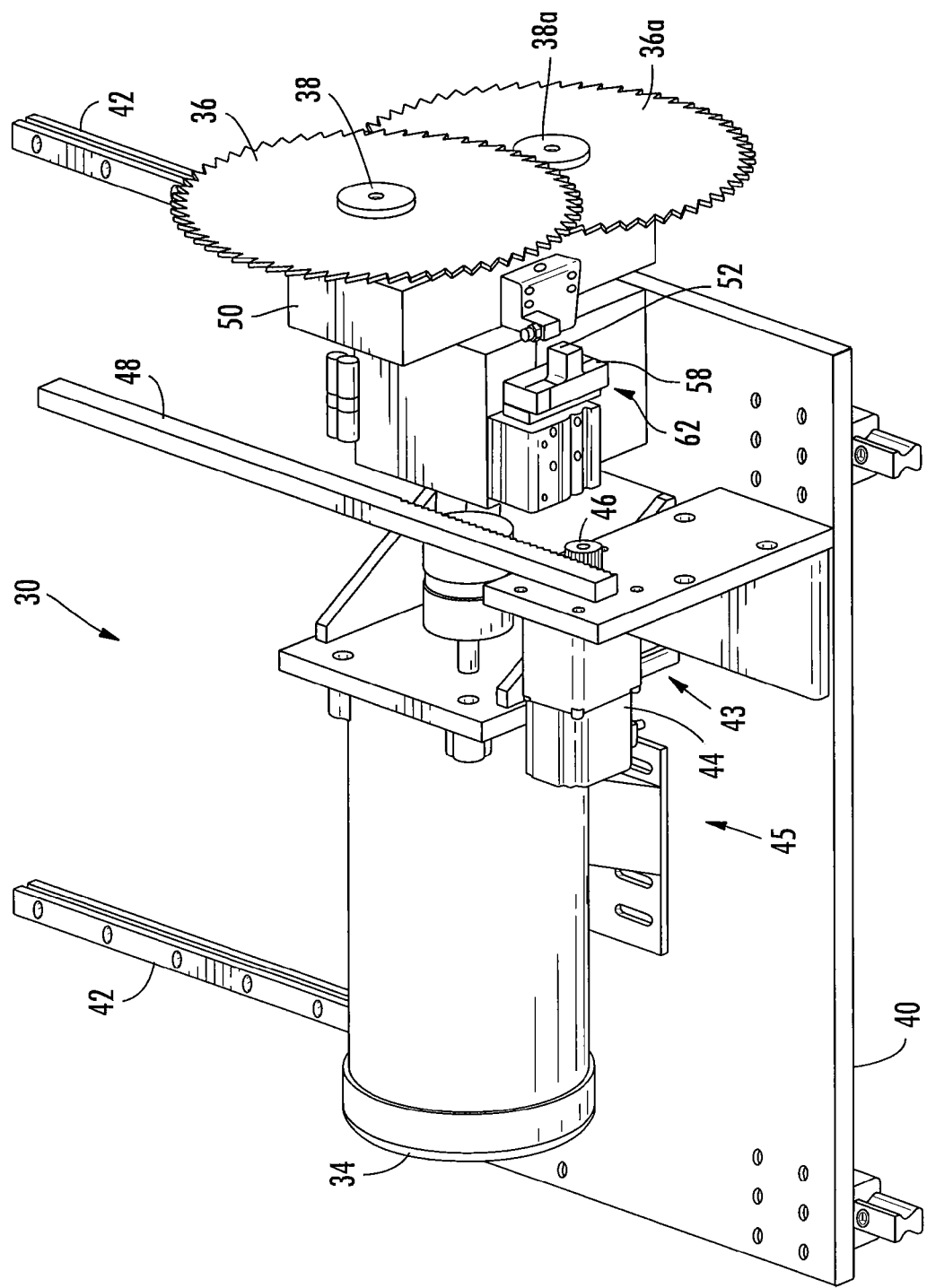
FIGS. 3 and 4 are perspective views of a saw used in the SIS machine of FIG. 1.
Figure 4:
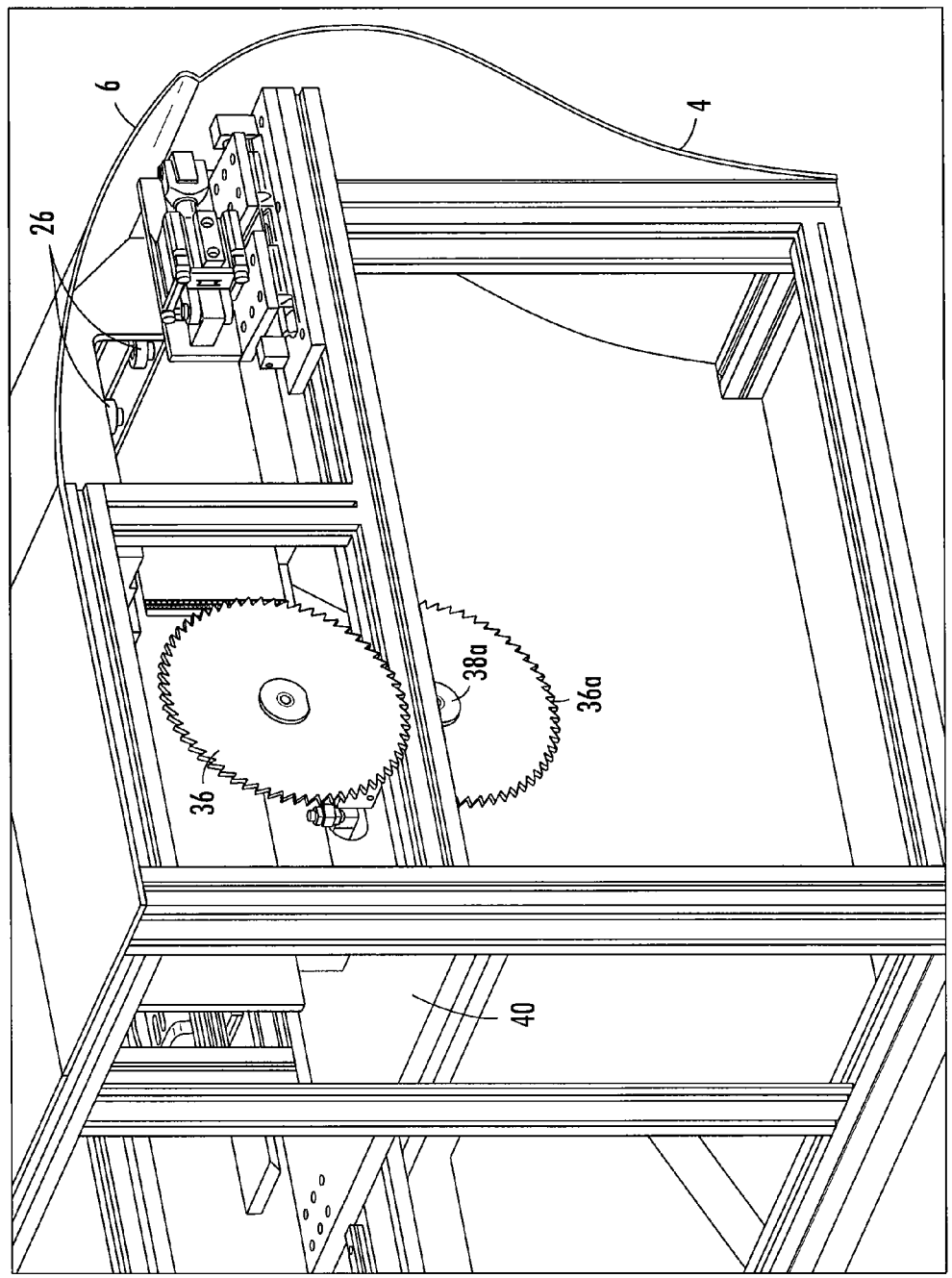
Figure 5:
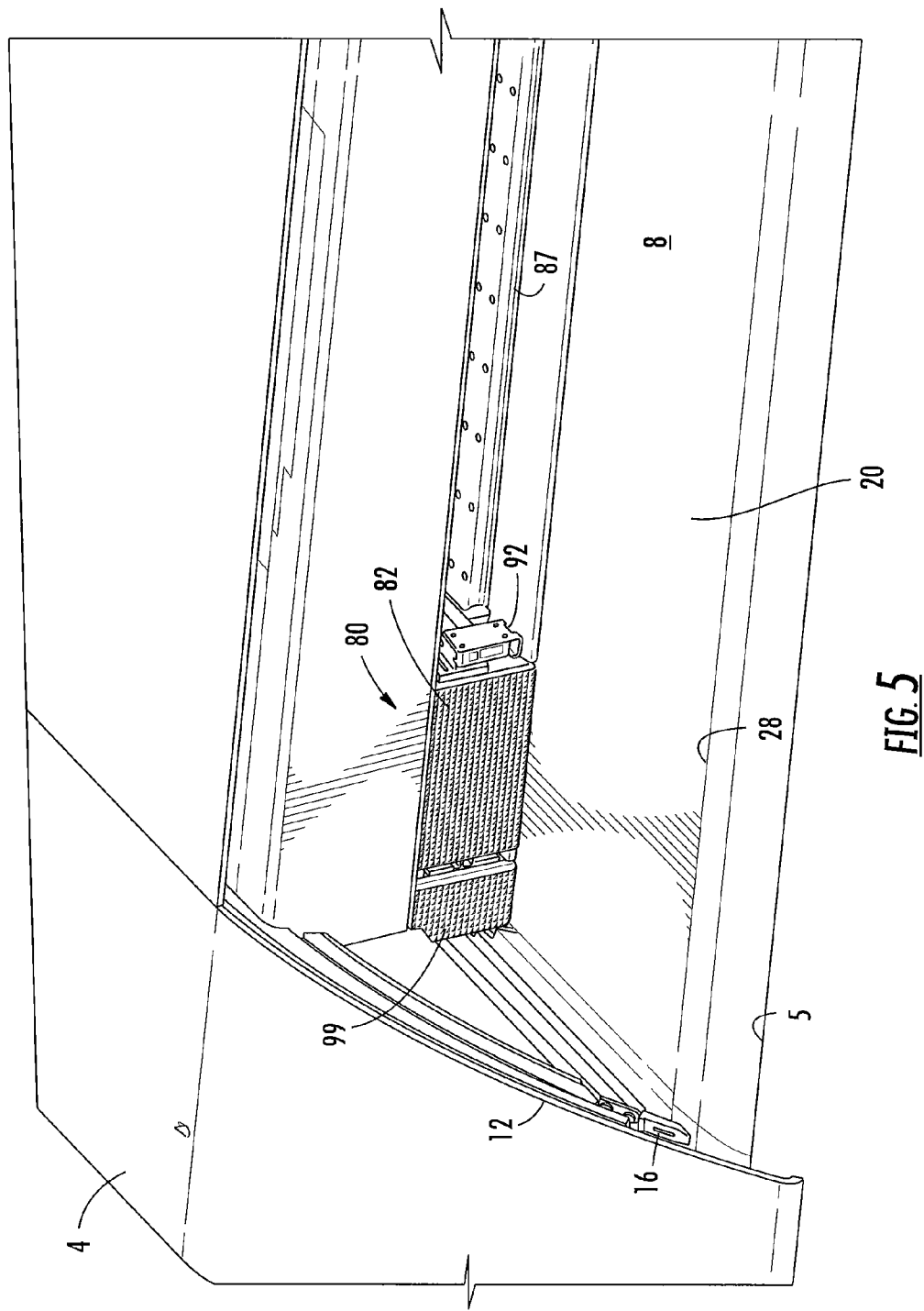
FIG. 5 is a perspective view showing details of the SIS machine of FIG. 1.
Figure 6:
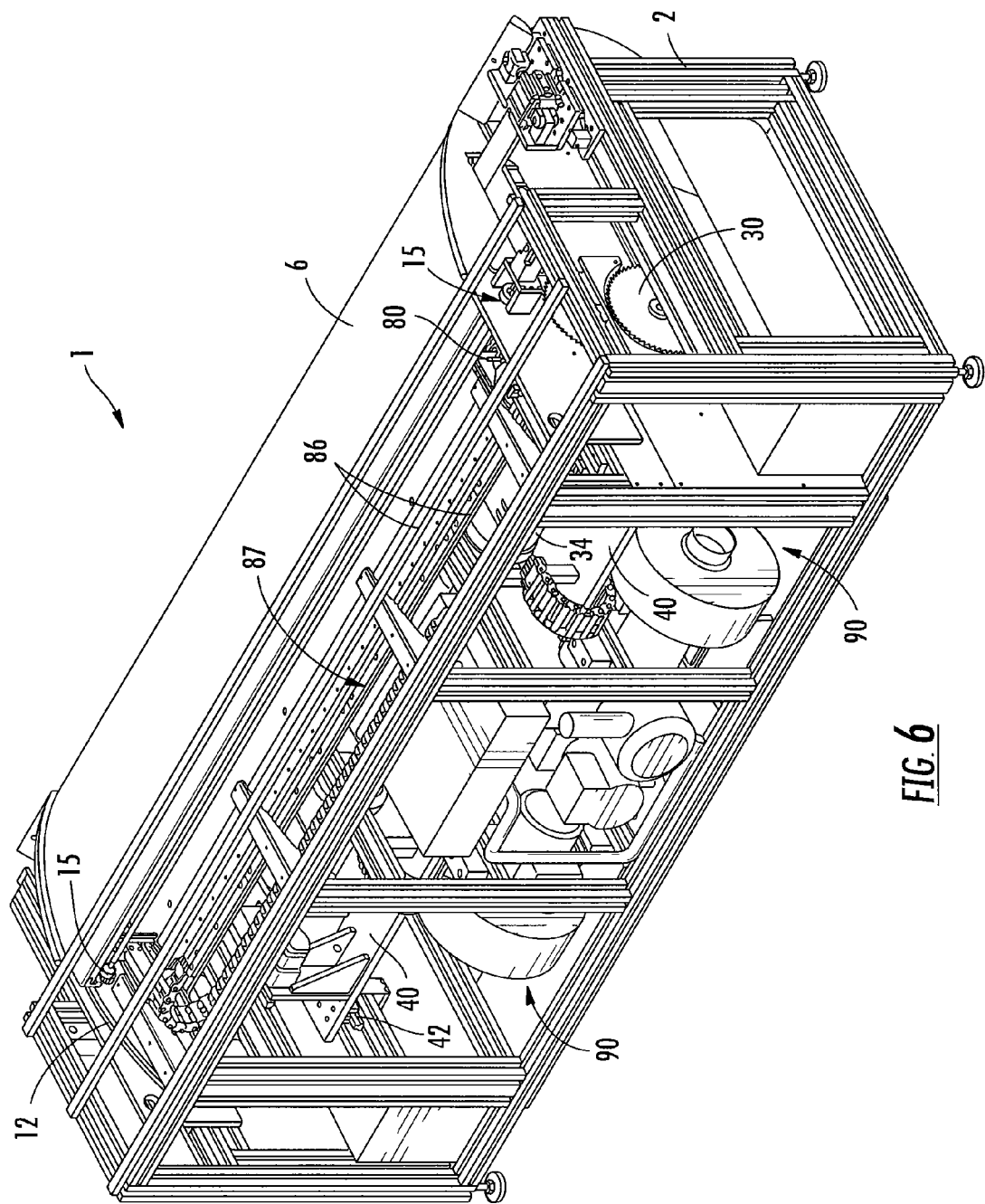
FIGS. 6 and 7 are perspective back views of the embodiment of the SIS machine of FIG. 1 with the outer casing removed.
Figure 7:
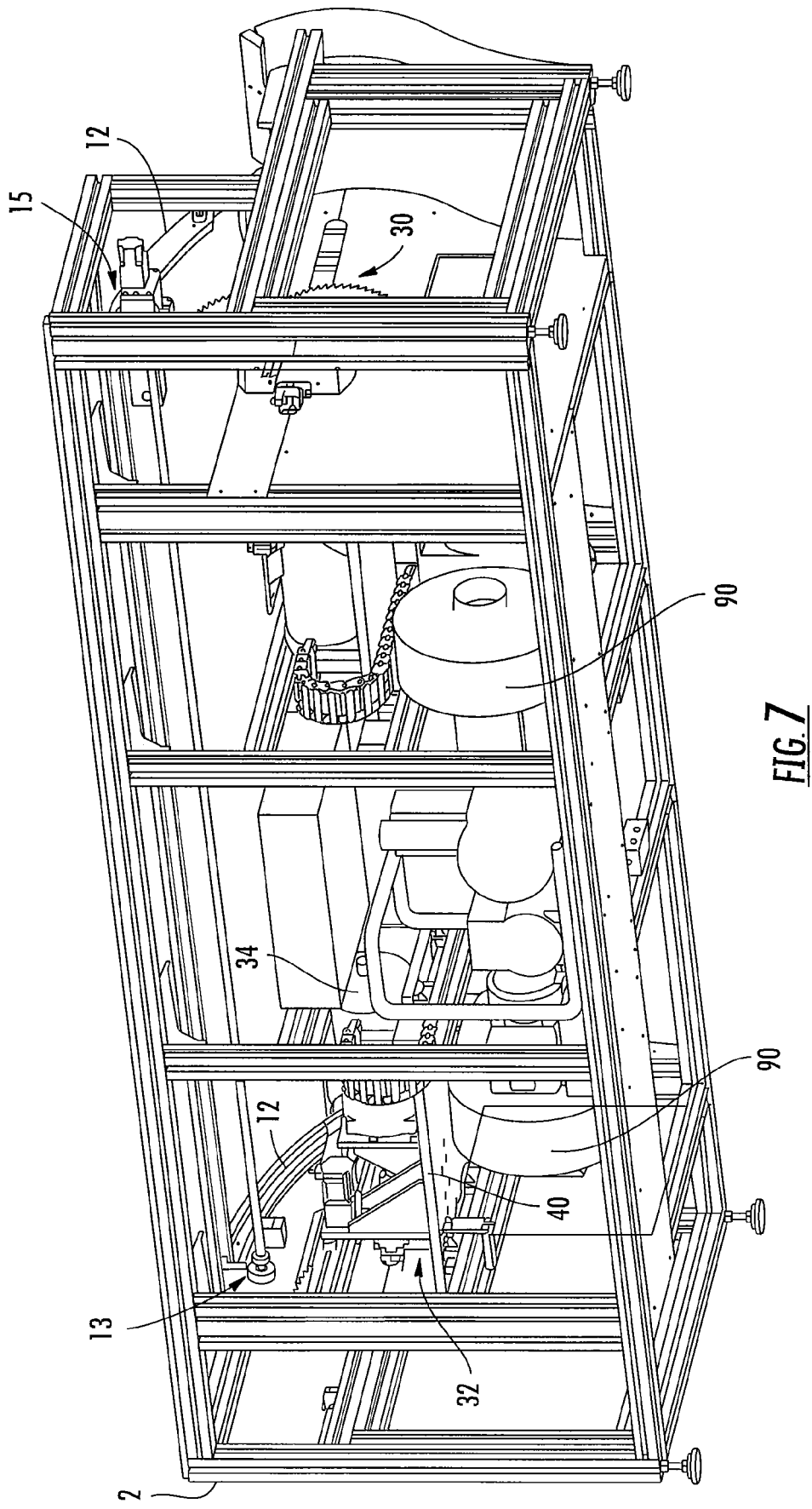
Figure 8:
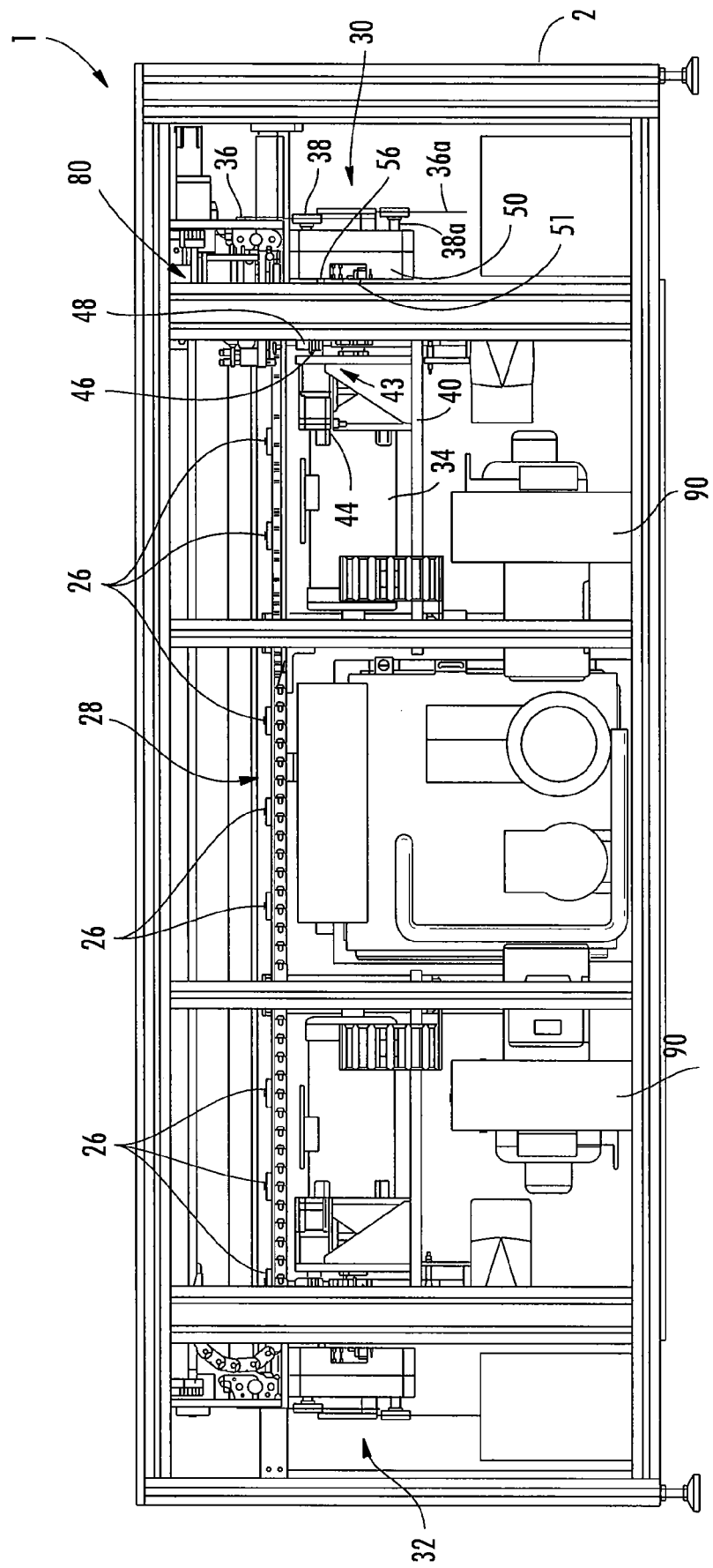
FIG. 8 is a back view of the embodiment of the SIS machine of FIG. 1 with the outer casing removed.
Figure 9:
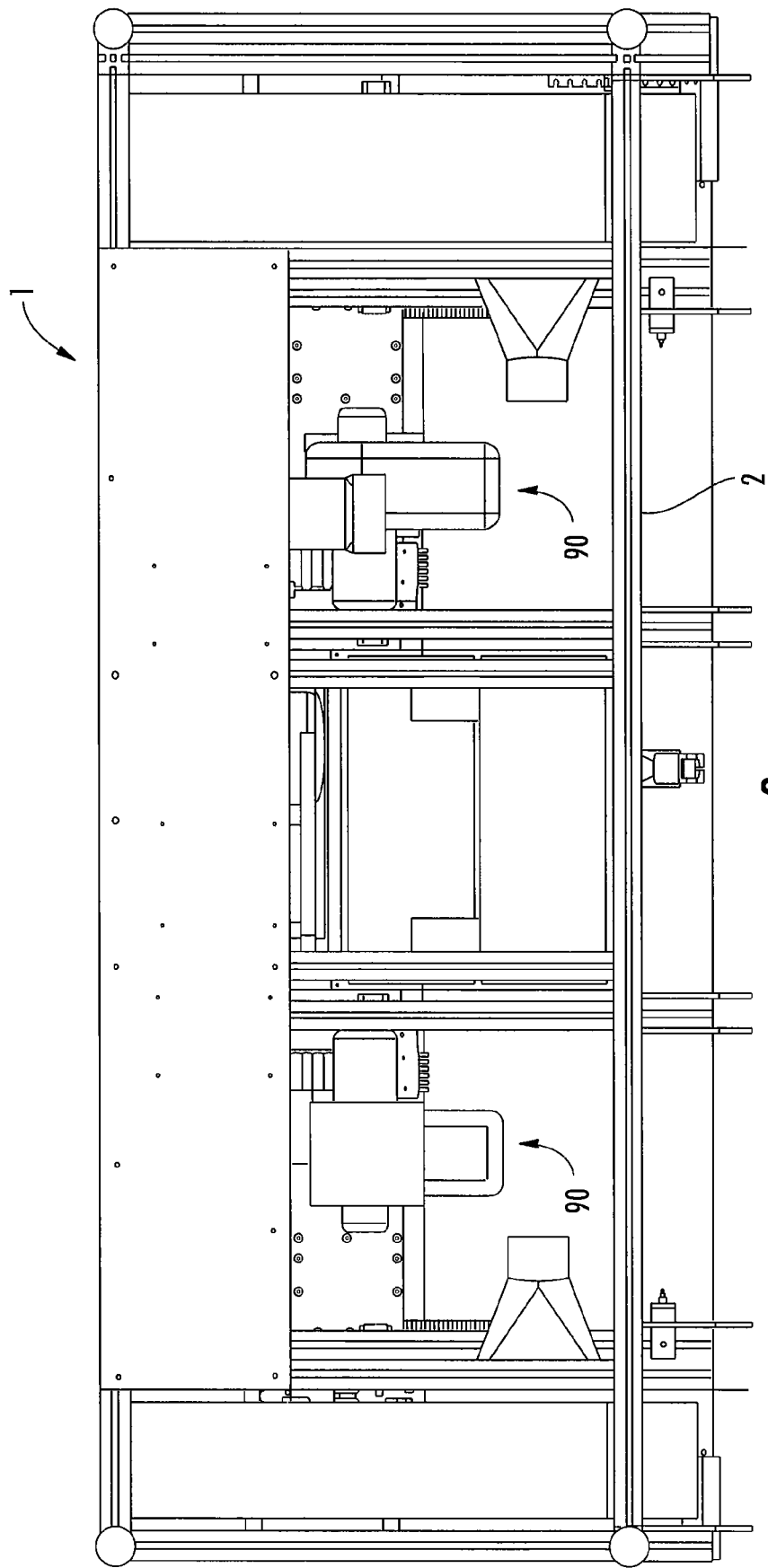
FIG. 9 is a bottom view of the embodiment of the SIS machine of FIG. 1 with the outer casing removed.
Figure 10:
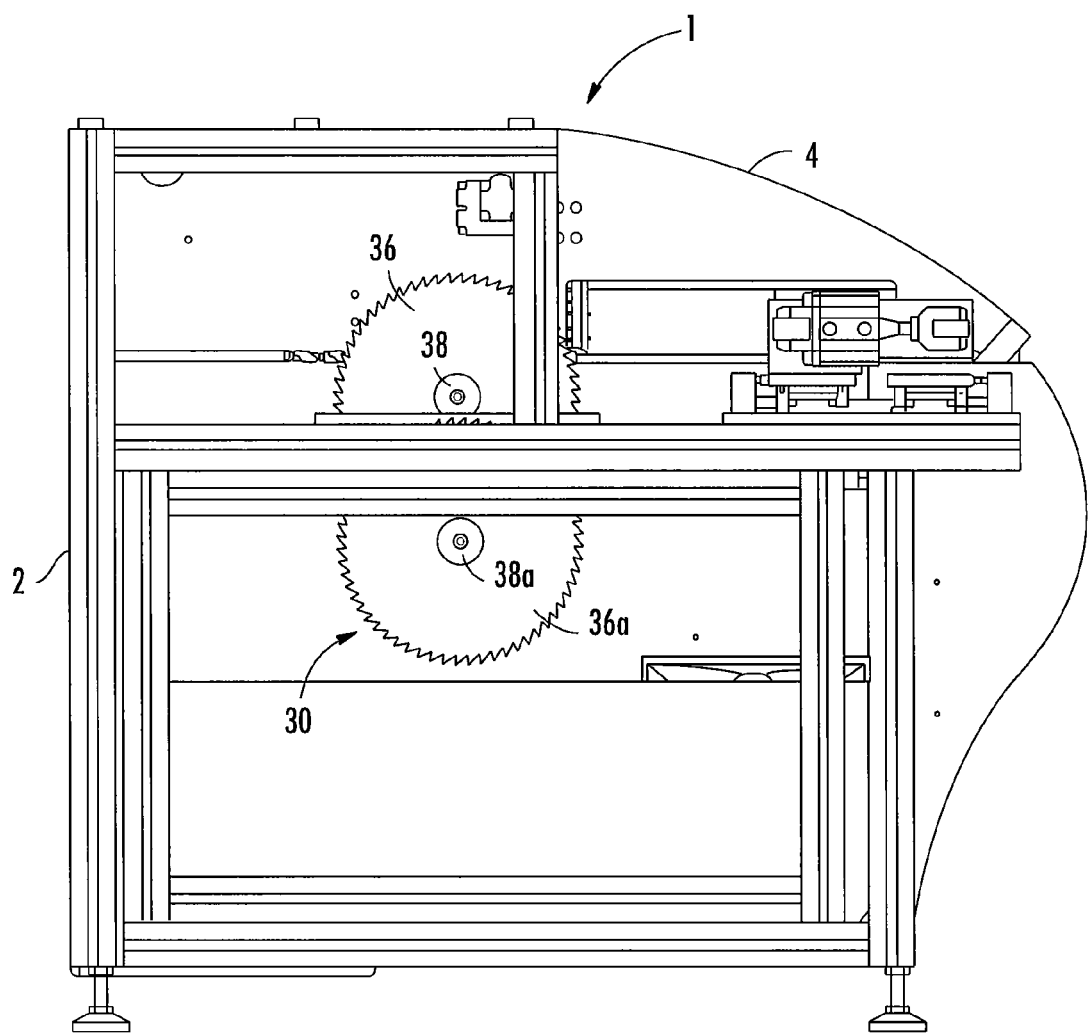
FIG. 10 is a left side view of the embodiment of the SIS machine of FIG. 1 with the outer casing removed.
Figure 11:
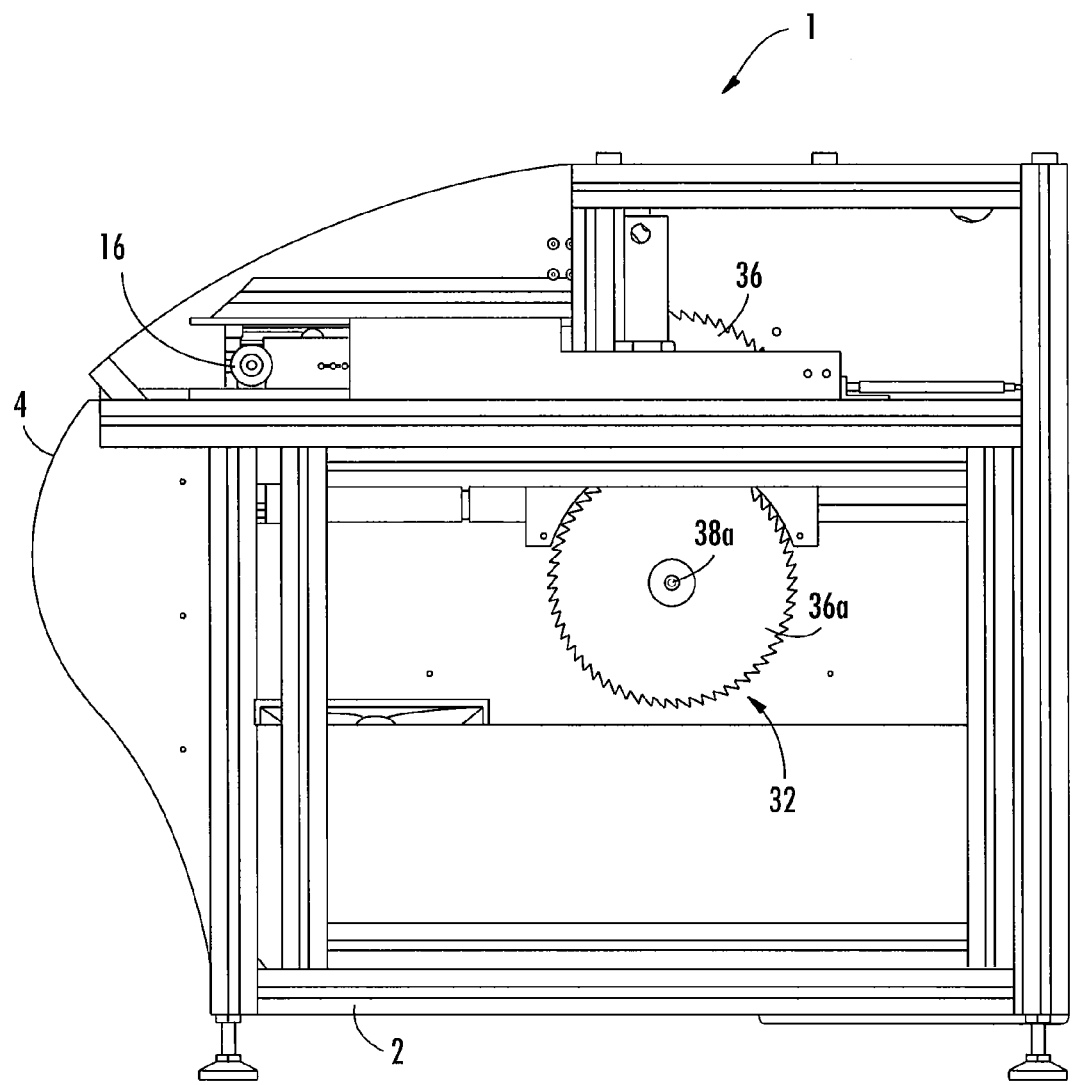
FIG. 11 is a right side view of the embodiment of the SIS machine of FIG. 1 with the outer casing removed.
Figure 12:
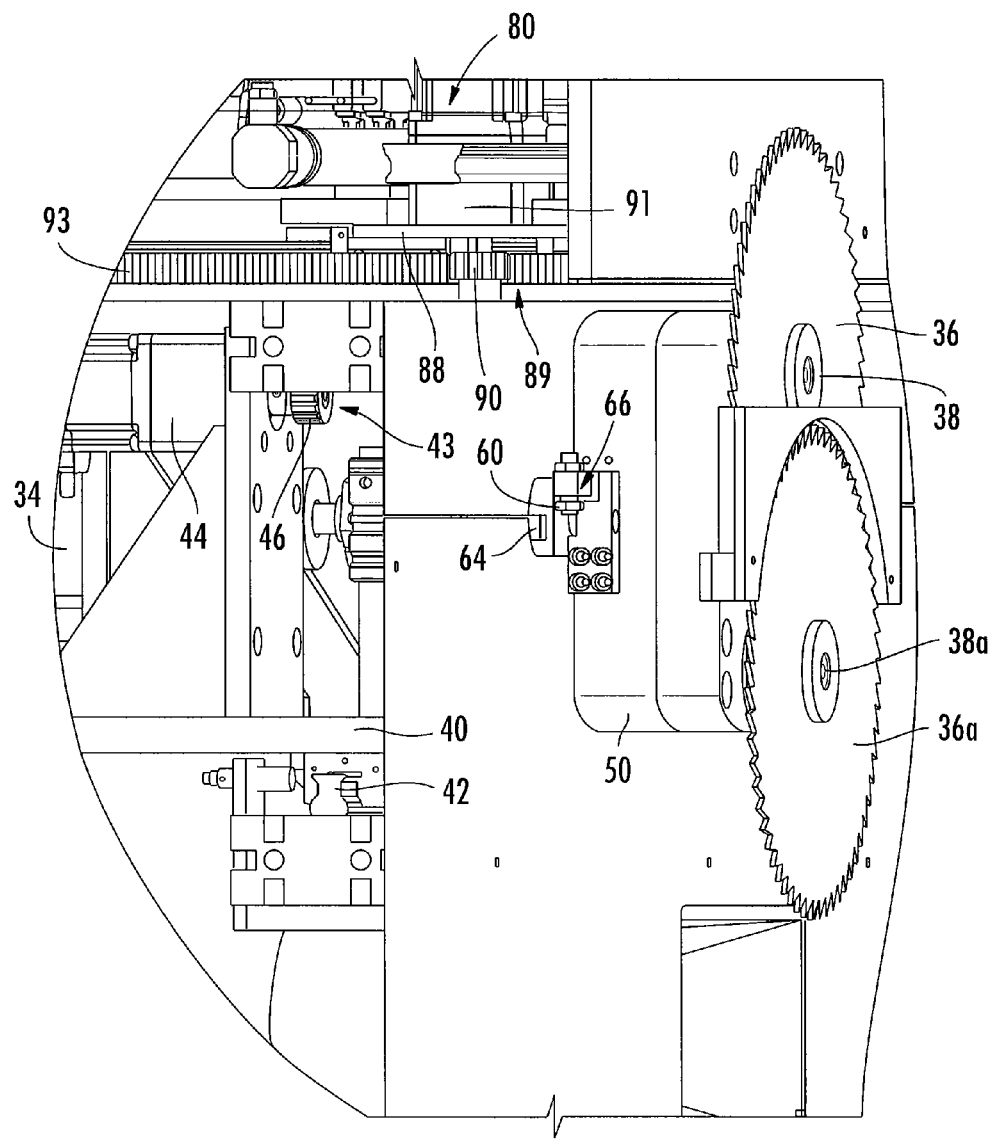
FIG. 12 is a perspective view of a saw of the embodiment of the SIS machine of FIG. 1.
Figure 13:
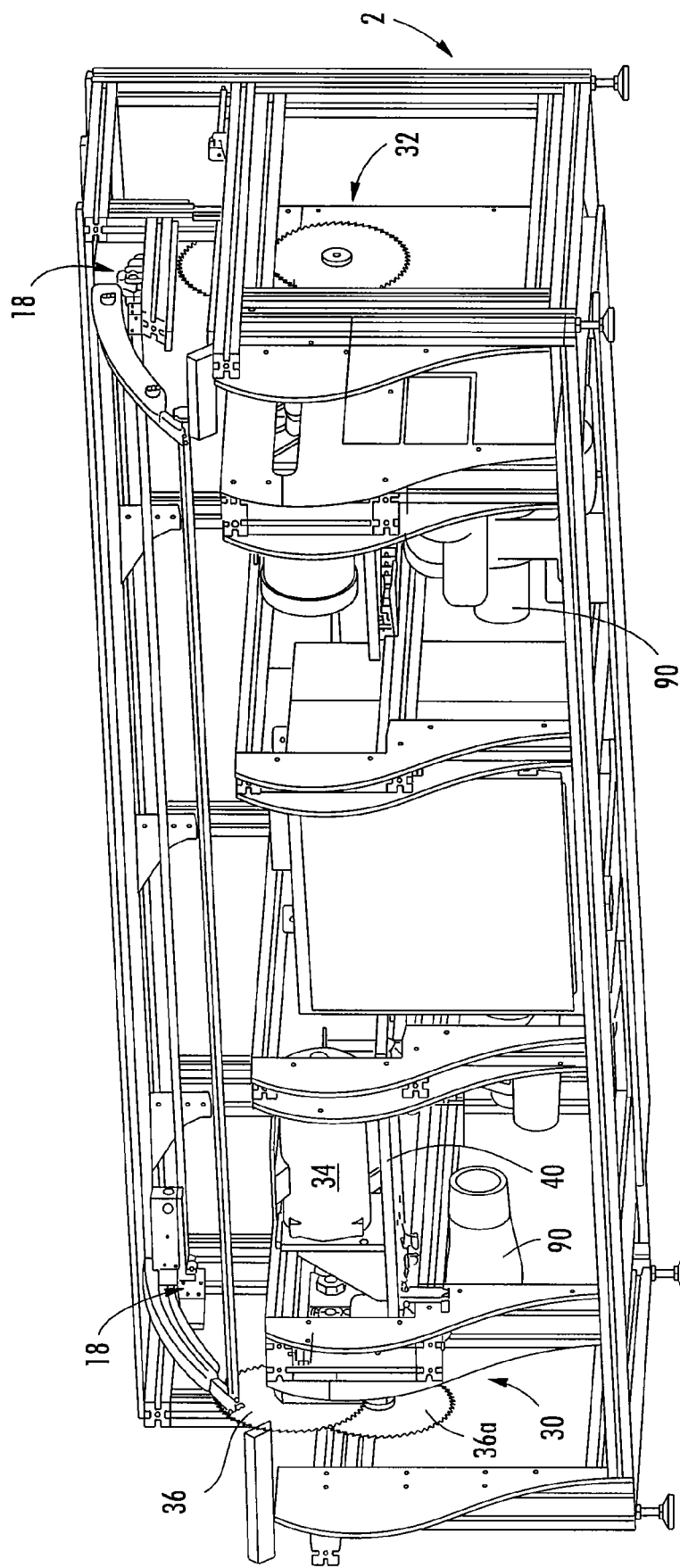
FIG. 13 is a perspective front view of the SIS machine of FIG. 1 with the casing removed.
Figure 14:
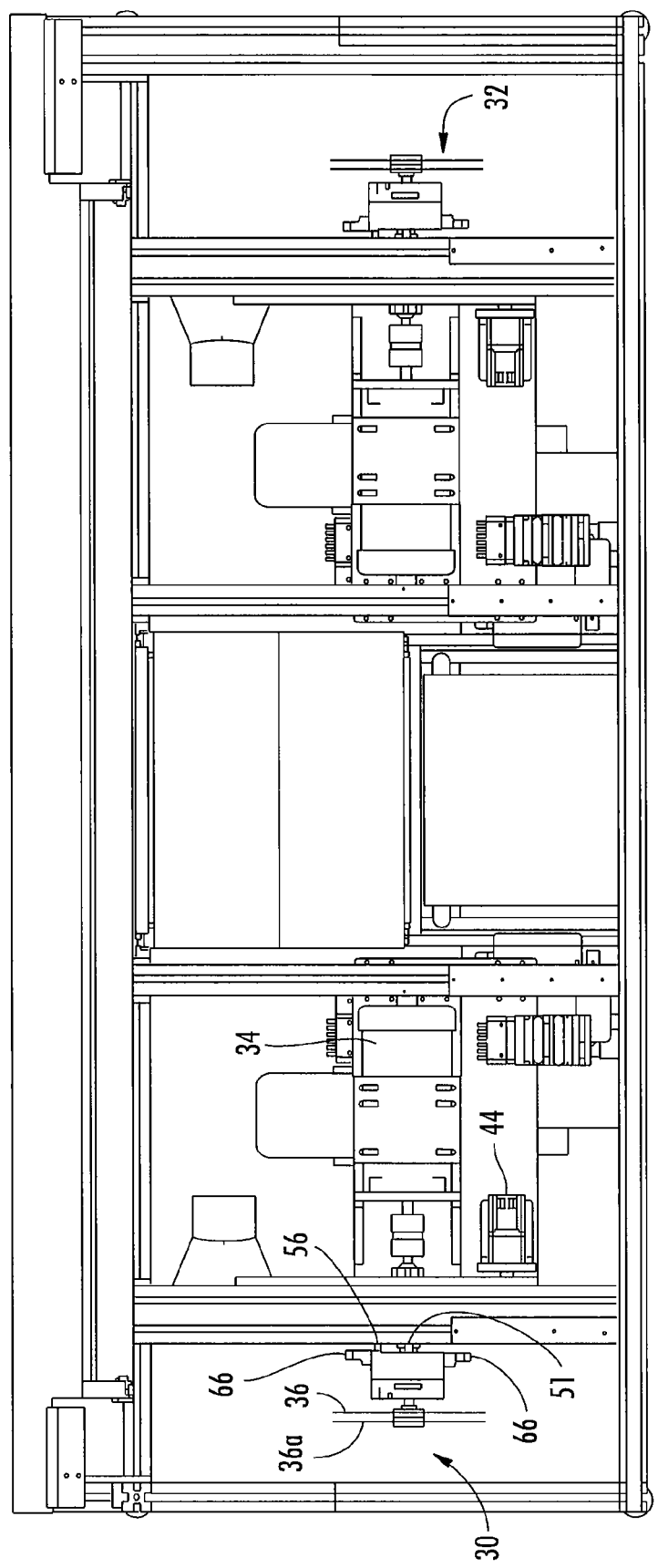
FIG. 14 is a top view of the SIS machine of FIG. 1 with the cutting chamber removed.
Figure 15:
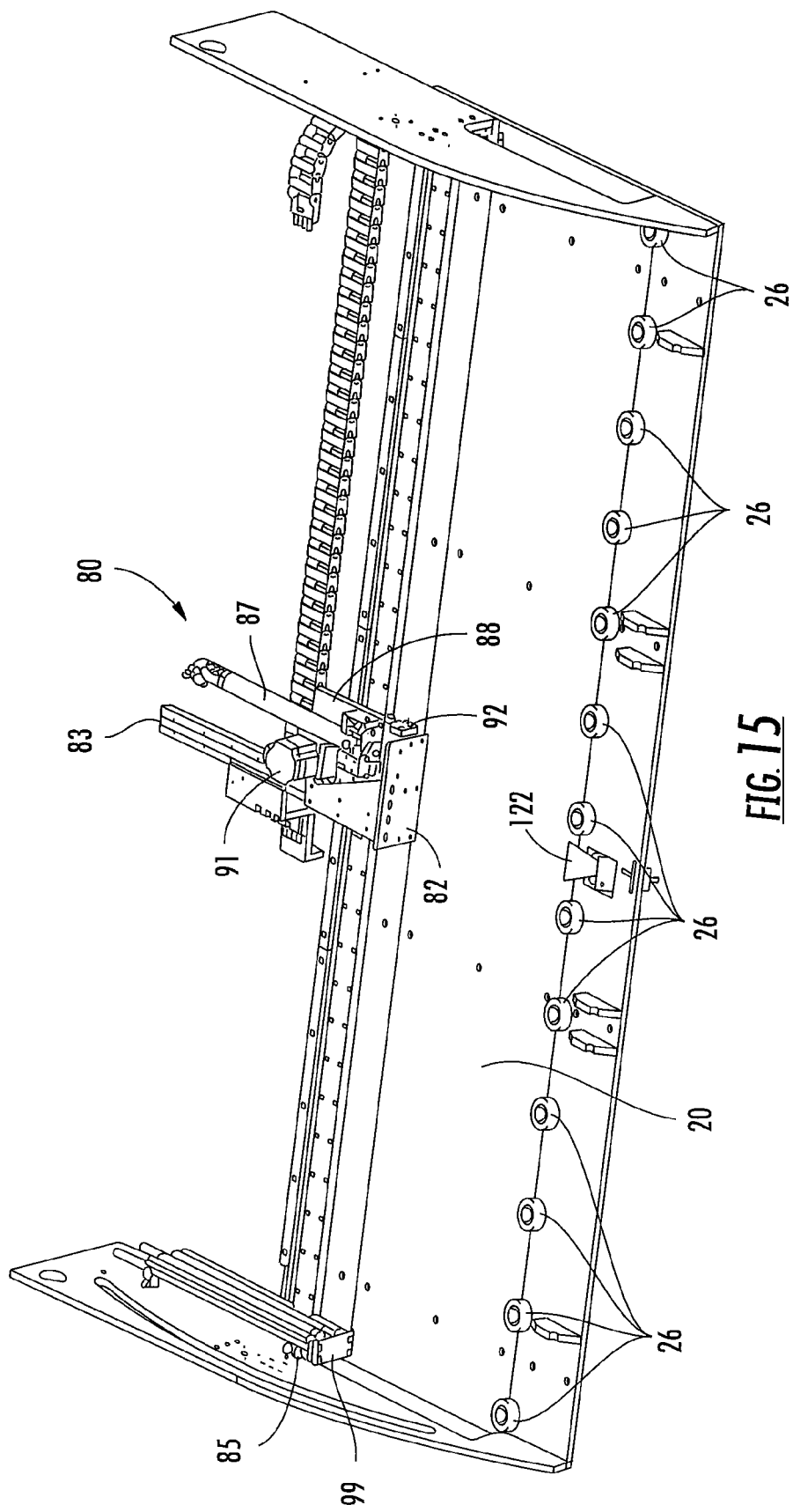
FIGS. 15-17 are perspective views of an embodiment of the clamp assembly used in the SIS machine of FIG. 1.
Figure 16:
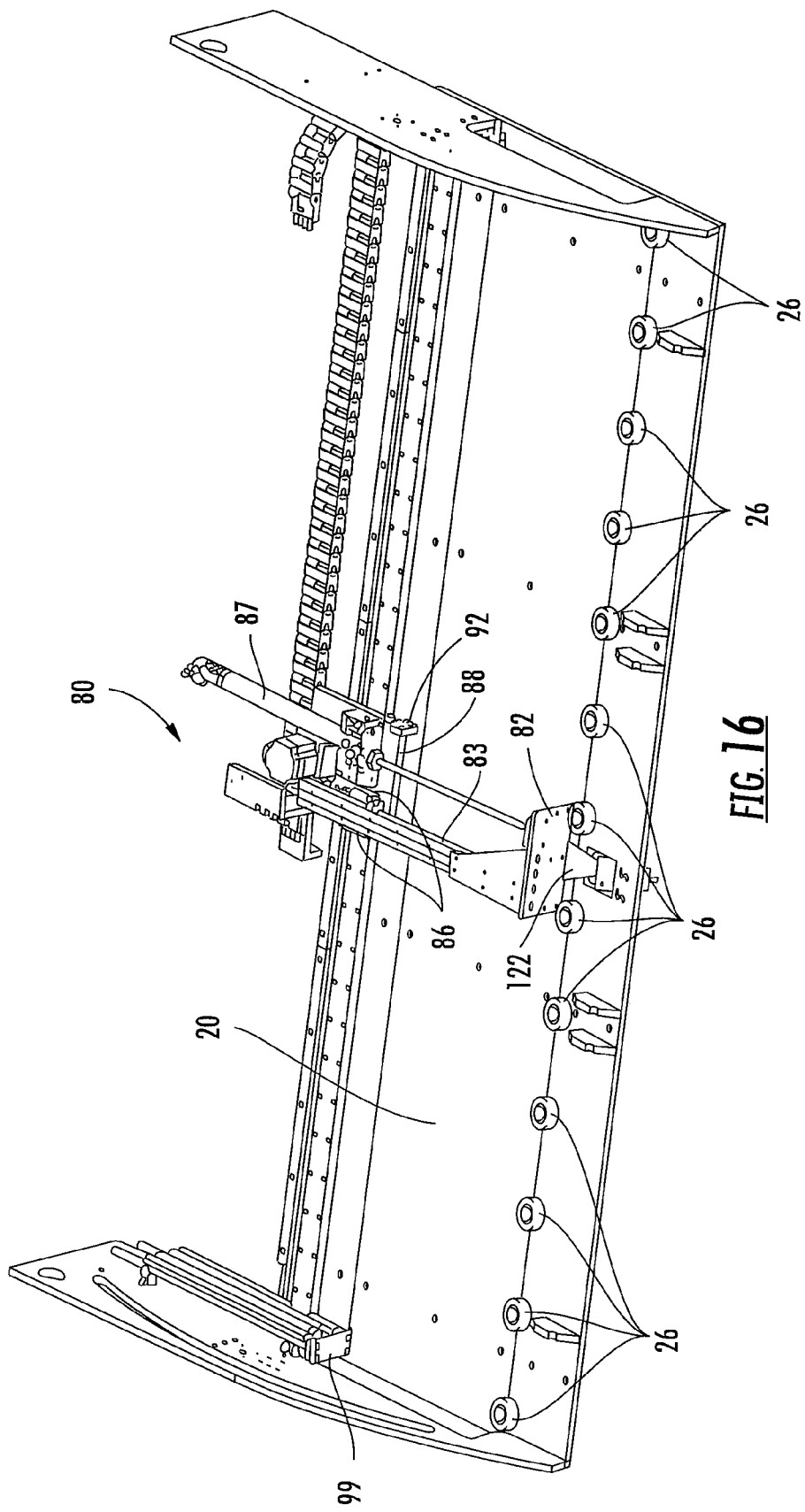

To explain the operation of the saw assembly, assume that the blades 36 and 36a and housing 50 are initially oriented as shown in FIGS. 3 and 12. Blade 36 cuts the window coverings as will hereinafter be described. Each cut is counted and the total number of cuts is stored in the memory of the operating system. When the total number of cuts equals a predetermined maximum number of cuts, blade 36 is replaced. The predetermined maximum number of cuts will depend on the blade construction and the material being cut, however, the predetermined maximum number of cuts is preferably selected such that the blade is replaced before wear on the blade degrades its cutting performance. When the total number of actual cuts equals the predetermined number of cuts, the locking mechanism 56 is withdrawn from the housing 50 thereby allowing the housing to freely rotate relative to platform 40. Simultaneously with the unlocking of the housing 50, the first stop 62 is retracted into housing 50 and the second stop 64 is extended from housing 50. The saw blades 36 and 36a, spinning on arbors 38 and 38a, create enough inertia that the housing 50 rotates on the support axle 51 when the locking mechanism 56 is retracted without the use of any other drive mechanism. The housing 50 rotates until a flange 66 on the housing contacts stop 64. In this position, the saw blade housing 50 has rotated 180 degrees and is oriented such that the second blade 36a is positioned to cut the window covering and the first saw blade 36 is in the reserve position. Sensor 60, associated with stop 64, produces a signal indicating that housing 50 has rotated to the new position. The signal from sensor 60 is transmitted to the CPU and the locking mechanism 56 is actuated to lock housing 50 in the new position. The total number of cuts are counted and maintained in memory for the new blade 36a. Both blades 36 and 36a may be replaced during a single service visit when the second blade reaches a predetermined maximum number of cuts.

Because the saw blades are positioned in an overlapping relationship, the operating system that controls the measuring and cutting operations must be informed as to which blade is in the cutting position. The sensors 58 and 60 associated with the stops 62 and 64 provide this information to the operating system by transmitting a signal to the CPU when the housing 50 contacts the stop. The operating system then adjusts the measuring and cutting operations to account for the difference in saw blade positions.

In an alternate embodiment, the saw blades 36 and 36a are positioned such that the blades are in the same cutting plane. In such an arrangement the operating system does not adjust the cutting operation based on which blade is being used. However, such an arrangement requires additional space because the coplanar blades require more room than the overlapping blades shown in the drawings. In either arrangement the sensors 58 and 60 associated with the stops 62 and 64 may be used to provide feed back to the CPU that the blades are properly positioned.

Referring to FIGS. 5, 12 and 15-18, a clamp assembly 80 is provided that comprises a clamping jaw 82 that can be extended and retracted to trap a window covering against the lateral supporting surface 28. Jaw 82 is supported for reciprocating linear movement on a bar 83 that rides on rails 86 where jaw 82 is moved over the rails 86 by a drive 87 such as a pneumatic cylinder, electric motor, solenoid, hydraulic cylinder or the like. The drive 87 may also comprise a rack and pinion or ball screw drive or the like. The jaw 82 may be extended to clamp a window covering against the lateral supporting surface 28 and retracted to release the window covering.

The clamp assembly 80 is mounted on a carriage 88 that is mounted on a linear drive 89 such as a ball screw drive or rack and pinion. Rotation of pinion 90 engages rack 93 to reciprocate the carriage 88 along the length of platform 20. In one embodiment the pinion 90 is rotated by a servomotor 91 such that the position of the carriage 88 and clamp assembly 80 along the platform 20 can be controlled with great accuracy. Each rotation of the servomotor 90 translates into a predetermined length of linear travel of the clamp assembly 80 along the platform 20. The rotation of the servomotor 91 can be precisely controlled to precisely control the linear motion of the clamp assembly 80 and its position along platform 20. In one embodiment, the carriage 88 supports sensor 92 such as an optical sensor. In one embodiment sensor 92 is used to measure and position the window covering relative to the saws 36 and 36a as will hereinafter be described.

Figure 18:
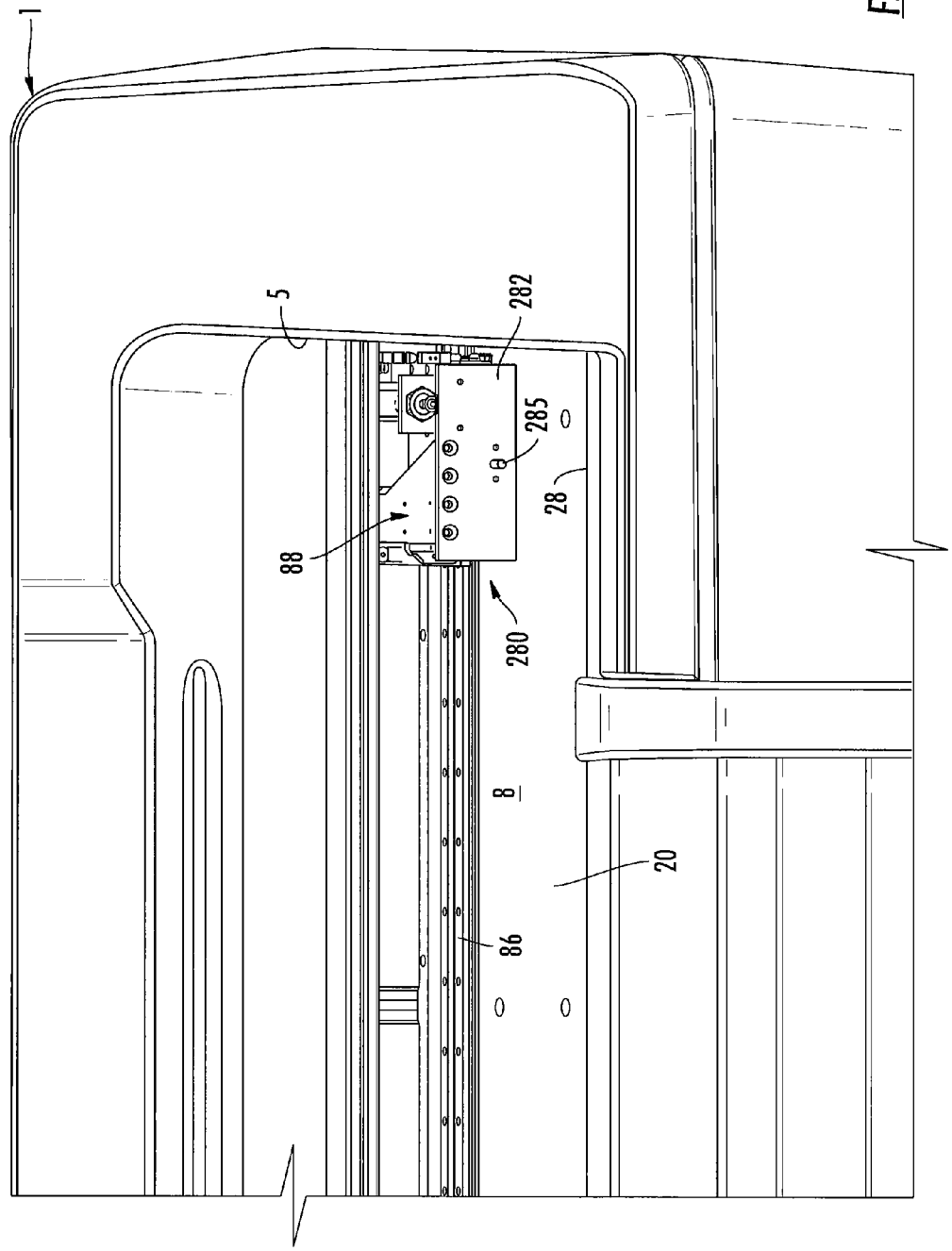
FIG. 18 is a perspective view showing an alternate embodiment of the clamp assembly used in the SIS machine of FIG. 1.

An alternate embodiment of the clamp assembly is shown in FIG. 18 at 280 that is similar to clamping jaw 80 as previously described. Clamp assembly 280 is provided that comprises a clamping jaw 282 that can be extended and retracted to trap a window covering against the lateral supporting surface 28. Jaw 282 is supported for reciprocating linear movement as previously described. The jaw 282 may be extended to clamp a window covering against the lateral supporting surface 28 and retracted to release the window covering as previously described. The clamp assembly 280 is mounted on a carriage 88 that is mounted on a linear drive as previously described to reciprocate the carriage 88 along the length of platform 20.

Figure 23A:
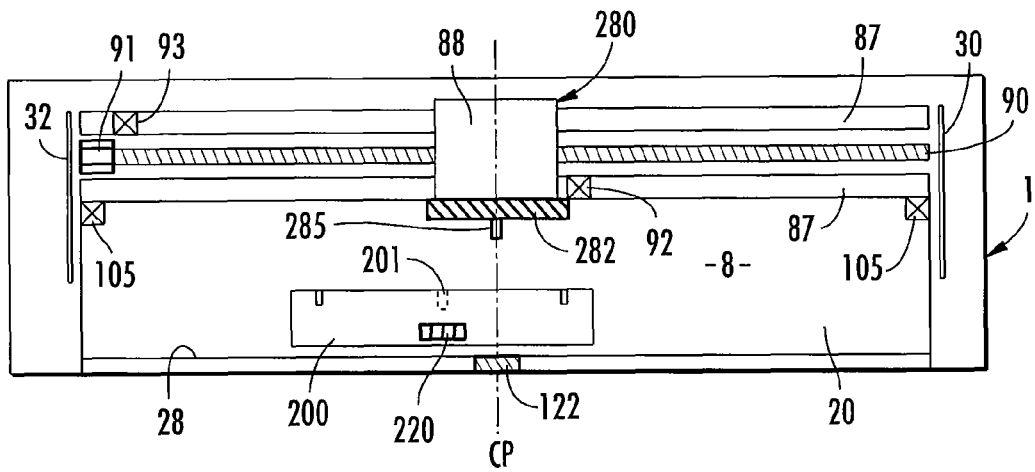
FIGS. 23A and 23B are views showing another embodiment of the positioning and cutting operations.
Figure 23B:
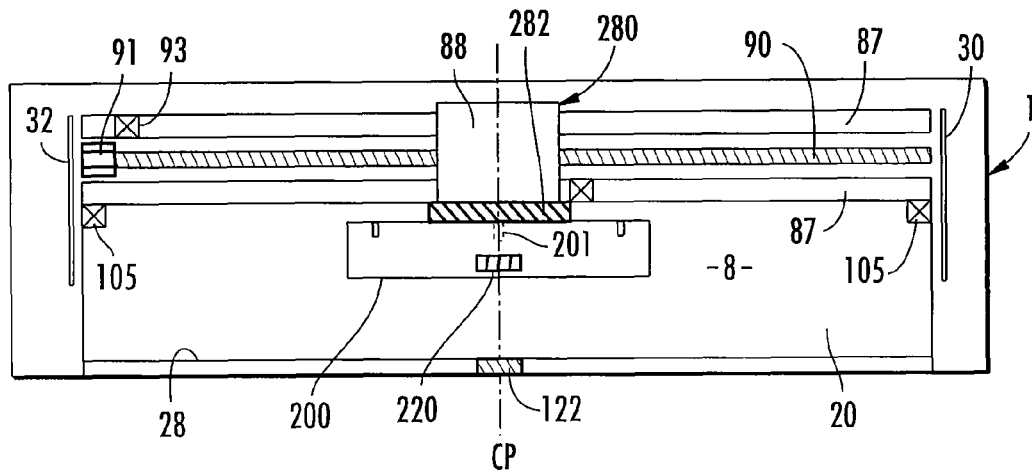

In order to position the window covering relative to the clamping jaw 282, clamping jaw 282 is provided with a physical engagement member such as pin 285. The position of the pin 285 relative to the clamping jaw 282 is known. For example pin 285 may be located in the center of clamping jaw 282. The window covering and package are provided with a hole 201 located on the window covering 200 (FIGS. 23A and 23B). The window covering 200 is inserted into the SIS machine and placed on platform 20 such that the pin 285 is inserted into the hole 201 in the window covering. As a result, the position of the window covering 200 relative to the clamping jaw 282 is known. In one embodiment the hole in the window covering is located at the center of the window covering such that the pin locates the center of the window covering such that the center of the window covering is known to the SIS machine. Where the pin 285 is located on the center of the clamping jaw 282, the clamping jaw 282 is also aligned with the center of the window covering.

The various sensors described herein transmit signals to the CPU of the system operating system to control operation of the SIS machine. Further, the various drives described herein are controlled by the CPU to position and cut the window covering. The CPU may be located in the machine 1 or it may be located remotely from the machine.

Figure 19:
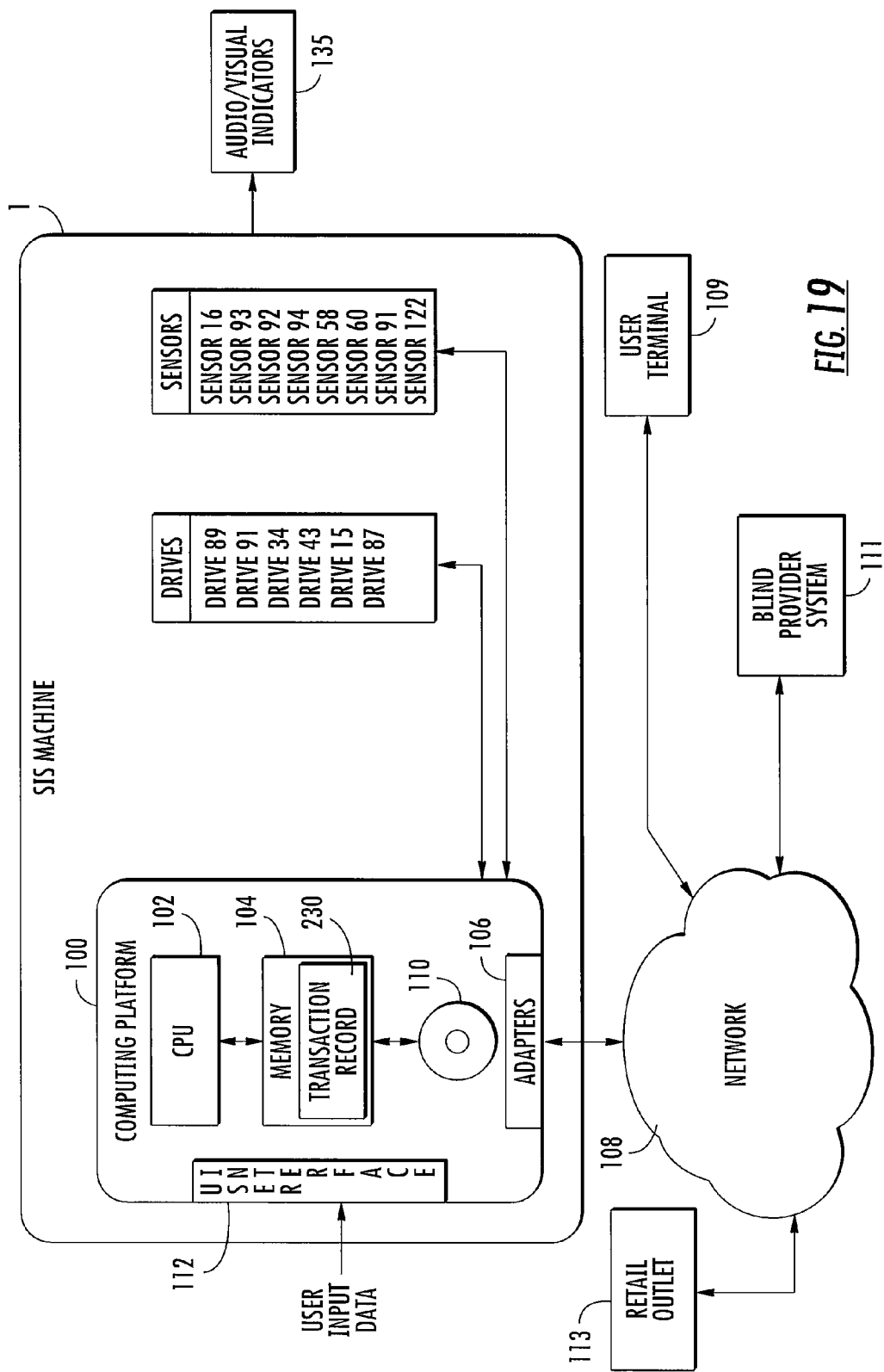
FIG. 19 is a block diagram of the operating system of the SIS machine.

Referring to FIG. 19, one embodiment of the operating system of the SIS machine 1 includes a computing platform 100. The platform is controlled by a processor 102 which serves as the central processing unit (CPU) for the platform. Memory 104 is typically divided into multiple types of memory or memory areas such as read-only memory (ROM), and random access memory (RAM). A plurality of general-purpose adapters, 106 are present. At least one, in this example, serves to connect the computing platform to a network 108. The network might be a corporate intranet, a local area network (LAN), the public switched telephone network, a wireless network, the internet or a combination of such networks.

Computer program code instructions for implementing the appropriate applications and controlling the SIS machine are stored on the fixed medium 110. When the system is operating, the instructions are partially loaded into memory 104 and executed by the CPU 102. Numerous types of general purpose computer systems and workstations are available and can be used to implement computing platform 100. Available systems include those that run operating systems such as Windows™ by Microsoft, various versions of UNIX™, various versions of Linux™, and various versions of Apple's Mac™ OS. A user interface 112 such as a touch screen and/or audio speakers is provided to receive input from the user and to display output to the user. Other user interface devices may be used such as voice recognition, wireless communication technology, joy sticks, video displays, monitors, keyboards, thumbwheels or the like. User interface 112 is intended to include any apparatus that allows the user to input data to the system and/or that allows the system to display information to the user.

The entire function of the invention, including the common database can be implemented in whole or in part on a single computing platform like that shown in FIG. 19. In other embodiments, however, a common database may be stored on a database server such as an SQL server. Processor 120, adapters 122, and memory 124 function similarly to those of computing platform 100. If a corporate intranet is used for connectivity, the applications or modules on computing platform 100 can be accessed from a client workstation via a web page.

A computer program which implements parts of the invention through the use of a system like that illustrated in FIG. 19 can take the form of a computer program residing on a computer usable or computer readable tangible storage medium such as a diskette. A computer program product containing the program of instructions can be supplied in such a form, and loaded on the machines involved, either directly, or over a network. The medium may also be a stream of information being retrieved when the computer program product is "downloaded" through the Internet. The computer programs can reside on any medium that can contain, store, communicate, propagate, or transport the program for use by or in connection with an instruction execution system, apparatus, or device. The computer-usable or computer-readable medium may be, for example but not limited to, an electronic, magnetic, optical, electromagnetic, infrared, or semiconductor system, apparatus, device, or propagation medium. Other examples of a tangible computer-readable medium would include a portable computer diskette or portable fixed disk, an optical fiber, a compact disc read-only memory (CD-ROM), and a digital versatile disc read-only memory (DVD-ROM).

Figure 20:
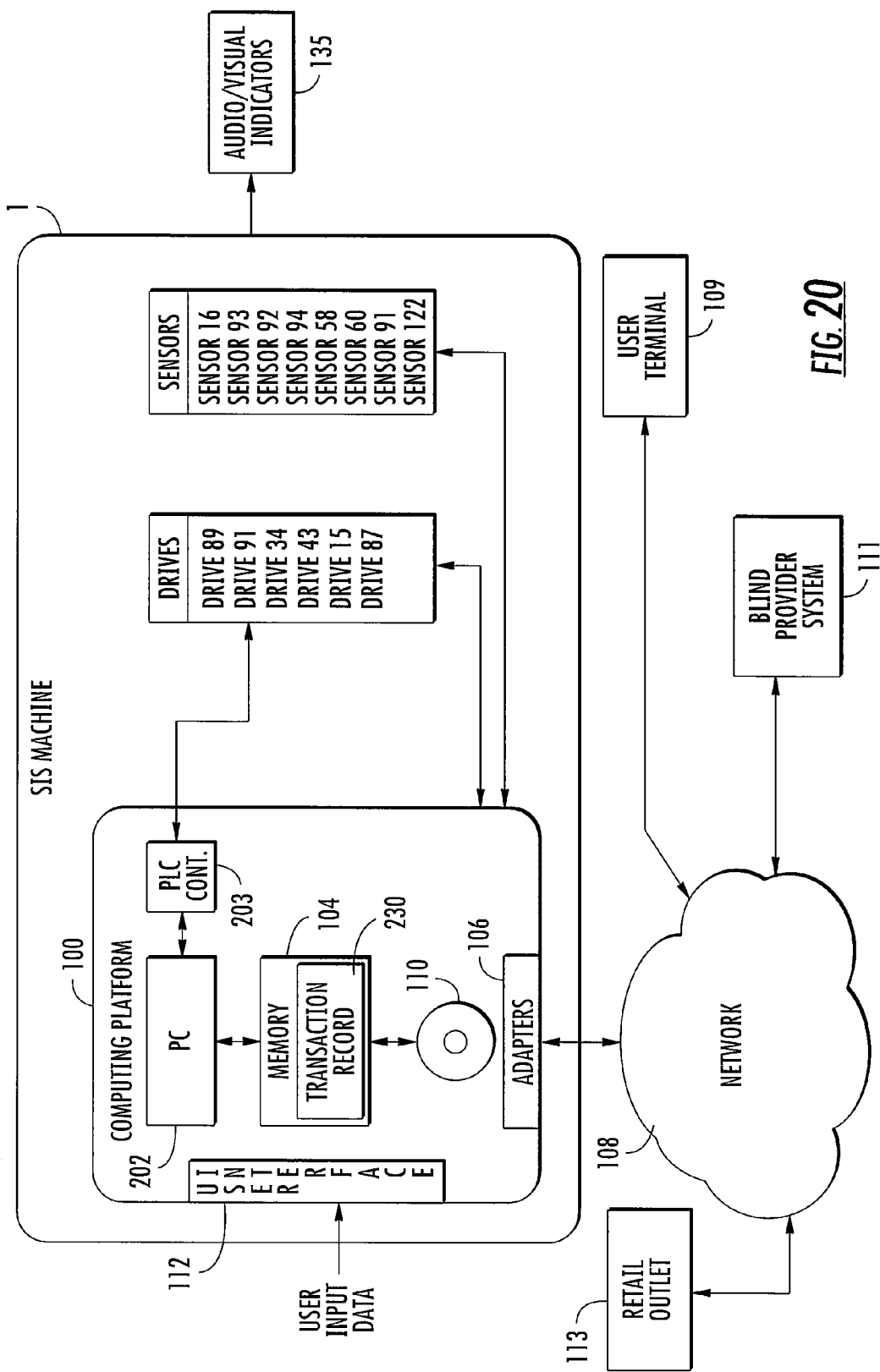
FIG. 20 is a block diagram of another embodiment of the operating system of the SIS machine.

In the embodiment of FIG. 20 a processor 202 in the form of a PC and a separate PLC controller 203 associated with the drive 91 of clamp assembly 89 are used to control operation of the SIS machine to position and cut the window covering. The system of FIG. 20 is otherwise the same as the system of FIG. 19.

Operation of the SIS machine will now be described. When the machine is first powered up, the center position CP of the clamp assembly 80 relative to the cutting devices such as saws 30 and 32 must be determined. The center position CP is the point mid-way between the active blades of the two saws 30 and 32 and is shown, for example, in FIG. 21. To determine the center position, the clamp assembly 80 is moved along the platform 20 in a first direction until the clamp reaches the end of travel. The end of travel may be identified by a sensor 105 such as limit switch, optical sensor or the like. The sensor 92 mounted on the clamp assembly 80 may also be used for this function. A signal from the appropriate sensor is provided to the CPU 102 indicating that the clamp has reached the end of travel. The CPU then sends a signal to drive 89 such that the servo motor 91 rotates a predetermined number of rotations until the clamp assembly 80 is located in the center position CP of the platform 20. The machine is then ready to cut a window covering.

Locating the center position could also be performed other than at start up of the machine and may be performed by other processes. For example a separate centering switch may be provided that is located at the center position and that is "contacted" by the clamp assembly 80 either physically, magnetically, optically or electronically to identify the center position. Further, while in one embodiment the clamp assembly 80 operates from the center position CP of the platform 20, it is to be understood that the clamp assembly 80 could initiate the cutting operation from any start position provided that the start position is a known position relative to the blades of saws 30 and 32.

Figure 24A:
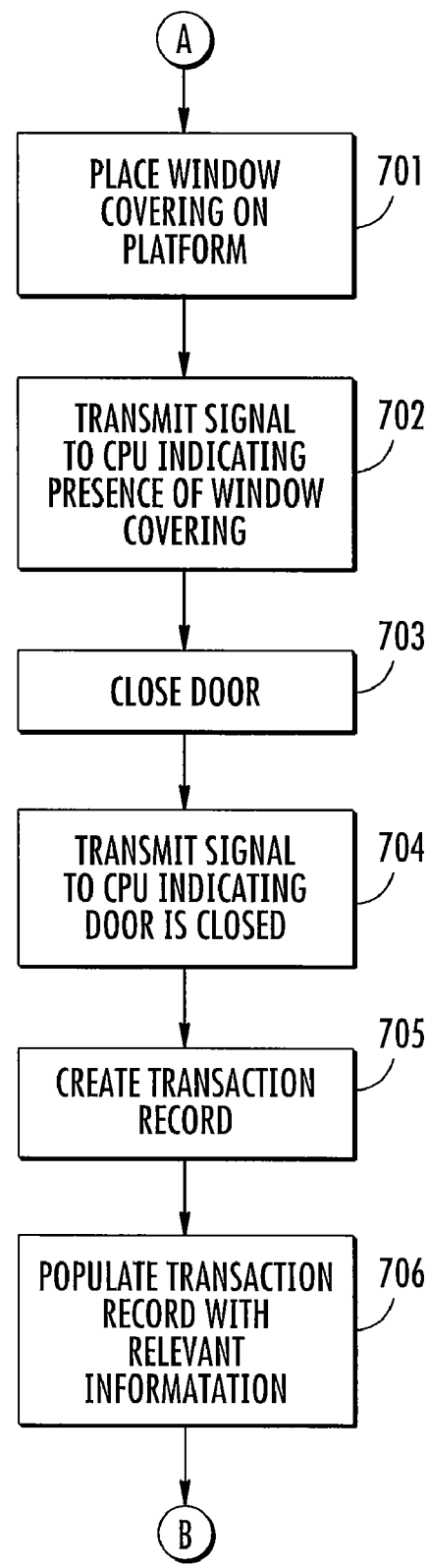
FIGS. 24A-24D are block diagrams illustrating an embodiment of the operation of the SIS machine.
Figure 24B:
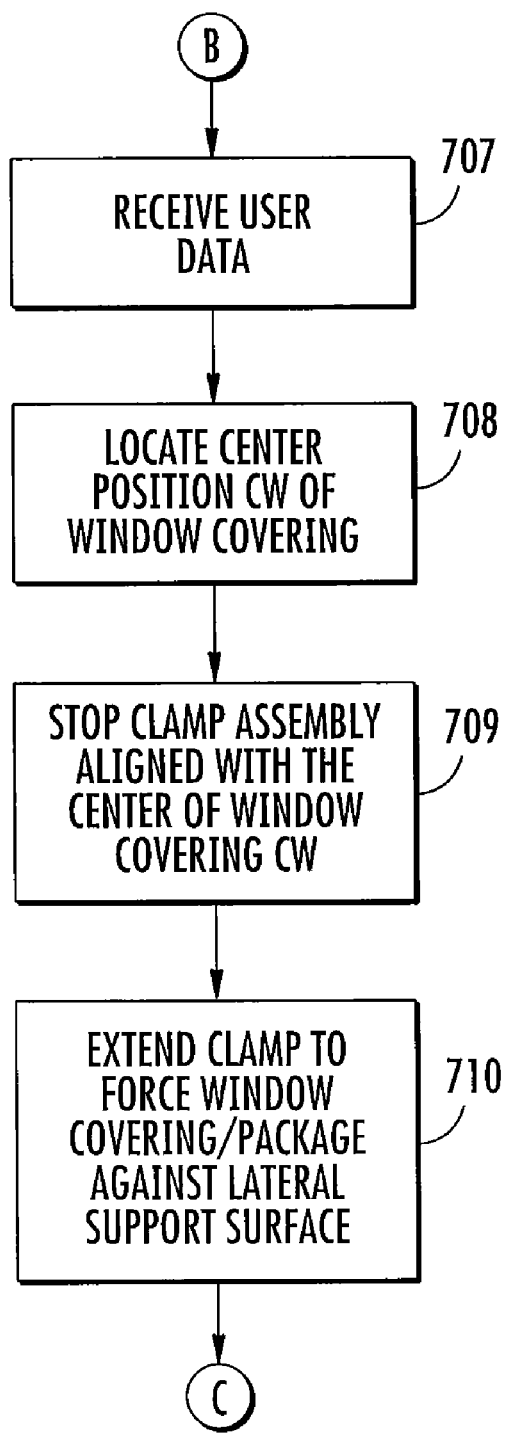

To cut a window covering, the user places a window covering 200 in the cutting chamber 8 on platform 20 (Block 701, FIG. 24A). The user may be directed where to place the window covering by visual, audio or other commands from processor 102 via user interface 112. The platform 20 may also have a visual indicator directing the user as to the proper placement of the window covering on the platform. For example, the platform 20 may include indicia such as printing indicating the proper placement of the window covering. In one embodiment, proper placement of the window covering on platform 20 results in the window covering being detected by sensor 92 (FIG. 27A). Once the window covering is properly positioned on the platform 20 a signal from sensor 92 may be transmitted to and received by the CPU indicating the presence of a window covering (Block 702). In response to this signal the CPU 102 actuates drive 15 to automatically close and lock door 6 to isolate the cutting chamber 8 from the external environment and user (Block 703). Sensor 16 transmits a signal to the CPU indicating that the door 6 is in the closed position (Block 704).

The window covering 200 may be cut in the package or it may be removed from the package before being inserted into the machine. One example of a suitable package is disclosed in U.S. patent application Ser. No. 10/908,728 filed May 24, 2005 and is incorporated in its entirety herein. The operating system can be programmed to cut only window coverings in the package or only window coverings out of the package. Alternatively, the machine can be programmed to cut either the product in either form, provided that the form of the product is input to the CPU prior to the cutting operation. "Window covering" as used herein for explaining the operation of the SIS machine includes both the window covering in the package and the window covering without the package and is represented by element 200 in the Figures.

The package or the window covering may be provided with a mark 101 at its longitudinal center where mark 101 can be sensed by sensor 92. The mark 101 may include reflective tape, reflective ink or other optically identifiable surface if sensor 92 is an optical sensor, a physical characteristic such as an indentation if the sensor is a mechanical sensor, a magnetic stripe if the sensor is a magnetic sensor or other combination of mark and sensor provided that sensor 92 can determine the center of the blind by reference to the mark.

Where the physical pin 285 of the embodiment of FIG. 18 is used mark 101 may be eliminated and the physical engagement of the window covering/package with pin 285 is used to locate the center of the window covering. Referring to FIGS. 23A and 23B, window covering/package 200 is placed on platform 20 and the pin 285 is manually inserted into the centering hole 201 formed in the center of the window covering 200 when the user loads the window blind into the SIS machine, FIG. 25 (Block 4401). The engagement of the pin 285 with the centering hole 201 on the window covering locates the center of the window covering relative to the SIS machine. In such an embodiment the use of sensors to determine the center of the window covering can be eliminated. If the window covering is cut while in the package, the package is formed with a hole that is coextensive with the centering hole on the window covering such that the pin can pass through the hole in the package and engage the window covering. Alternatively, a hole on the package can be used if the window covering is aligned within the package. The centering hole on the window covering may be made directly in the window covering, such as in the head rail, or a centering bracket with a hole formed therein may be attached to the window covering. For example the centering bracket with the centering hole may be fixed to the center of the head rail. Further, while a cylindrical pin 285 engaging a mating round centering hole 201 is shown, the physical engaging members may include any physical structures capable of engaging one another to locate the window covering relative to the clamp.

For example, the male member may extend from the window covering or package and engage a female receptacle on the clamping jaw. These members may have any shape and a plurality of mating pairs of engaging members may be used.

A transaction record 230 is created by CPU 102 and stored in memory 104 (Block 705). The transaction record 230 may be populated with applicable information related to the transaction such as time, date and location of the SIS machine, customer information such as name, address, payment information or the like (Block 706). Other information may also be stored in the transaction record.

User input data is also transmitted to and received by CPU 102 identifying, at least, the finished or cut size of the window covering (Block 707). The process for entering this information will be discussed in detail hereinafter. The user may be required to input other information regarding the window covering such as the type of blind, color, style, stock size or the like. The user may also be requested to input other information such as name, address, payment information or the like. Any or all of this information may be stored in transaction record 230.

Figure 41:
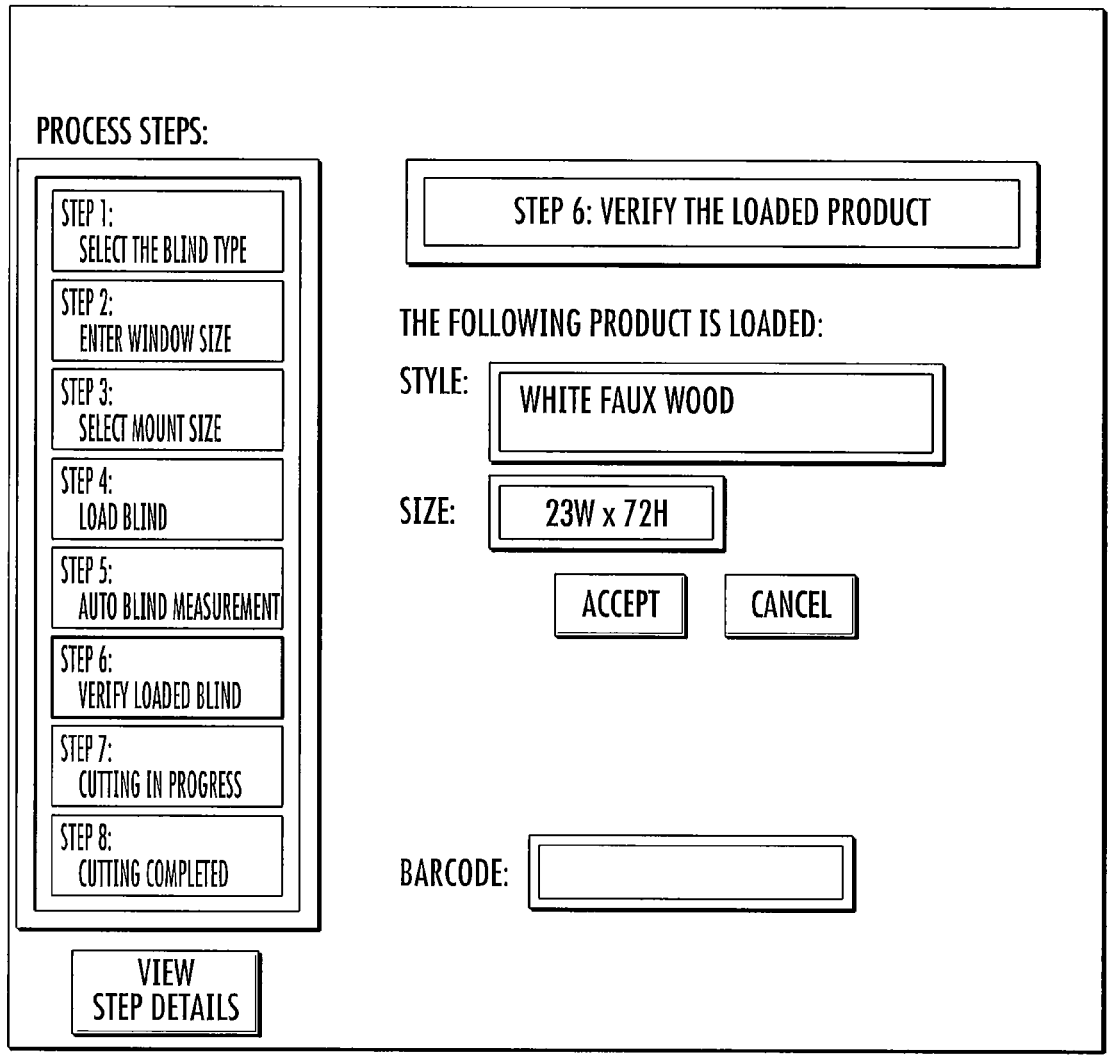

To cut the window covering, if the physical engagement members of FIG. 41 are not used, the clamp assembly 80 is moved along the platform 20 by drive 89 from the known center position CP until the sensor 92 locates the center mark 101 of the window covering/package 200 (block 708). The clamp assembly is stopped in a position where the center of the clamp assembly 80 is aligned with the center CW of the window covering/package (Block 709), FIG. 21B. The position of clamp assembly 80 when positioned at the center CW of the window covering/package 200 is known. The CPU determines the distance D between the center CW of the window covering/package 200 and the center position CP to establish the location of the window covering/package 200 relative to the machine.

These steps may be eliminated where the pin 285 and hole 201 of FIG. 18, or other physical engaging members, are used. In such an arrangement the window covering is centered when it is manually inserted into the SIS machine by the physical engagement of the pin with the centering hole formed on the window covering (Block 4401), FIG. 25.

Figure 21A:
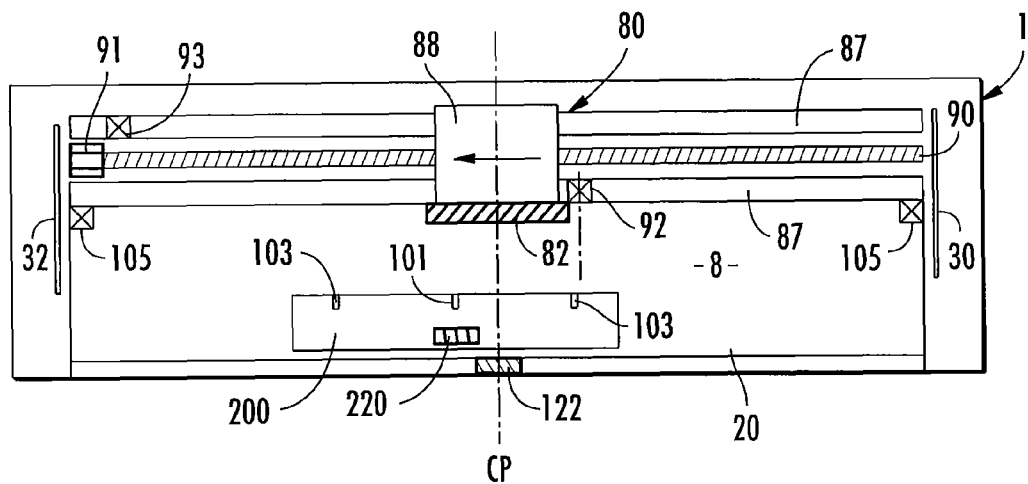
FIGS. 21A-21G are views showing the positioning and cutting operations.
Figure 21B:
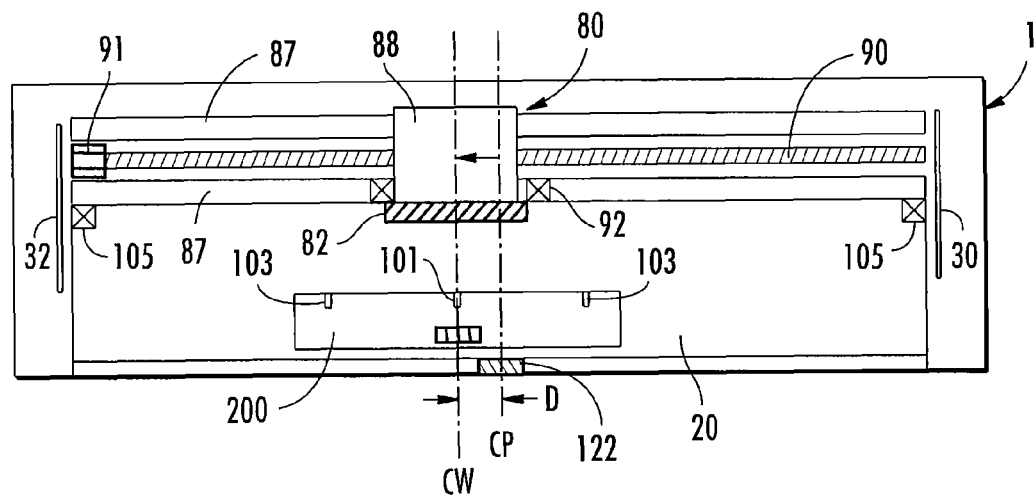
Figure 21C:
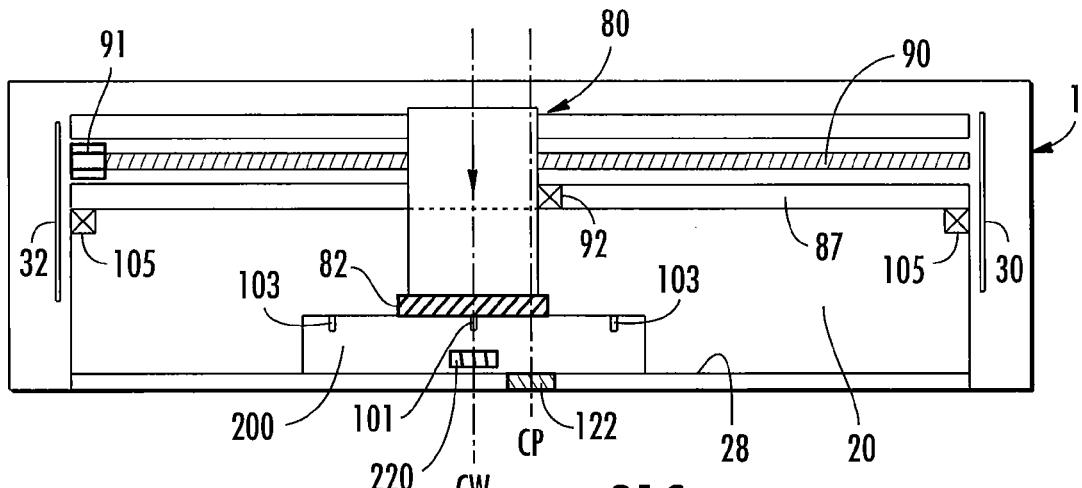

Once the clamp assembly 80 is aligned with the center CW of the window covering/package 200 the drive 87 extends jaw 82 to force the window covering/package 200 against the lateral support surface 28 (Block 710, Block 4402), FIG. 21C. In this position the clamp assembly 80 is centered on the window covering/package 200; the position CW of the clamp assembly 80 relative to the center position CP is known; and the window covering/package 200 is trapped between the jaw 82 and the lateral support surface 28.

In the embodiment of FIG. 19, the CPU then determines how far to move the window covering/package to properly position it in front of the saws 30 and 32 (Block 711). The user enters into the processor 202 and the processor receives whether the window covering is intended to be mounted as an inside mount or an outside mount (Block 4404) and the desired size of the window covering (Block 4403). If an inside mount is selected, the processor 202 automatically deducts a predetermined length from the desired size entered by the user to obtain the final dimension of the window covering (Block 4405). If an outside mount is selected, the final dimension of the window covering is the desired size input by the user. The user also enters the window height. The information entered by the user is stored in the record for that transaction. The CPU 102 accesses the the desired cut size of the window covering as entered by the user. From this dimension the CPU calculates how far the center of the window covering must be positioned from the saws 30 and 32 to achieve the desired cut size of blind (Block 4406). The CPU divides the desired finished size by two to obtain a resulting distance from the center of the window covering to each end hereof. The center of the window covering must be positioned this resulting distance from the saw. The user also enters whether the window covering is for an inside mount or an outside mount. For an inside mount a small distance is subtracted from the desired size to accommodate for the space needed to mount inside of a window frame. For example, if a window covering is to be cut to a width of 35 inches, the CPU determines that the distance from the center of the window covering to each of the the saws must be 17½ inches. For an inside mount ½ of an inch may be deducted from the desired size before dividing the desired size by 2. The CPU can make this determination without any information regarding the stock size of the blind or the amount of material to be cut from the end of the blind. For some applications material may be cut from only one end such as vanes for vertical blinds.

In the embodiment of FIG. 20, the PLC 203 determines how far to move the window covering/package to properly position it in front of the saws. The processor 202 transmits to the PLC 203 the final dimension of the window covering as entered by the user and as corrected to account for an inside mount, if necessary (Block 4407). Using this dimension, the PLC 203 determines how far the center of the package must be positioned from each saw to obtain the desired size of the window covering as previously described (Block 4408). Specifically, the PLC 203 divides the final dimension provided by the processor 202 by two to obtain a half length. The half length is equal to the distance from the center of the package/window covering to the end of the window covering and corresponds to the distance the center of the blind must be positioned from each saw. The PLC 203 makes this determination without any information regarding the stock or starting size of the window covering, the amount of material that will eventually be cut from the end of the window covering or whether the window covering is intended for an inside mount or an outside mount. The window covering is then cut as described below.

Figure 17:
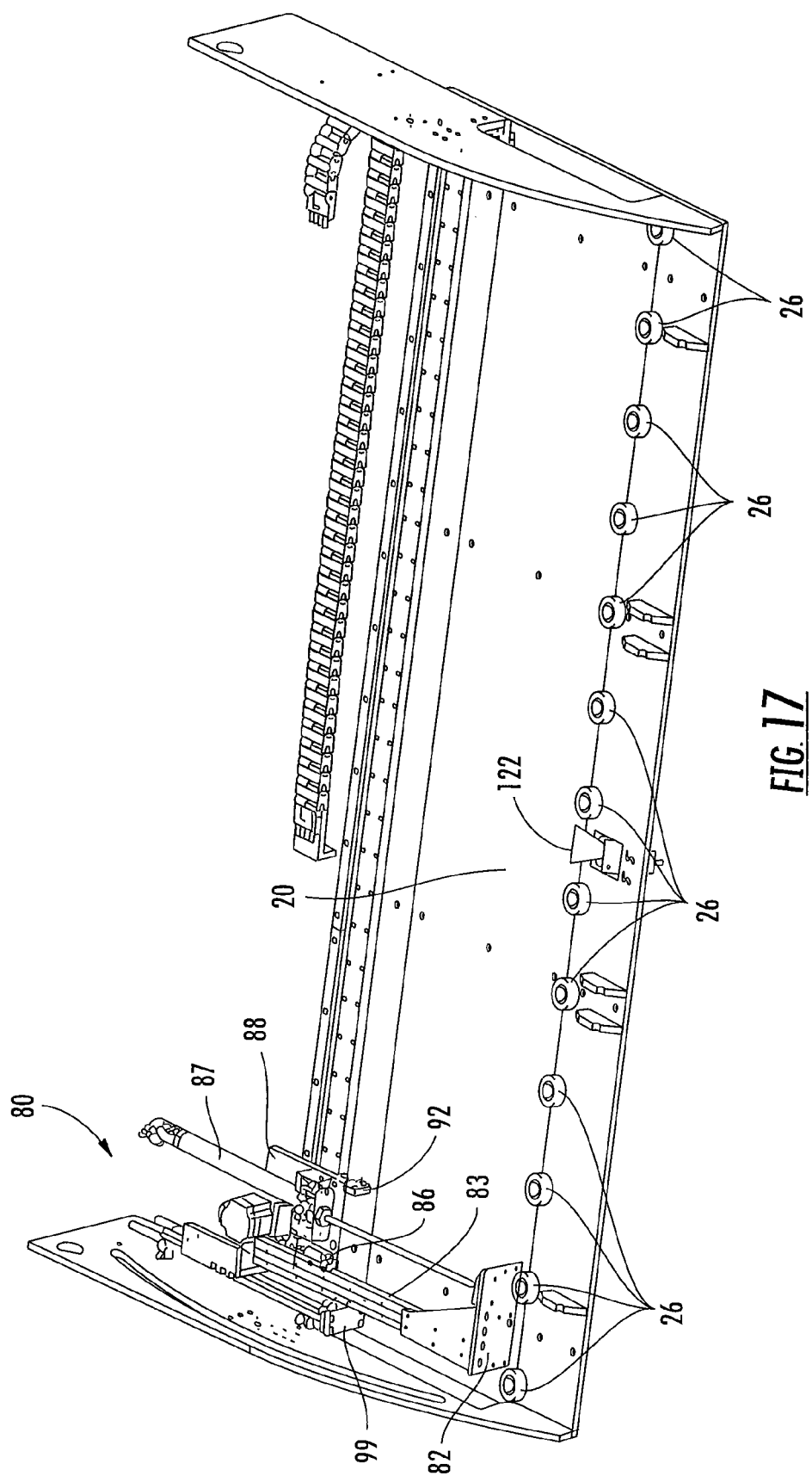
Figure 21D:
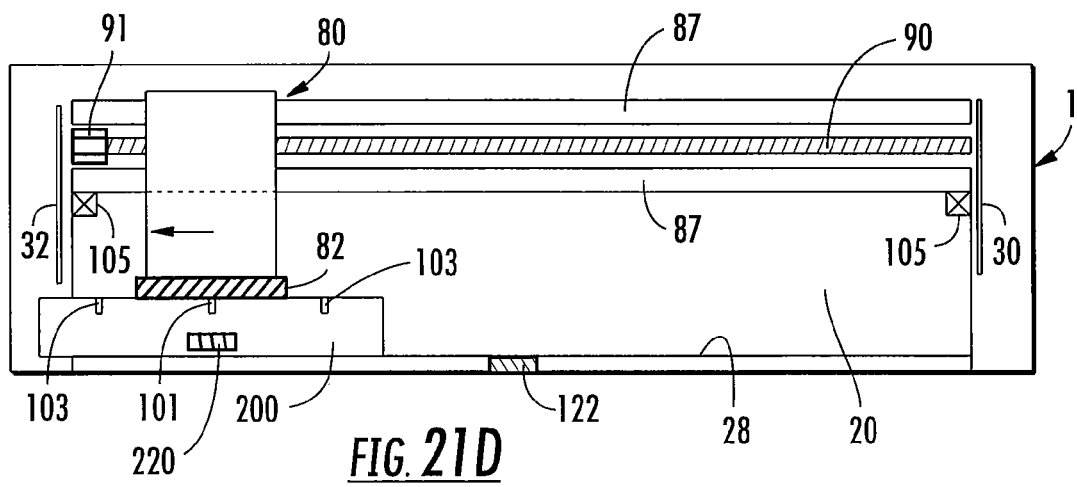
Figure 21E:
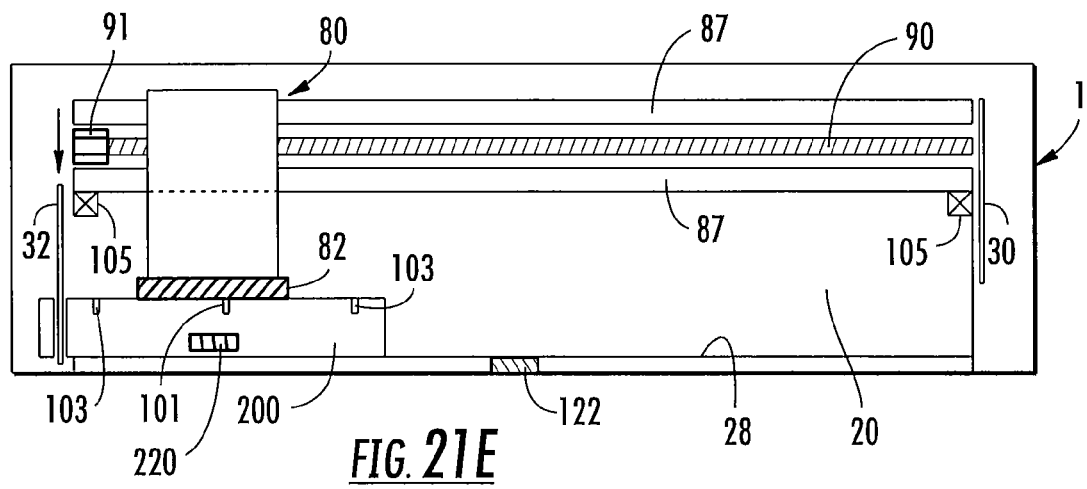
Figure 21F:
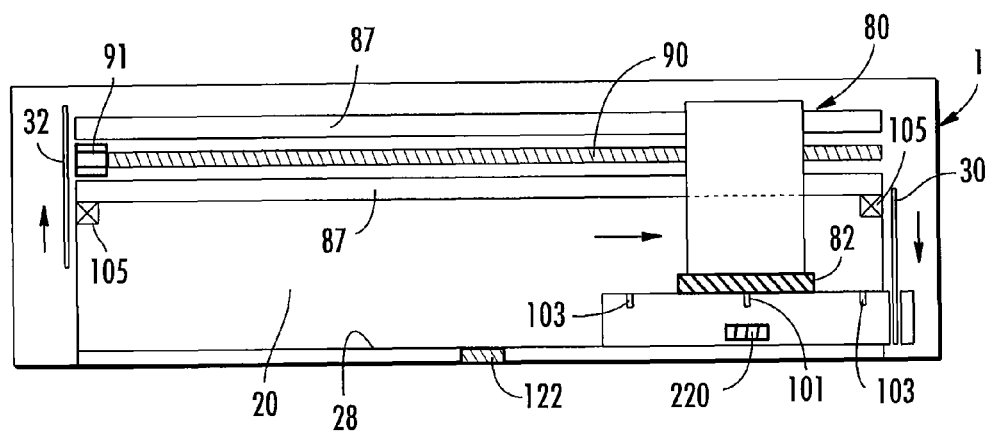
Figure 21G:
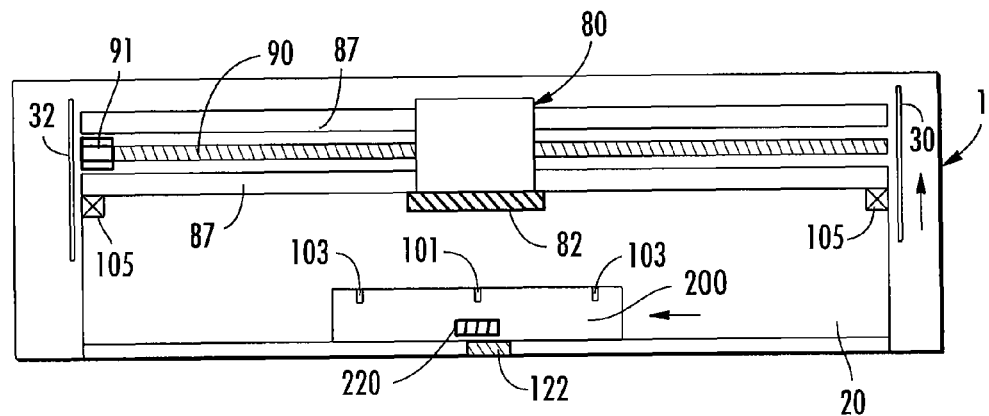
Figure 22A:
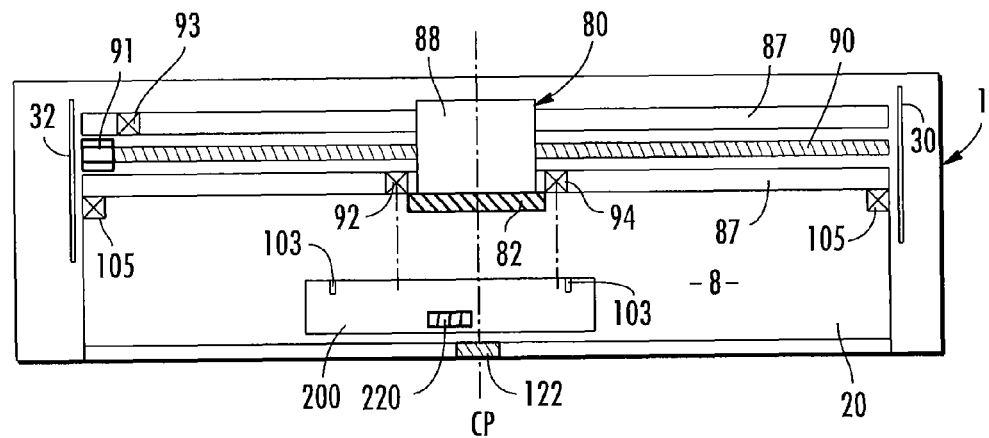
FIGS. 22A-22D are views showing an alternate embodiment of the positioning and cutting operations.
Figure 22B:
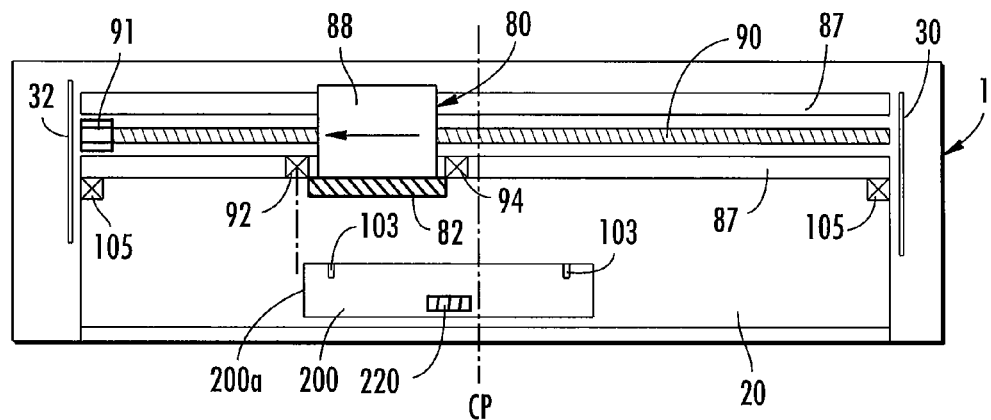
Figure 22C:
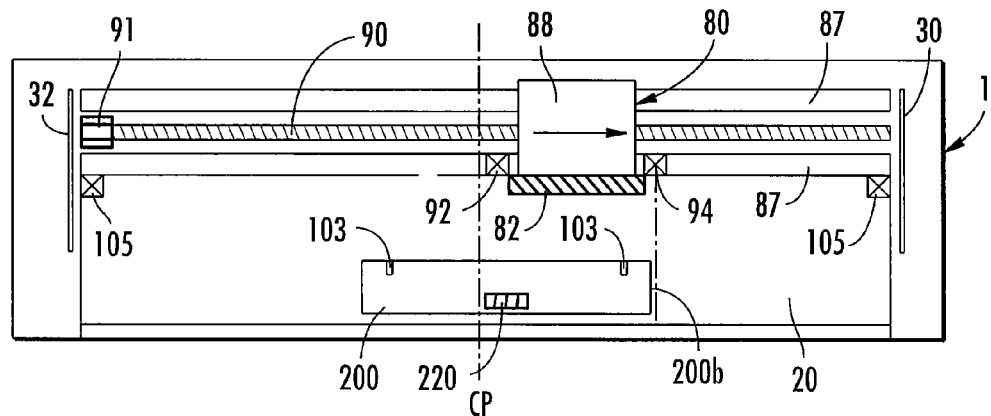
Figure 22D:
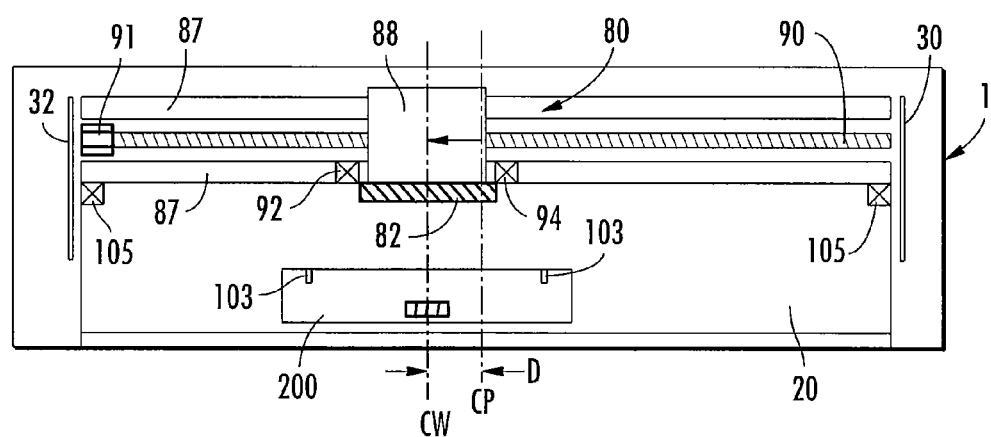
Figure 24C:
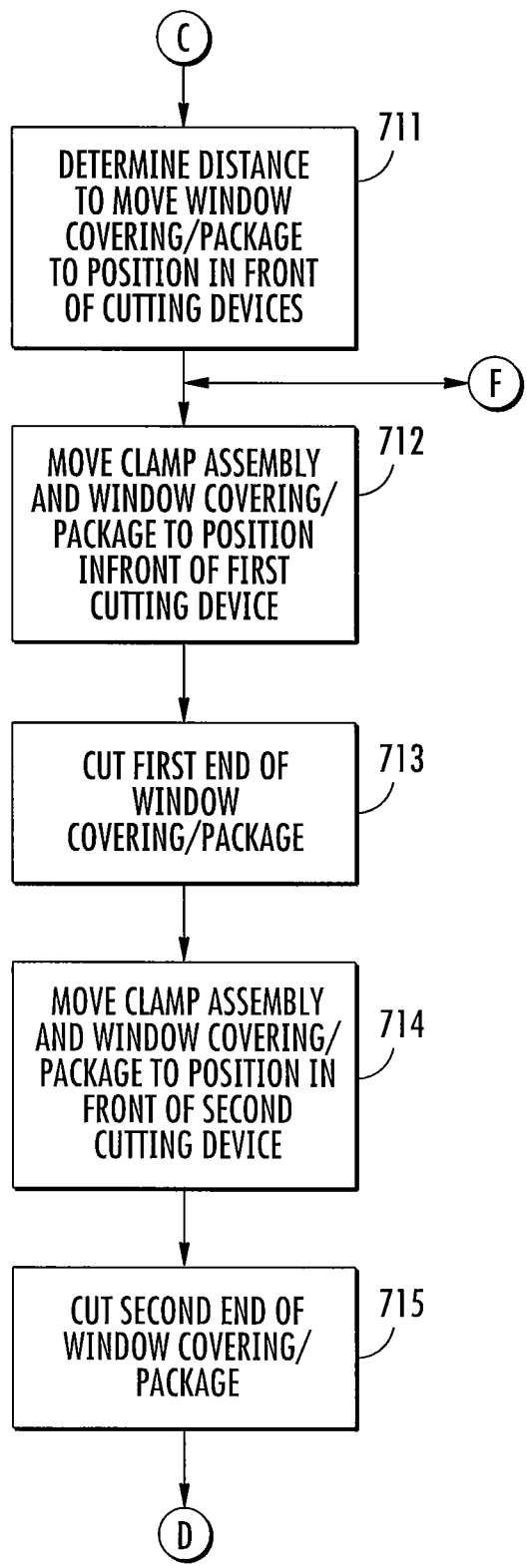

The clamp assembly 80 is then moved toward one end of the machine based on this determination such that the center of the blind is positioned the resulting distance from the saw (Block 712, FIG. 24C) and FIG. 21D. Clamp assembly 80 moves the window covering/package such that the position of the clamp assembly relative to the window covering/package 200 remains fixed. The clamp assembly 80 is moved such that the window covering/package is positioned in front of one of saws 30 or 32 with the center of the window covering spaced from the saw the predetermined distance. FIG. 17 also shows the clamp assembly 80 moved to an end of platform 20. Secondary clamps 99 may also be used adjacent each of the saws to hold the window covering in position during the cutting operation. The secondary clamps 99 are extended to trap the window covering against the lateral surface 28. The The saw blade is rotated at high speed and the saw is moved toward the window covering/package by drive 43 such that the saw engages and cuts the window covering at the desired location (Block 713, FIG. 24C) and FIG. 21E.

The clamp assembly 80 is then moved toward the opposite end of the machine moving the window covering/package 200 with the clamp assembly (Block 714). The position of the clamp assembly 80 relative to the window covering/package 200 remains fixed. The clamp assembly 80 is moved such that the window covering/package is positioned in front of the other of saws 30 and 32, FIG. 21F with the center of the window covering spaced from the saw the predetermined distance. The saw blade is rotated at high speed and the saw is moved toward the window covering/package by drive 43 such that the saw engages and cuts the window covering at the desired location (Block 715, FIG. 24C) and FIG. 21F. The jaw 82 holds the window covering/package 200 tight against the lateral support surface 28 to support the window covering/package while it is cut. Both ends of the blind may be cut simultaneously by moving one or both of the saws relative to the window covering rather than moving the window covering.

It is to be understood that for any given stock size of window covering there is a range of cut sizes that are valid for that size window covering based on the geometry of the blind including the location of the lift cords, pulley systems, cord locks and the like. In one embodiment, to ensure that a window covering is not cut such that the cut interferes with the operation of the window covering, a mark 103 is provided at each end of the window covering/package 200, FIGS. 21E and 21F. A sensor 105 is located near the entrance to each cutting device 30, 32 such that if the sensor 105 detects a mark 103 the cutting operation is terminated before a cut is made. The mark 103 may include reflective tape, reflective ink or other optically identifiable surface if sensors 105 are optical sensors, a physical characteristic such as an indentation if the sensors are mechanical sensors, a magnetic stripe if the sensors are magnetic sensors or other combination of mark and sensor provided that sensor 105 can detect the mark 103. In one embodiment the mark 103 is located between the end of the window covering and the lift cords, cord locks, pulley systems and other blind componentry such that a cut is prevented too close to (or inside of) these components. The mark can be located on the window covering/package such that blinds of different sizes, shapes, configurations and componentry can be accommodated.

A vacuum system 90 may be used in the cutting chamber 8 to capture the debris and dust created during the cutting operation. The vacuum system 90 may comprise a vacuum motor that communicates with the cutting chamber 8 by conduits such as flexible hoses. The vacuum system may include a grate in the cutting chamber that allows the cut material to flow from the cutting chamber to the vacuum.

In an alternate embodiment the clamp assembly 80 may include two sensors 92 and 94, FIGS. 22A-22D used to locate the center of the window covering. The clamp assembly is moved along the platform 20 by drive 89 from the known center position CP (FIG. 22A) in one direction until the sensor located at the leading edge of the clamp (sensor 92) locates the first end 200a of the window covering/package 200 relative to the known center position CP, FIG. 22B. The position of the clamp assembly 80 marking the first end of the window covering/package 200 is saved in memory. The direction of movement of the clamp assembly 80 is then reversed and the clamp assembly 80 is moved along the platform 20 by drive 89 from the known center position CP in the opposite direction until the other sensor (sensor 94), located at the leading edge of the clamp, locates the opposite end 200b of the window covering/package relative to the known center position CP FIG. 22C. The position of the clamp assembly 80 marking the second edge of the window covering/package 200 is stored in memory. Based on the detected end positions, the CPU then determines the center CW of the window covering/package 200. The CPU uses the stored the positions of the first edge 200a and second edge 200b to determine the center of window covering 200. These positions may be determined by, for example, counting the rotations of servo motor 91 as the clamp assembly 80 moves from the center position CP to the first edge 200a and the second edge 200b. The CPU then determines the position midway between the first and second edge positions by, for example, dividing the number of rotations between the two positions by two and adding the result to or subtracting it from the first or second position, respectively, to arrive at the center of the window covering. The center of the window covering may also be determined by calculating the distances of the first edge 200a and the second edge 200b relative to the center position CP. The CPU also determines the distance D between the center of the window covering and the center position CP. The CPU positions the clamp assembly 80 such that it is aligned with the center of the window covering/package FIG. 22D. A single sensor may also be used to detect both edges of the window covering/package. Once the clamp assembly 80 is aligned with the center CW of the window covering/package the window covering may be cut as previously described.

A validation process may also be used to ensure that the cutting operation described above is valid for the selected window covering. Either the package with the window covering or the window covering (if removed from the package) is provided with product identification information in a machine readable form such as data encoded in bar code 220 that is readable by a sensor 122 such as optical scanner. While the window covering may be cut either with the packaging or removed from the packaging, cutting the window covering in the package may be simpler and allows the package to hold the product in place after it is cut. The bar code 220 is unique to the window covering with which it is associated and identifies the specific window covering by using a unique code such as a serial number. The bar code 220 may also contain information such as the size, style, color or the like of the window covering. The bar code 220 may also contain manufacturer's information such as lot number or retailer's information such as purchase order number.

Figure 27:
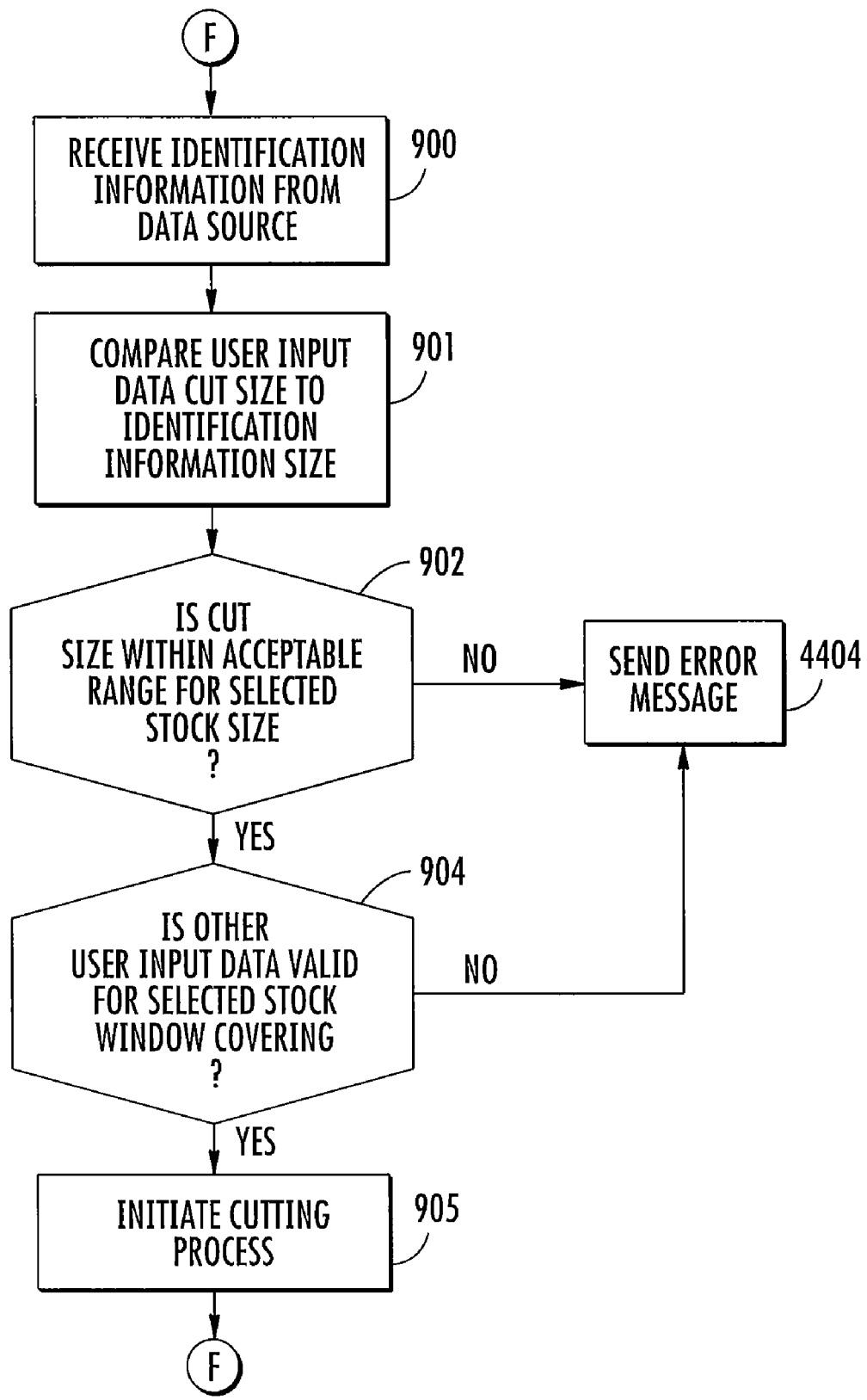
FIG. 27 is a block diagram illustrating an embodiment of the verification process.

Referring to FIG. 27, after the determining the proper position of the clamp assembly and the window covering/package 200 for the cutting operation, the bar code 220 is read using a sensor 122 such as an optical scanner to obtain the identification information (Block 900). The bar code 220 may be replaced by radio frequency identification (RFID) tags or other suitable identification technology. The sensor 122 transmits a signal to CPU 102 or processor 202 encoded with the data specific to the window covering 200. The identification information is stored in data base 104 as part of the transaction record 230 for the window covering.

The CPU 102 or processor 202 may use the user input data and the indentification information (e.g. the information encoded in bar code 220) to determine if the customer request is valid. The CPU 102 or processor 202 compares the user input desired size to the product identification information size as read off of bar code 220 (Block 901) and determines if the user input cut size is a valid cut size for the selected window covering (Block 902). For example, has the user inadvertently selected a window covering that is smaller than the desired cut size or has the user selected a cut size that is too small for the selected stock window covering. Specifically, the PC has a look up table that lists a range of blind sizes that are valid for any given stock size blind. A comparison is made between the entered desired size and the range of valid sizes. If the desired size falls within this range, the cut is validated and the user is asked to confirm the request. In the embodiment of FIG. 20 the PC then sends a signal to the PLC to initiate the cutting operation. In the embodiment of FIG. 19 the CPU initiates the cutting operation. If the desired size is outside of this range, an error message is displayed on the touch screen. If the user input data is not valid, an error message will be displayed to the user by the user interface identifying the error and requesting that the user correct the user input data or the selected window covering (Block 903). If the window covering/package 200 is provided with marks 103 that are readable by sensors 105 that prevent a cut if the cut would interfere with the components or functionality of the window covering as previously described, this separate verification step may be omitted.

The CPU may also compare the user input data to the product identification information from the bar code 220 and determine if the user has actually selected the window covering that the user believes that he or she selected (e.g. does the user input style and color match the actual style and color of the window covering) (Block 904). If the user input data is valid for the selected blind, the SIS machine will initiate the cutting process to automatically cut the blind to the user's desired size as has been described (Block 905). If the user input data is not valid, an error message will be displayed to the user by the user interface identifying the error and requesting that the user correct the user input data or the selected window covering (Block 903). The validation process may be repeated until the user data is validated for the selected window covering. Note, one or both of verification steps 902 and 904 may be omitted.

Another method for determining the validity of the window covering size determination is to rely on the weight of the window covering rather than using a machine readable data structure such as bar code 220. A scale could be incorporated into the platform 20 to detect the weight of the window covering/package 200. A look up in a look up table stored in memory 104 can then be performed by the CPU 102 or processor 202 comparing the measured weight to the known weights of the stock window coverings. The weight could be used to identify window covering characteristics such as permissible of cut ranges, window covering material or the like where the characteristics are used to validate or implement the cutting operation. For example a particular saw blade type or saw speed may be used for different blind materials. Further, valid cut ranges may be determined for a window covering.

Figure 24D:
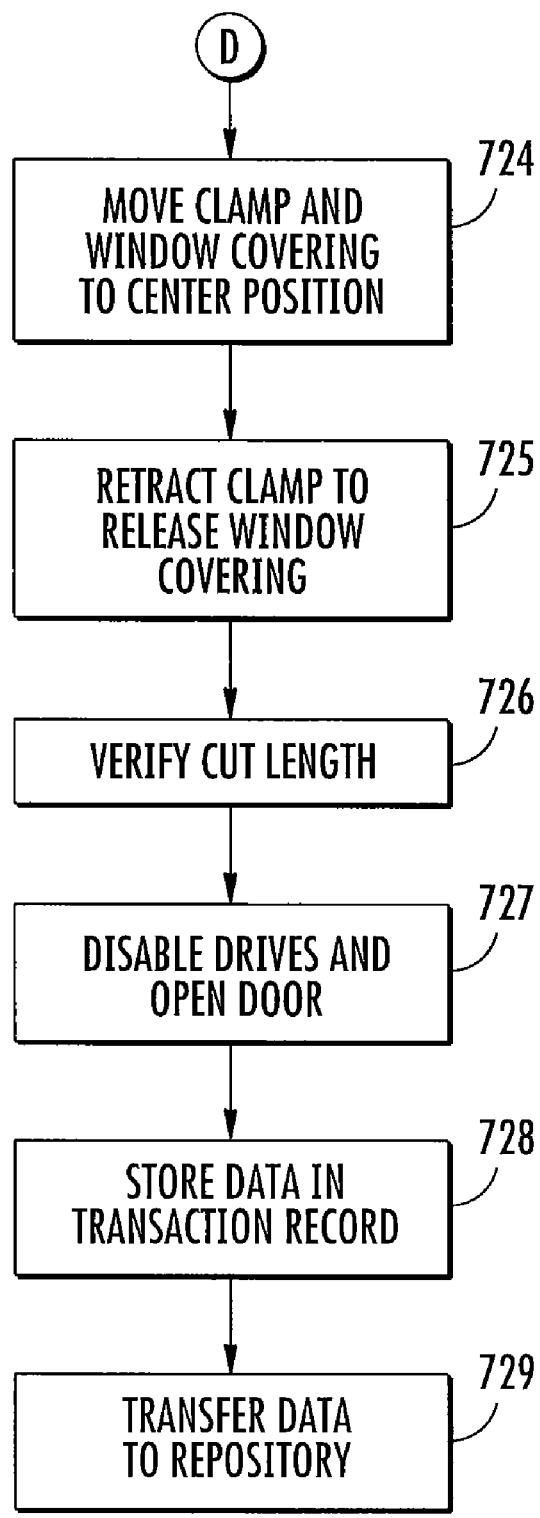
Figure 26:
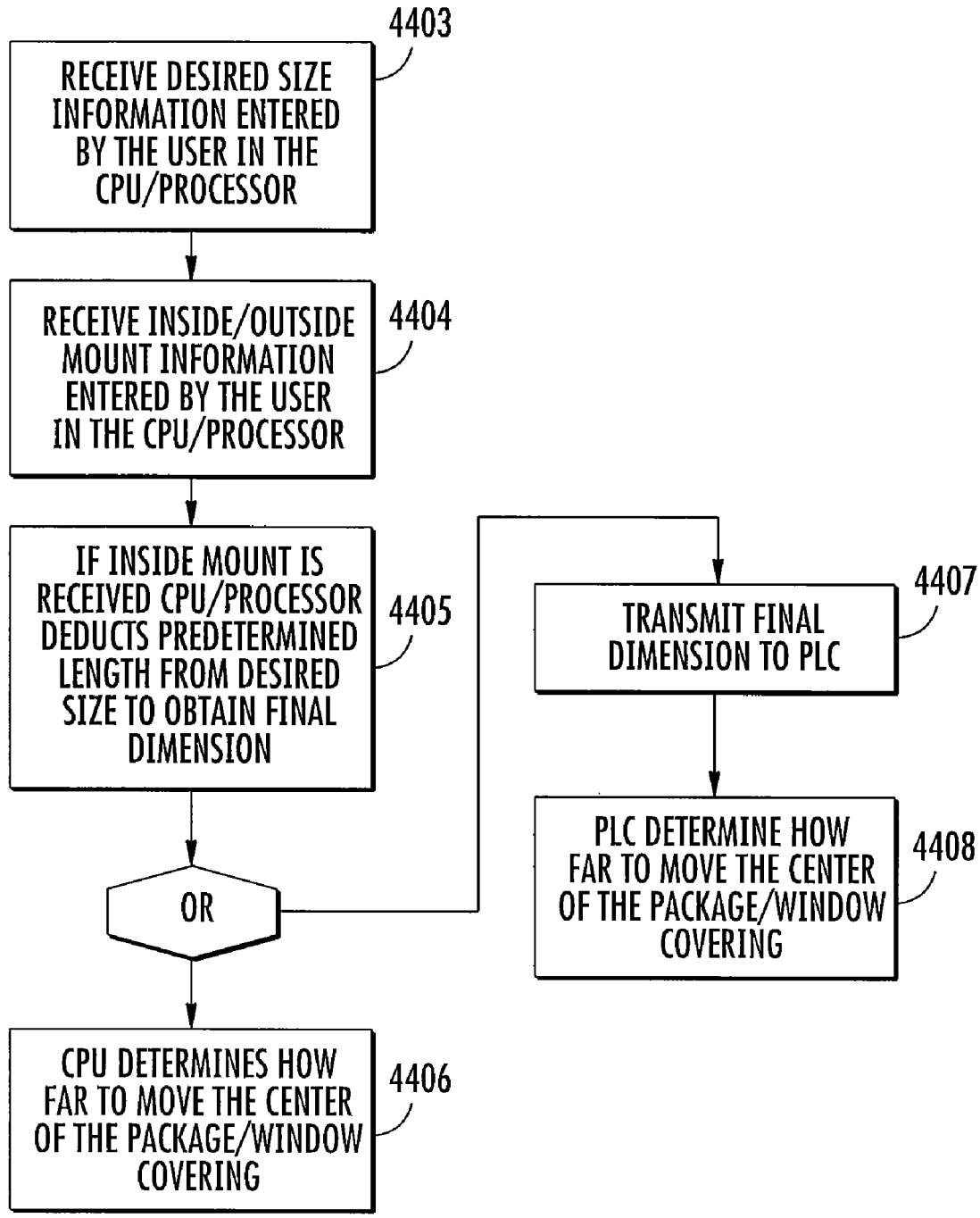
FIG. 26 is a block diagram illustrating an embodiment of the positioning and cutting operation.

After the window covering is cut to the desired size, drive 89 moves the clamp assembly 80 and the window covering/package 200 to the center position CP (Block 724, FIG. 24D). Drive 43 retracts the clamping jaw 82 to releases the window covering/package 200 (Block 725).

The system may then verify that the actual cut length matches the user input cut size (Block 726). The clamp assembly 80 is moved along the platform 20 by drive 89 from the known center position in one direction until the sensor locates the first end 200a of the window covering/package 200. The direction of movement of the clamp assembly 80 is then reversed and the clamp assembly 80 is moved along the platform 20 by drive 89 in the opposite direction until the sensor locates the opposite edge 200b of the window covering/package. The distance the clamp assembly 80 travels between the two edges 200a and 200b of the package is detected. The distance traveled is equal to the actual cut size of the window covering. The actual cut size is compared to the desired cut size input by the user. If the two sizes match the cut is verified. The two sizes may be determined to match if the distance between the input cut size and the actual cut size fall within a predetermined minimum acceptable error margin.

The vacuum, saws and other moving components are stopped and the door 6 is opened automatically by drive 15 (Block 727). The cut window covering can then be removed by the user. The cutting operation is completely automated. The cutting process is also isolated from the user during the process to maximize the safety of the process.

The data related to the transaction is stored in a transaction record 230 and may include, but not be limited to, original size of product, cut to size of product, date, time, store identifier/location, and blind drop (length) (Block 728). The data captured by the SIS machine could be transferred to the blind manufacturer 111 or retailer outlet system 113 over a network 108 at any time and be associated with the customer's original order such that a complete record of the order and cutting operation is maintained (Block 729).

Figure 28A:
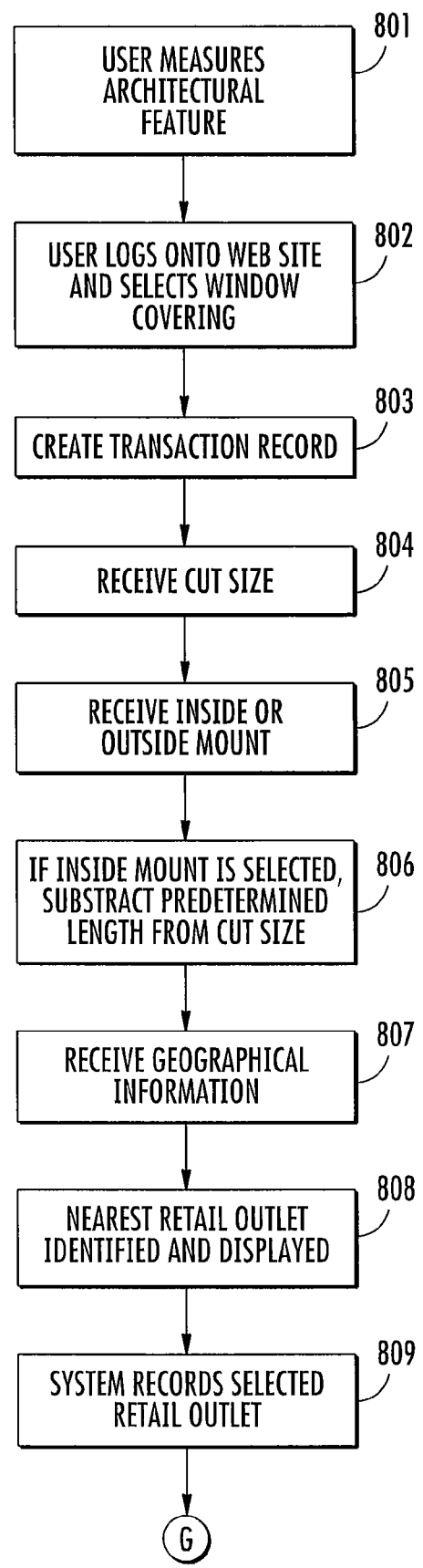
FIGS. 28A and 28B are block diagrams illustrating an embodiment of the operation of an ordering system.
Figure 28B:
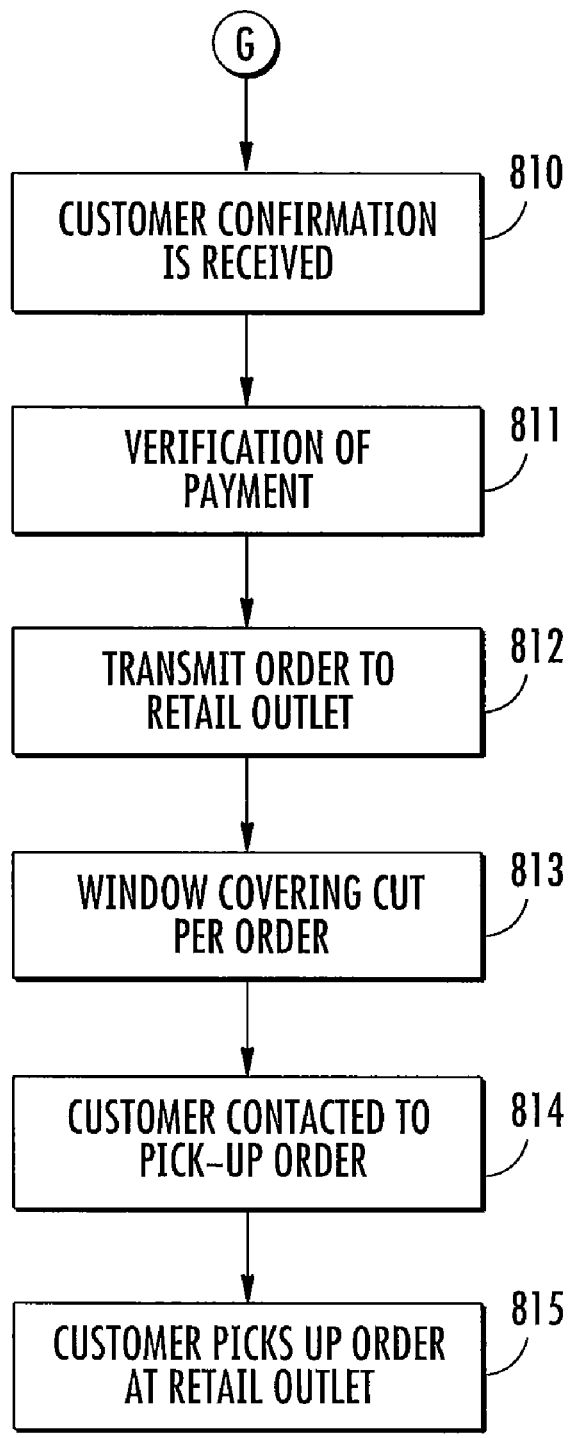

Numerous processes may be used to enable the user to transmit the user input data to the SIS machine 1. In one operation, FIGS. 28A and 28B, the user measures the window or other architectural feature using traditional measuring tools such as a tape measure, ruler, electronic tape measure or the like and notes the measurements (Block 801). The customer logs onto a website of a window covering provider and selects a window covering product for each measured architectural feature and the selection is transmitted to and received by CPU 102 or processor 202 (Block 802). The user may log onto the web site from a user terminal 109 or from user interface 112 or from any device that allows access to the website. A transaction record is created for that customer and transaction by CPU 102 or processor 202 and the transaction record is stored in memory (Block 803). Based on the noted measurements, the customer enters a cut size for each of the selected window coverings and the CPU 102 or processor 202 receives the cut sizes (Block 804). The customer is prompted for and transmits whether the mount is an inside mount or an outside mount. The type of mount is received by the CPU 102 or processor 202 (Block 805). If outside mount is selected the window covering is cut to the size input by the customer. If inside mount is selected a length deduction, for example ½ inch, is subtracted from the size input by the customer (Block 806). The customer is prompted for zip code, address or other geographical information and the geographical information is received by the CPU 102 or processor 202 (Block 807). The CPU 102 or processor 202 determines the nearest retail outlet location having a SIS machine such as by using a look up table stored in memory 104 (Block 808). The identified retail outlet is displayed on the user interface 112 or terminal 109 (Block 808). The customer may select the identified outlet or the customer may manually select another outlet. The selected outlet is recorded in the transaction record (Block 809). The customer is prompted for and confirms the order and the confirmation is received by the CPU or processor (Block 810). Payment may be made on-line or payment may be deferred until the customer picks up the order at the retail outlet. The ordering process may include verification of the customer payment information (Block 811).

The customer's order and/or complete transaction record is sent to the selected retail outlet 113 over network 108 (Block 812). Based on the order, the retail outlet personnel use the SIS machine to cut the ordered window coverings to the customer's specified dimensions (Block 813) as previously described. The cutting operation may be performed during off hours or non-peak hours to more efficiently use personnel time.

The customer is contacted by retail outlet 113 with a scheduled pick-up time for retrieving the cut window covering (Block 814). The customer travels to the retail outlet to pick up the cut window coverings (Block 815).

Another ordering methodology uses a photo-measuring kit to provide the measurements for the architectural feature rather than using a traditional measuring tool. The customer obtains a photo-measuring kit such as by ordering a kit from a window covering manufacturer's website or picking up a measuring kit at a retail outlet.

Figure 29A:
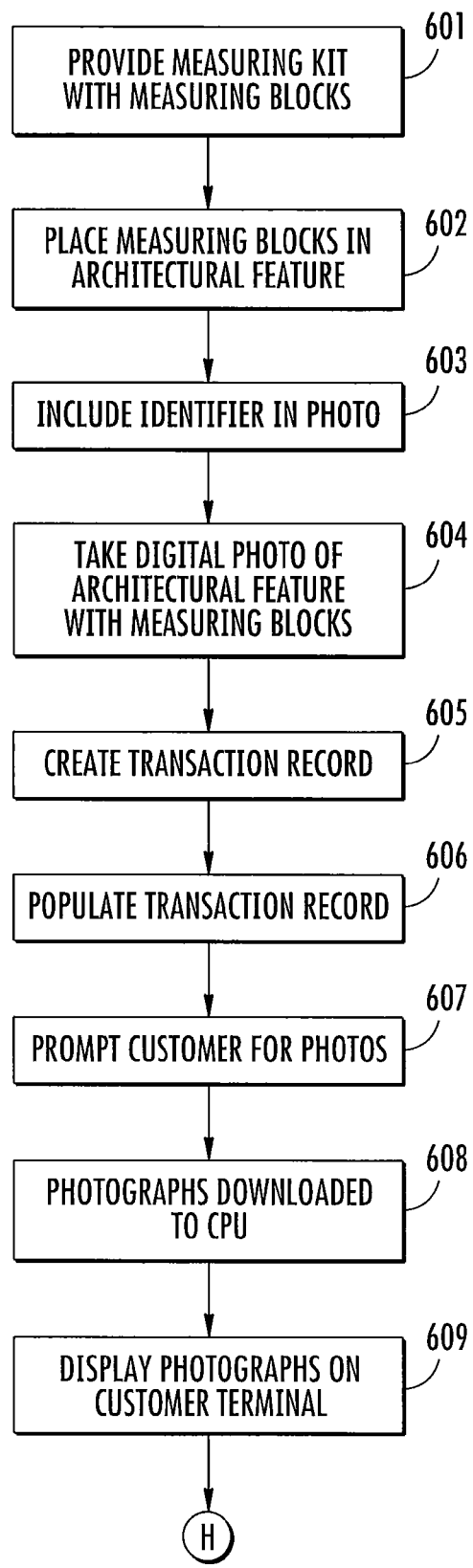
FIGS. 29A and 29B are block diagrams illustrating an embodiment of the operation of an ordering system.
Figure 29B:
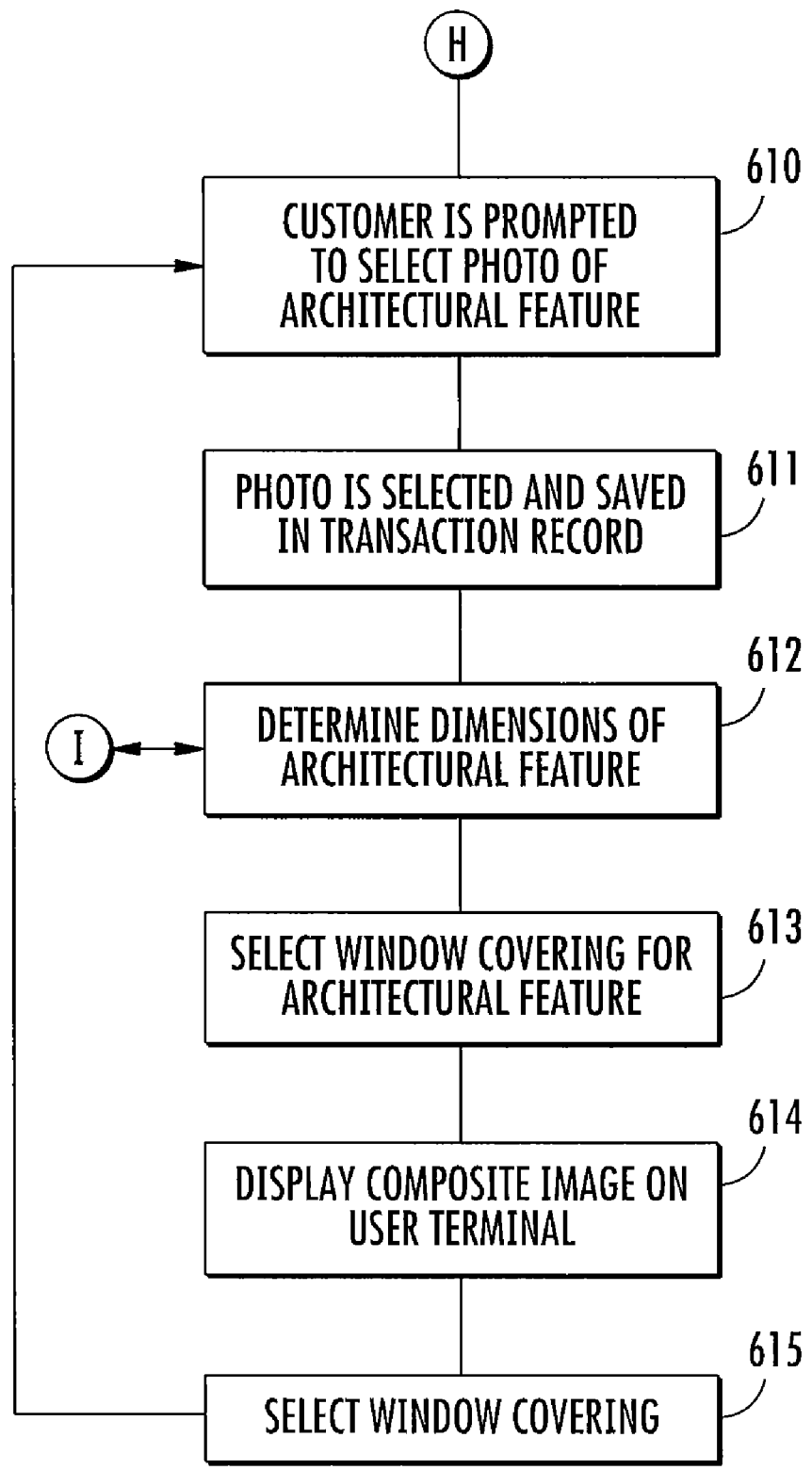
Figure 30:
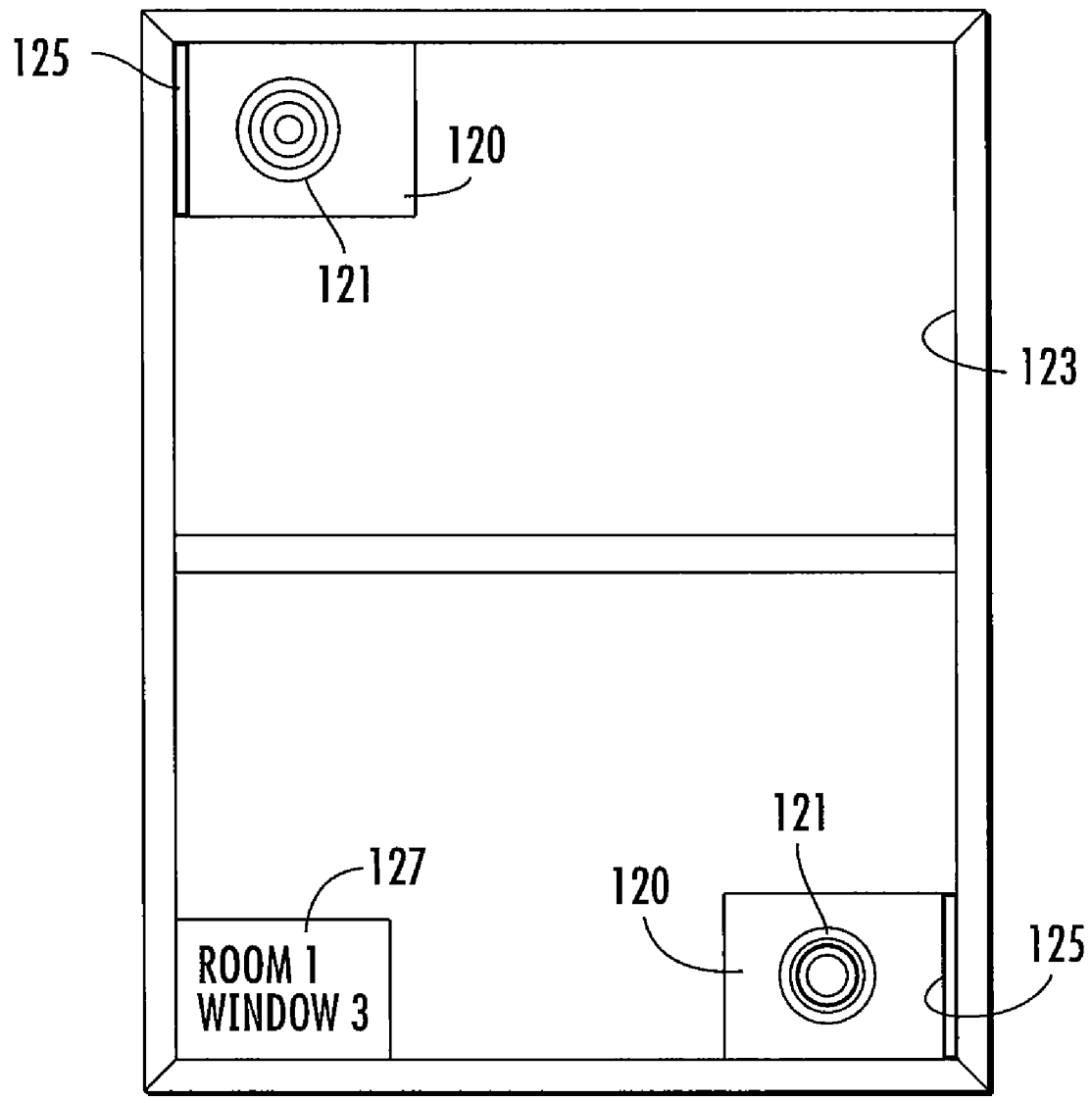
FIG. 30 shows part of the ordering system of FIGS. 12A and 12B.

Referring to FIGS. 29A, 29B and 30 the measuring kit includes at least one measuring block 120 that includes a unique design 121 printed on a front surface thereof (Block 601). The measuring block may comprise any rigid material that can be supported adjacent the architectural feature 123 being measured. The design 121 comprises a unique pattern or design that is of known dimensions and shape. The specific shape of the design is selected such that it is unlikely to be similar to any aspects of the architectural feature and thus will be recognizable when viewed adjacent to the architectural feature.

The customer places one or more measuring blocks 120 in the architectural feature being measured (Block 602) such that the measuring block 120 and entire architectural feature 123 are visible. The measuring block 120 should be mounted as close to the same plane as the architectural feature being measured. Thus, for example, to measure a window the measuring block is mounted within the frame of the window such as by taping it to the window glass. In one embodiment at least two measuring blocks are used where each measuring block is located with a designated edge 125 placed along the edge of the architectural feature being measured. For example, for a window covering that is intended to be mounted on a window, the edges 125 of the blocks 120 are placed along the inside frame of the window. A digital photograph of the architectural feature 123 with the measuring blocks 120 mounted adjacent thereto is taken (Block 604). The customer may also place a unique designator 127 on the architectural feature while photographing it to identify the building, room and/or architectural feature to which that measurement relates (Block 603).

The customer logs onto a window covering provider website from a user terminal 109 over network 108 and the CPU 102 or processor 202 creates a transaction record (Block 605). The system prompts the customer for, and the customer enters, information related to the customer such as name, address, payment information, internet address or the like and the CPU 102 or processor 202 receives this information and populates the transaction record unique to that customer and transaction (Block 606). The customer is then prompted to upload the photographs taken of the architectural feature with the measuring blocks (Block 607). The customer uploads the photographs and the photographs are received by the CPU 102 or processor 202 and stored in memory (Block 608). The photographs are displayed to the customer on the customer interface 112 109 (Block 609). The customer is prompted to select the photograph of the first architectural feature for which a window covering is to be ordered (Block 610). The customer selection is entered into the transaction record for the first transaction (Block 611).

Figure 31:
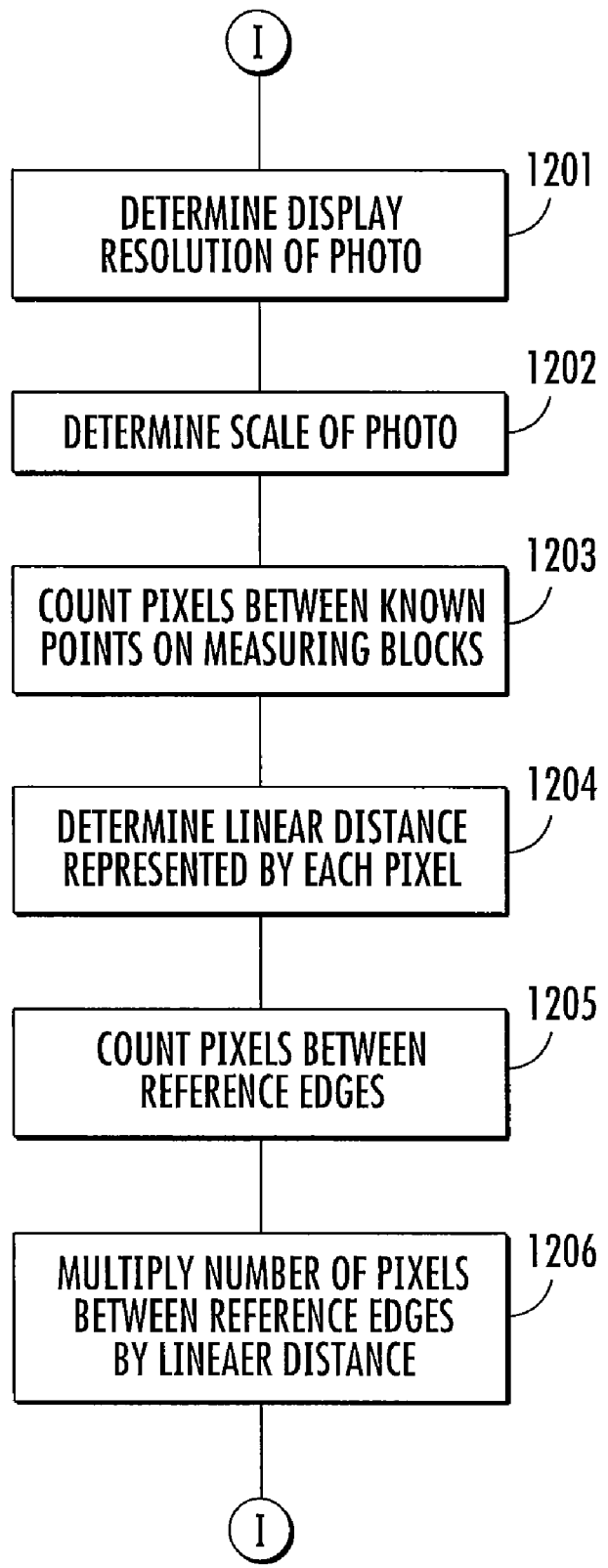
FIG. 31 is a block diagram illustrating the system for measuring the dimensions of an architectural feature.

The system determines the dimensions of the architectural feature using the photograph provided and selected by the user (Block 612). Referring to FIG. 31, the system first determines the display resolution of the photograph (Block 1201). Once the display resolution is determined the system determines the scale of the photograph (Block 1202). This is accomplished by counting the number of pixels extending from one point on the unique design 121 on a measuring block to another point on that design (Block 1203). Because the dimensions of the design 121 are known, the system can determine the scale of the photograph by calculating how many pixels extend between the two points on the design. Because the distance between the two known points is known the system calculates how much linear distance (scaling factor) each pixel represents (Block 1204). The system can then determine the distance between the reference edges 125 of the measuring blocks 120 by counting the pixels between those reference edges (Block 1205) and multiplying the number of pixels by the scaling factor (Block 1206). Thus, the system can automatically determine the dimension of the architectural feature based on the photograph provided by the user.

Referring again to FIG. 29B, the customer is then prompted to select a cut-to-size window covering for the selected architectural feature and the selection is received and stored by the CPU 102 (Block 613). The system automatically overlays the selected window covering on the selected architectural feature and displays the composite image on the user terminal 109 (Block 614). The composite image provides the customer an opportunity to view how a specific window covering will look on their specific architectural feature before the customer purchases the window covering. The customer can change the style, color, mount of the window covering to display various design options before purchasing the window covering. The customer selects the desired window covering and the selection is received and recorded by CPU 102 (Block 615). The customer repeats these steps for all pictures (architectural features) that were uploaded into the system (Block 610).

Figure 32:
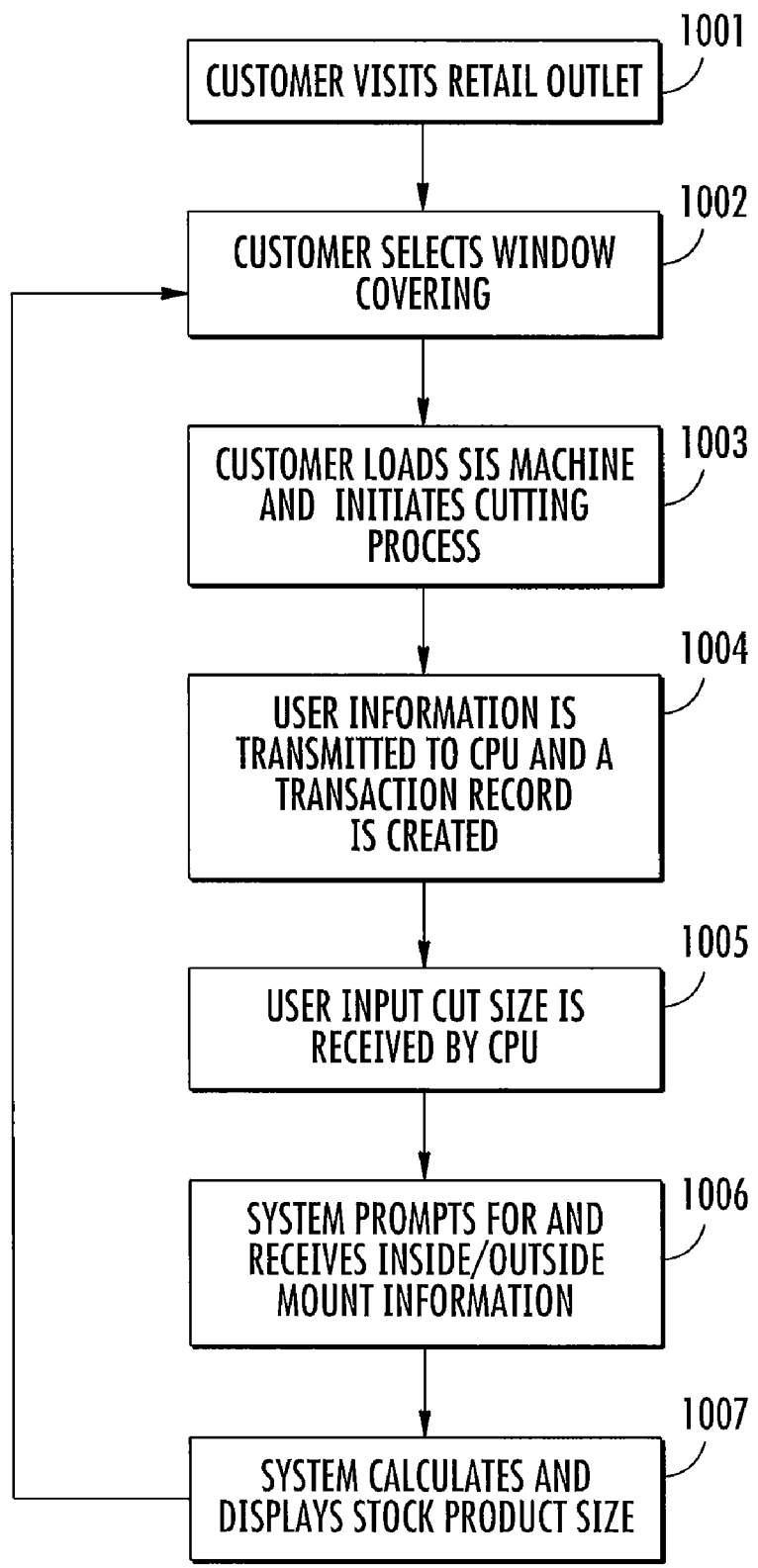
FIG. 32 is a block diagram illustrating another embodiment of the operation of an ordering system.
Figure 34:
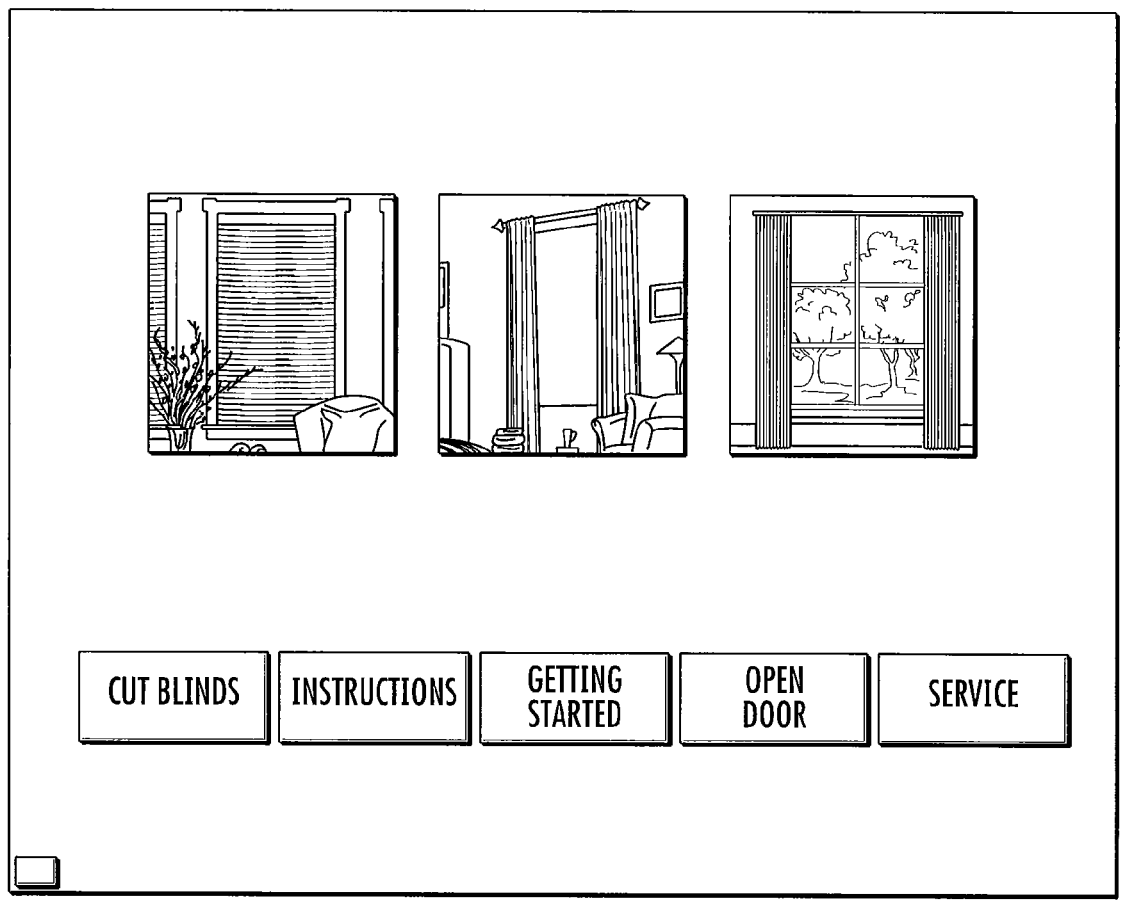
FIGS. 34 through 42 are sample screen shots that may be displayed on the user interface during the cutting operation.
Figure 35:
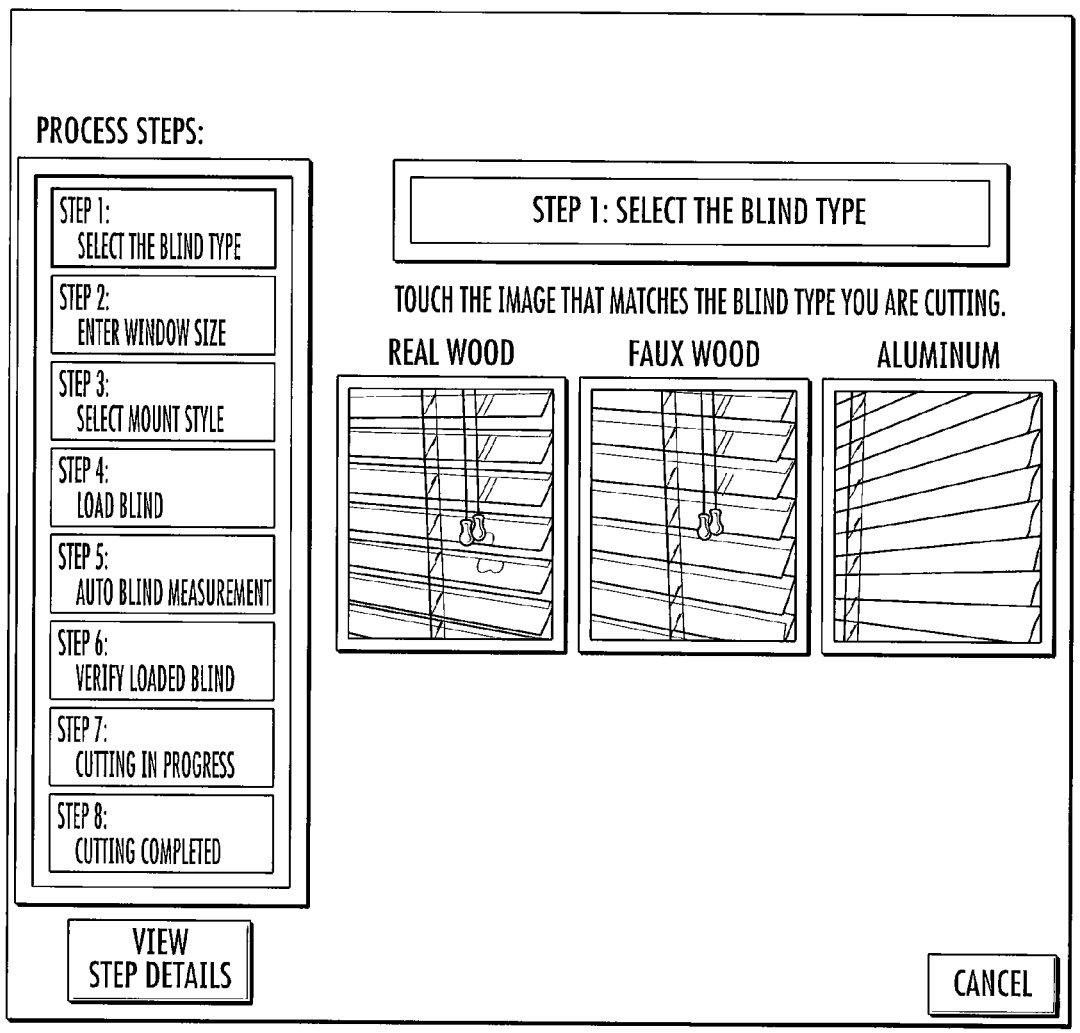

Another ordering methodology will now be described where the user interacts directly with the SIS machine. Referring to FIG. 32, the customer visits a retail outlet having a SIS machine (Block 1001). The customer physically shops the retail outlet and selects the window covering they wish to purchase and cut (Block 1002). The customer loads the selected window covering into the SIS machine and initiates the cutting process by pushing a start button on the user interface 112 (Block 1003). The customer uses user interface 112 to input information about the SIS product to be sized and the customer. A sample screen shot is shown in FIG. 34 that illustrates an introductory screen that may be displayed on user interface 112 that provides the users with options to cut the window covering, instructions on how to use the system, or the like. If the customer selects to cut a blind another screen shot such as that shown in FIG. 35 may be presented on user interface 112 that prompts the user for information relating to the window covering to be cut. In the illustrated screen shot the user is prompted to select a type of blind. The information is received by the CPU 102 or processor 202 and a transaction record is created (Block 1004). Verbal and/or visual feedback on the selection may be given to the user at user interface 112.

Figure 36:
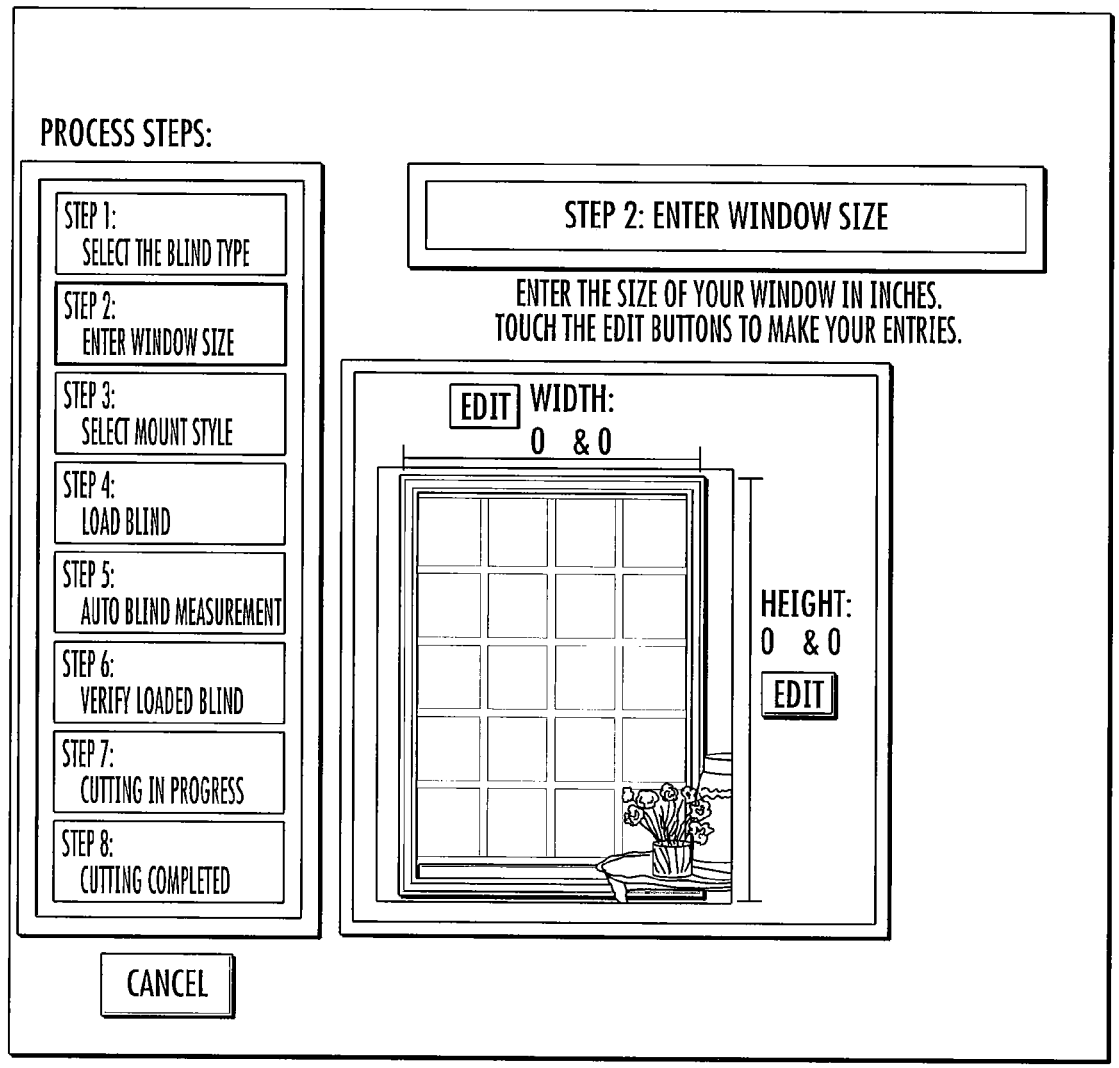
Figure 37:
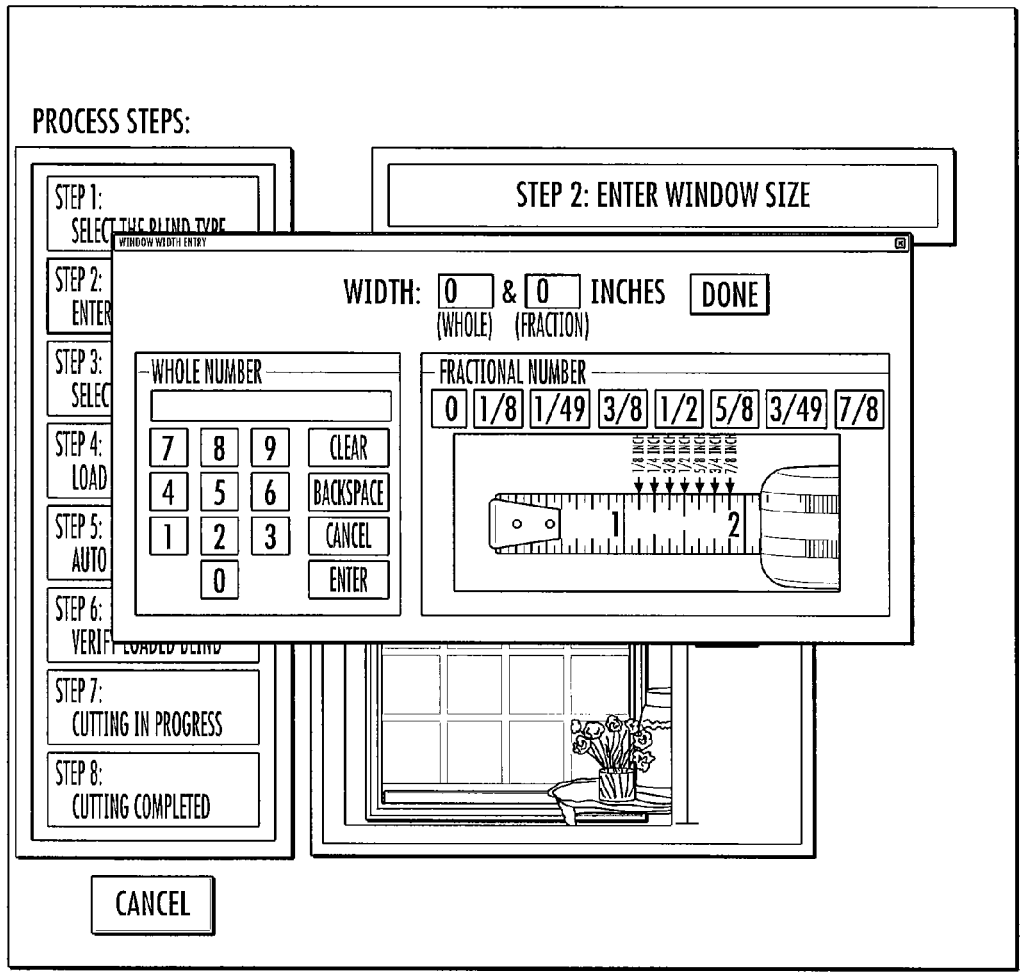
Figure 38:
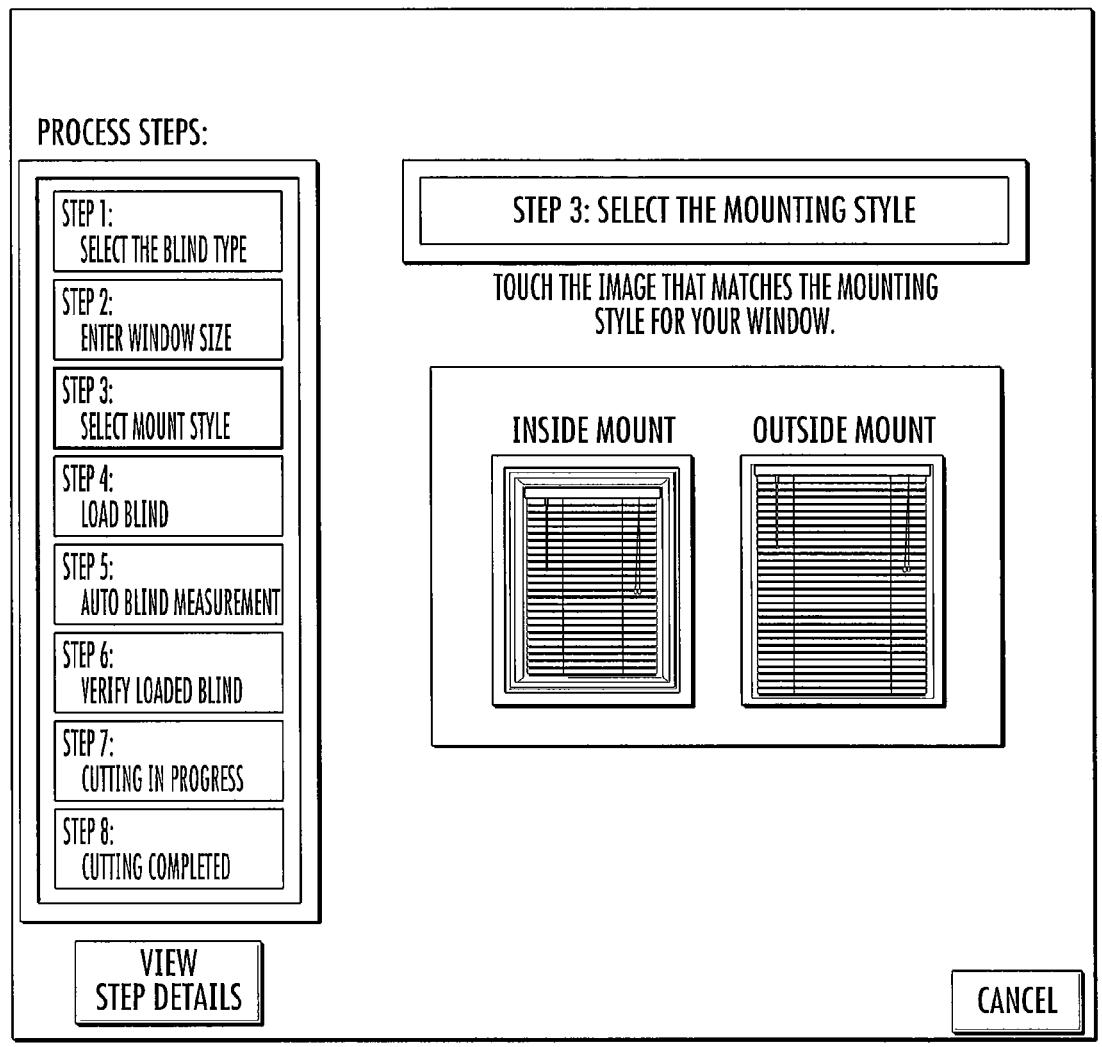
Figure 39:
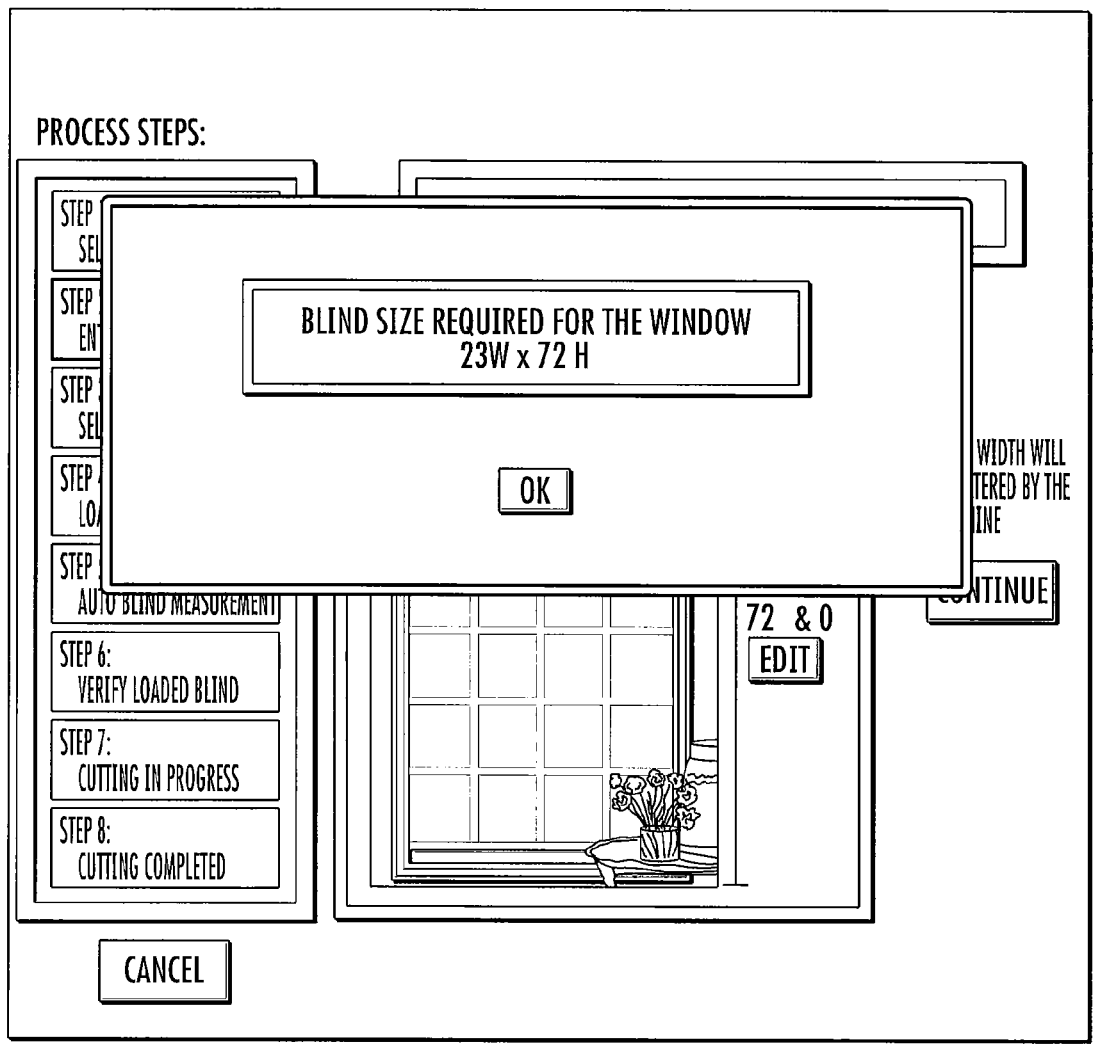
Figure 40:
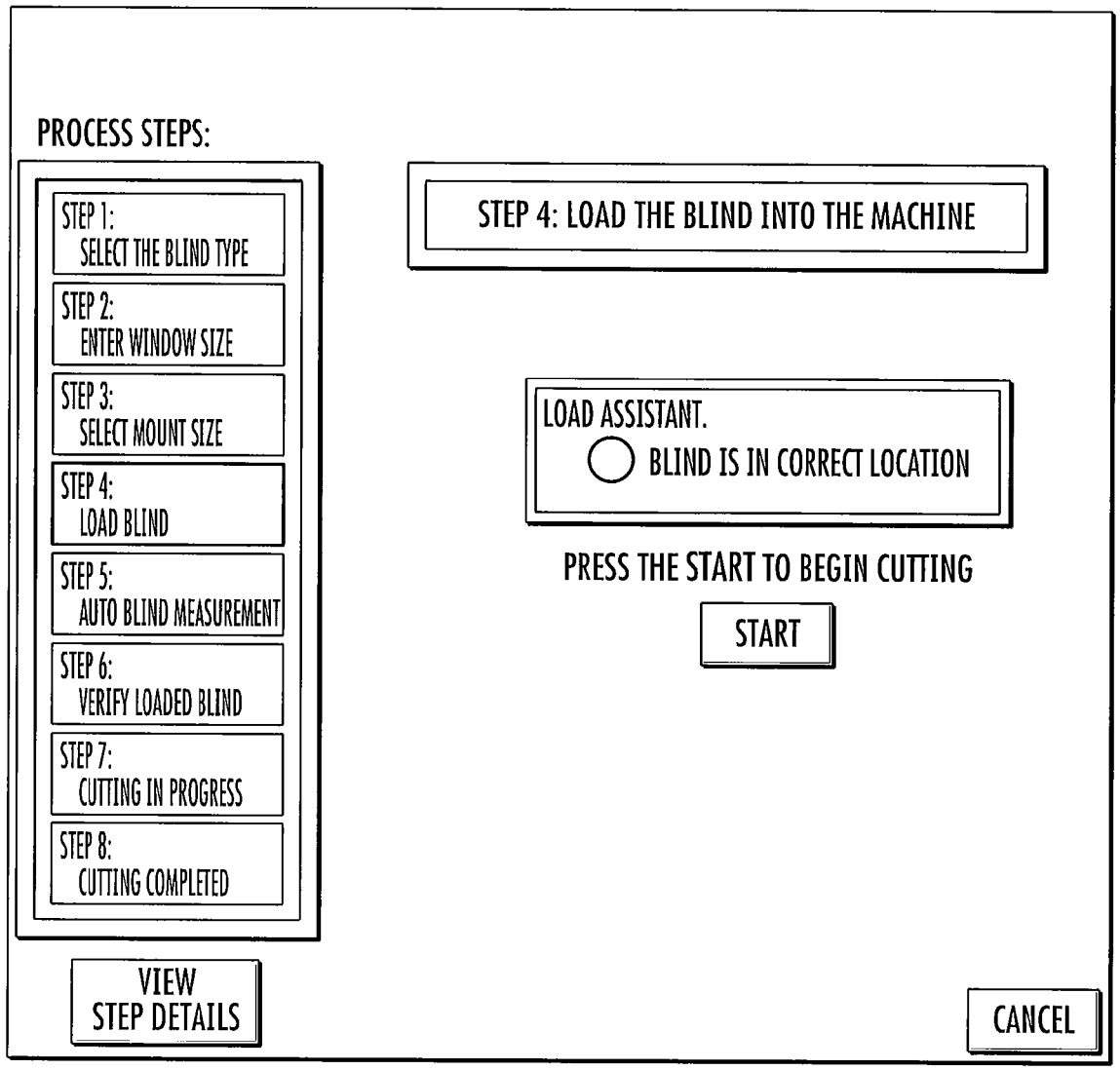
Figure 42:
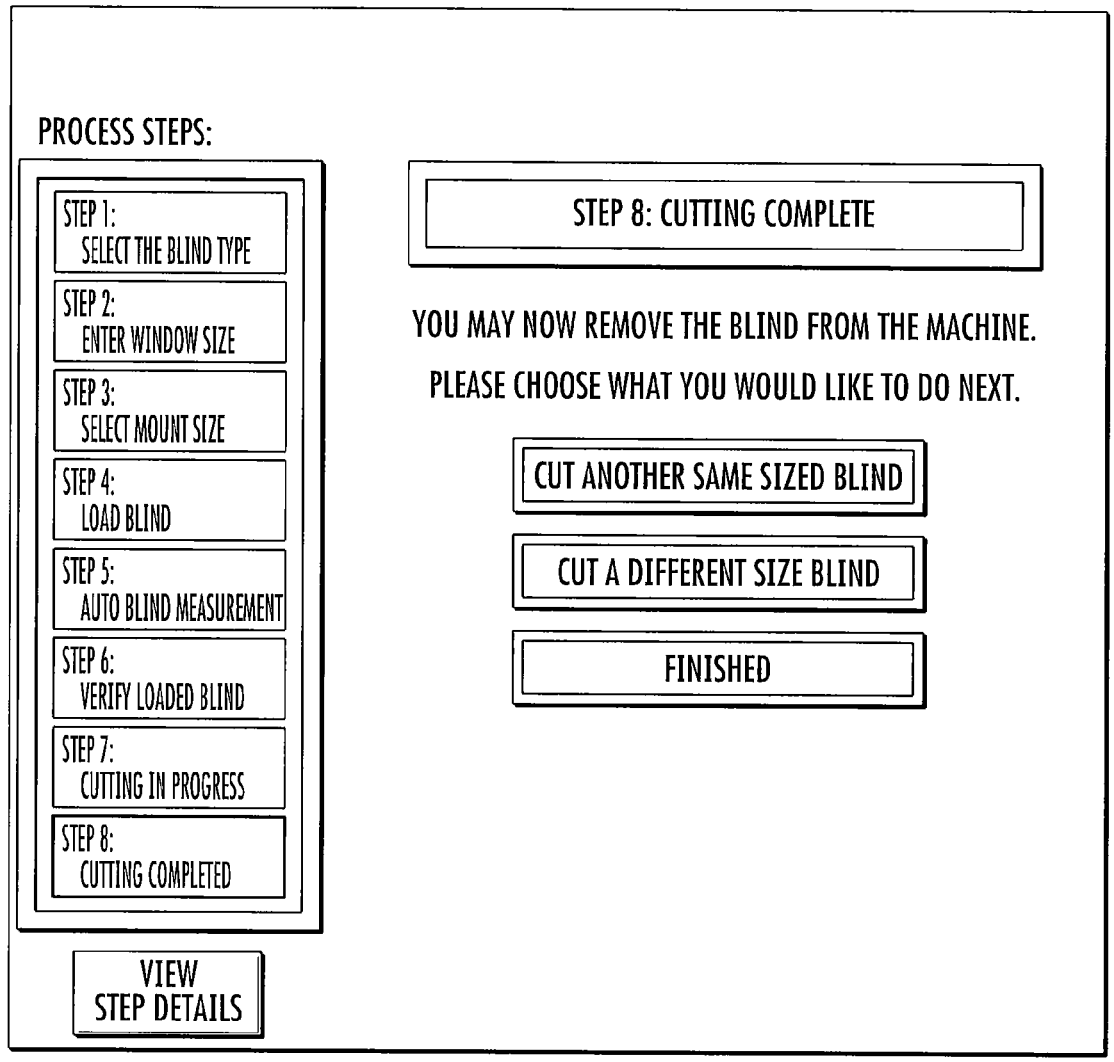

The customer enters the cut size of the finished product and the CPU 102 or processor 202 receives this information and stores it in the transaction record (Block 1005). A sample screen shot is shown in FIG. 36 for receiving the size information from the customer. Another screen shot is shown in FIG. 37 showing a pop up screen for receiving the user measurements of the architectural feature. The customer is prompted for and enters into the system inside or outside mount and the CPU 102 or processor 202 receives and records this information in the transaction record (Block 1006). A sample screen shot is shown in FIG. 38 for receiving the inside/outside mount information. The system determines and displays on the user interface the size of the stock product required for the desired cut product (Block 1007). A sample screen shot is shown in FIG. 39 for displaying the stock product required for the desired cut size window covering. The customer is directed to place the window covering into the machine in the proper location and orientation. A sample screen shot is shown in FIG. 40 prompting the user to load the machine and for displaying a signal that the window covering was properly inserted. The user interface 112 may display to the user a summary of the data related to the window covering including size, blind type, color or the like as shown in the screen shot of FIG. 41. The machine automatically cuts the blind to the desired size as previously explained. The process may be repeated for each blind to be cut. A screen shot prompting the user for another window covering or ending the cutting session is illustrated in FIG. 42. Once the user is finished, the SIS machine may print a receipt containing the original size of the product before cutting, and the size the product have cut too.

Data of the transaction would be stored in the internal database 104 where the stored data may include, but not be limited to, original size of product, cut to size of product, date, time, store location, and blind drop. The data captured by the SIS machine could be transferred to the blind manufacturer 111 or retailer outlet system 113 over network 108 at any time such that a complete record of the order and cutting operation is maintained as previously described.

Figure 33:
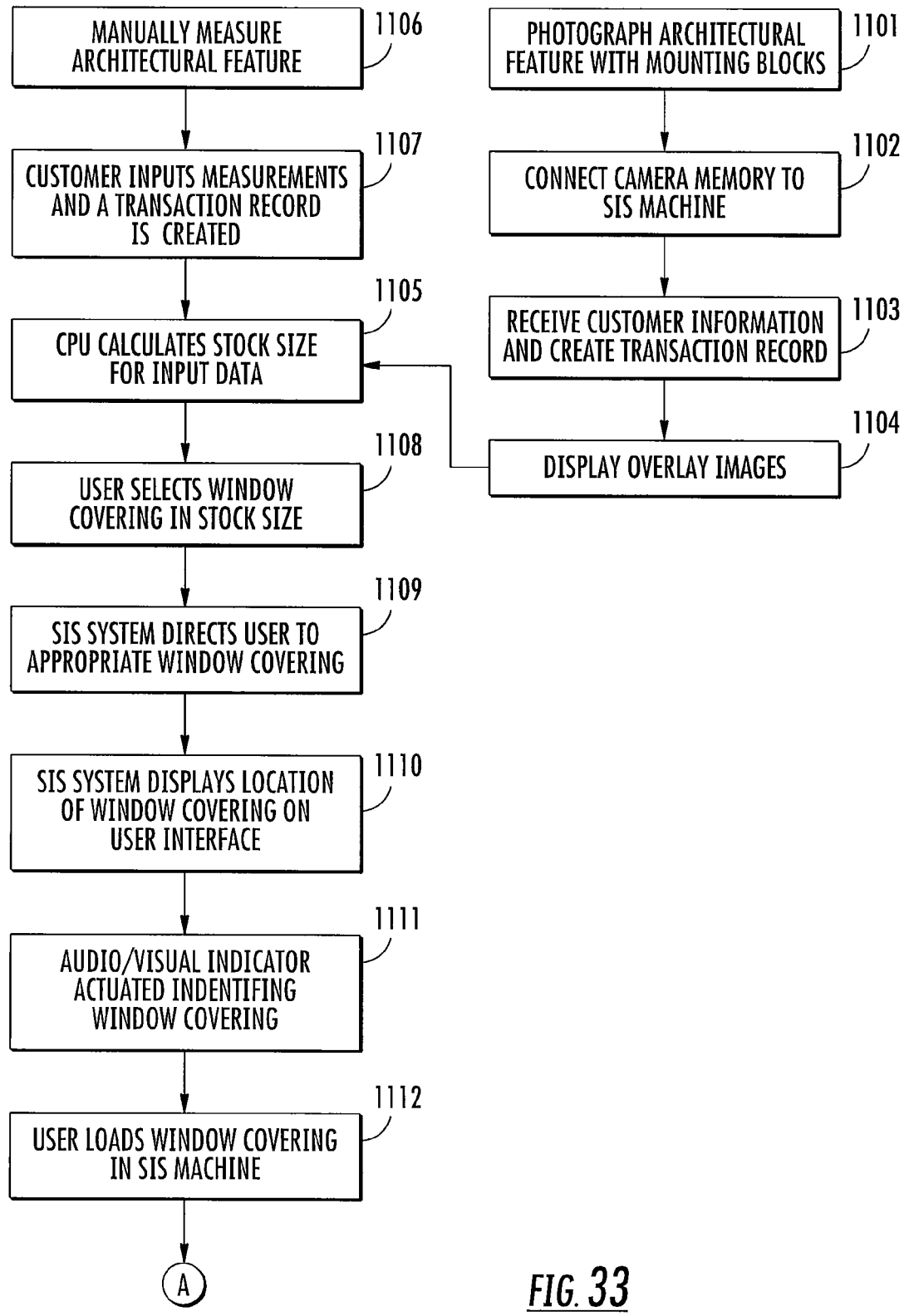
FIG. 33 is a block diagram illustrating yet another embodiment of the operation of an ordering system.

Another ordering methodology uses the photo-measuring kit as previously described. Referring to FIG. 33 the user photographs the architectural feature 123 and blocks 120 using a digital camera (Block 1101). The user brings the camera or memory stick or the like having the photographs stored in memory to a retail outlet and connects the camera to the CPU 102 or processor 202 via a USB port or places the memory stick in the appropriate memory card reader slot or otherwise connects the camera memory to the CPU 102 or processor 202 (Block 1102). The customer inputs information to the user interface and the CPU 102 or processor 202 creates a transaction record as previously described (Block 1103). Overlay images may be displayed at user interface 112 such that the customer can view the images of selected window coverings on their photographs and select a desired window covering style as previously described (Block 1104). The CPU 102 or processor 202 calculates the stock size of the window covering and displays to the user the size of stock window covering that is needed for the architectural feature shown in the user photograph (1105).

Another ordering methodology requires that the customer manually measure the dimensions of the architectural feature to be covered using existing measuring tools such as a tape measure or laser measure (Block 1106). The customer brings the measurements to a retail outlet and manually inputs the measurement information and other information at the user interface 112 and the CPU 102 or processor 202 and a transaction record is created as previously described (Block 1107). The CPU 102 or processor 202 calculates the required stock window covering size (Block 1105).

The user then physically selects the indicated window covering from the retail outlet inventory and places the window covering in the SIS machine as previously described (Block 1108). The SIS machine operates automatically to cut the window covering to the desired size as previously explained.

In one embodiment the SIS system could direct the customer to the appropriate size window coverings (Block 1109). For example, the user interface 112 displays an identification of the location within the retail outlet by alphanumeric characters, color code, map or the like (Block 1110). Alternatively, the system may be connected to lights or other audio/visual indicators 135 associated with the inventory of window coverings where the indicator is actuated to identify the appropriate window covering (Block 1111). For example, the bin in which the window coverings are stored is lighted to guide the customer to the appropriate window covering. Once the appropriate window covering is selected the customer loads the window covering into the SIS machine (Block 1112) and the SIS machine cuts the window covering as previously described.

Because a transaction record is created for each customer and each transaction the system operator has a complete record of each purchase. This information can be used to confirm and verify individual purchases by individual purchasers. This information can also be used in the aggregate to determine market trends, most common window sizes, most popular window treatments, buying habits and other market trends. This information may also be used for inventory control. For example, if the window covering provider has access to the data that manufacturer can obtain real time information on hand inventory for any of its customers and can restock depleted inventory and/or remove slow moving inventory in a timely manner to ensure that the manufacturer's supply of product matches the purchasing patterns of a specific retailer's customers. The retail outlet, if it has access to this information, can use the information for its own customers.

Because the user is a captive audience during the cutting operation the user interface 112 can be used to present advertising information, news, or other information to the customer. The information may be stored locally in the operating system of the SIS machine such that the information relates to other products sold by the retail outlet or window covering provider. Moreover, because the operating system of the SIS machine is connected to the internet, any information may be provided on the user interface by the system administrator where the user interface 112 functions as the user terminal.

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

The invention claimed is:
1. An apparatus for cutting a window covering comprising:
a first saw and a second saw for cutting the window blind;
a clamp assembly for moving the window covering relative to the first saw and the second saw along a first direction; and
a controller for moving the clamp assembly to automatically position a center of the window covering relative to the first saw and the center of the window covering relative to the second saw based on a desired cut size of the window covering, and
a substantially horizontal platform that supports the window covering, and
a substantially vertical, stationary lateral support surface located adjacent to the platform and extending along the first direction from said first saw to said second saw, said lateral support surface comprises a low friction surface, said clamp assembly being extendable substantially perpendicular to said first direction to trap said window covering against said lateral support surface, said clamp assembly being movable parallel to said first direction while trapping said window covering against said lateral support surface.

2. The apparatus of claim 1 wherein said clamp assembly comprises a member for engaging the window covering to locate the center of the window covering.

3. The apparatus of claim 2 wherein said member comprises a pin, said pin engaging a mating hole on said window covering.

4. The apparatus of claim 1 wherein said clamp assembly is mounted on a carriage that is reciprocated to move the window covering.

5. The apparatus of claim 1 further including a user interface to enable a user to input data.

6. The apparatus of claim 1 wherein said lateral support surface comprises a plurality of rollers.

7. The apparatus of claim 1 wherein said first saw and said second saw reciprocate transverse to the first direction to cut the window covering.

8. The apparatus of claim 1 wherein a stationary clamp is located adjacent each of said first saw and said second saw to hold the window covering during the cutting operation.

9. The apparatus of claim 1 wherein the clamp assembly comprises a clamping jaw that can be extended in a second direction to trap the window covering against the lateral support surface.

* * * * *